CRT C

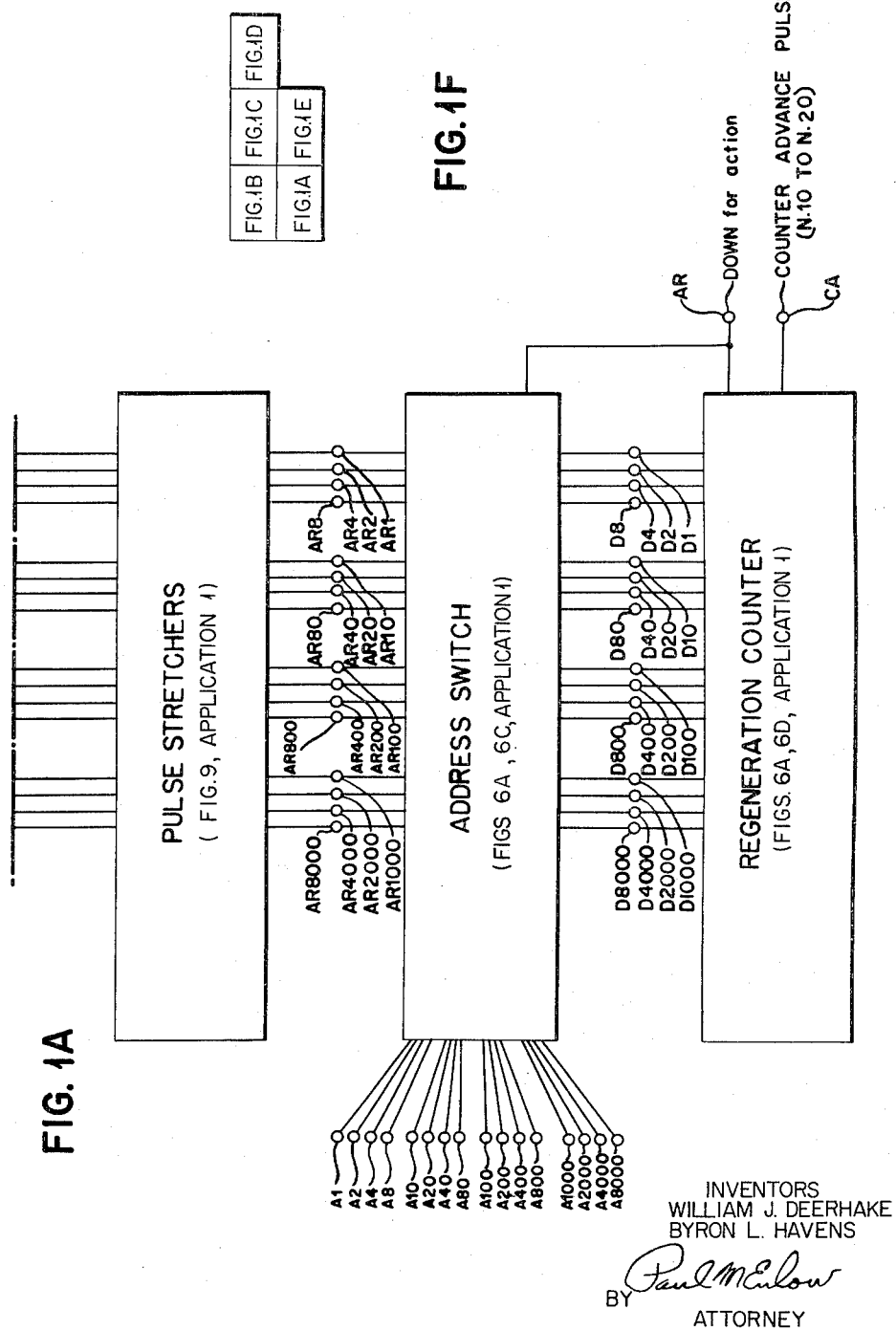

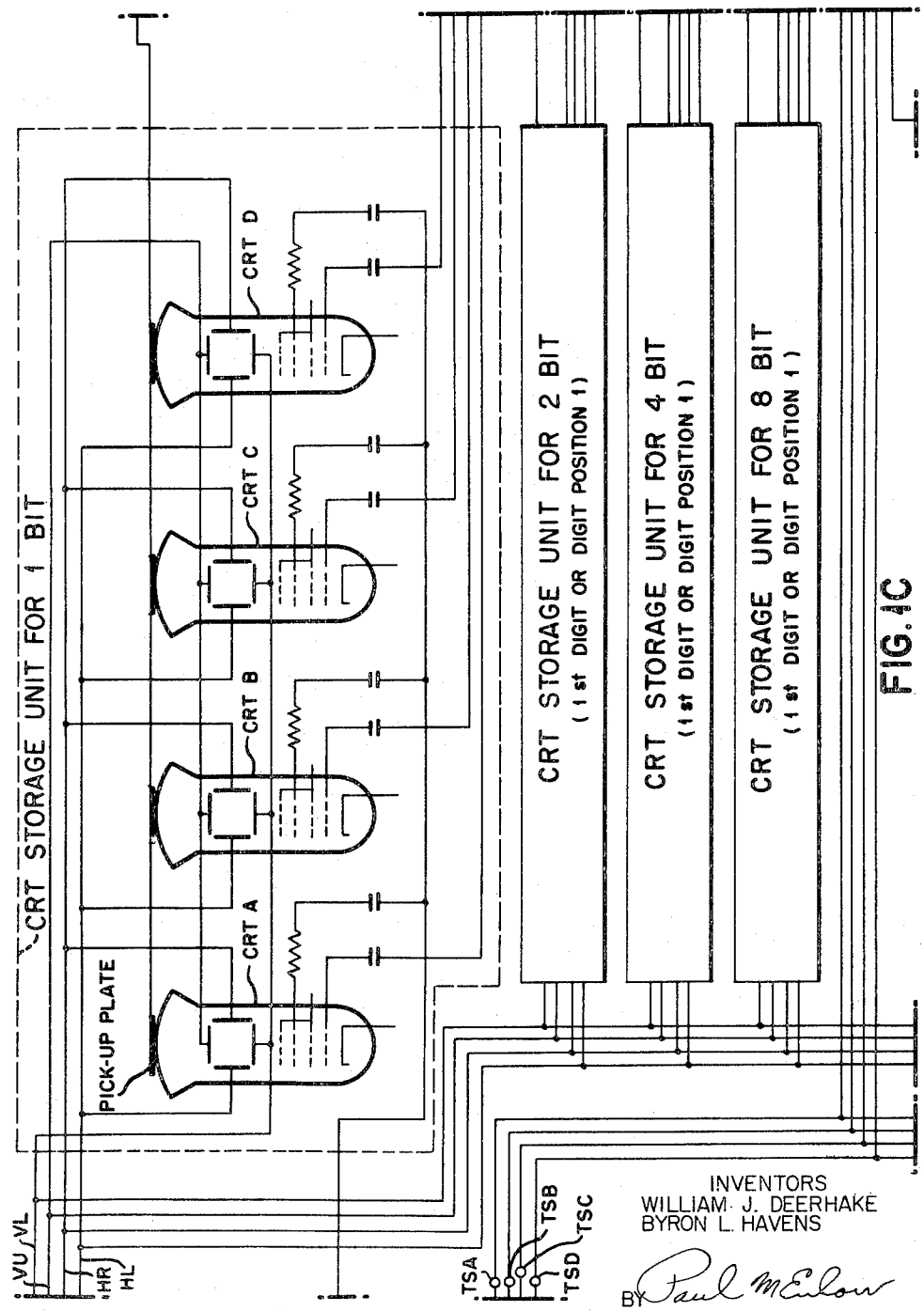

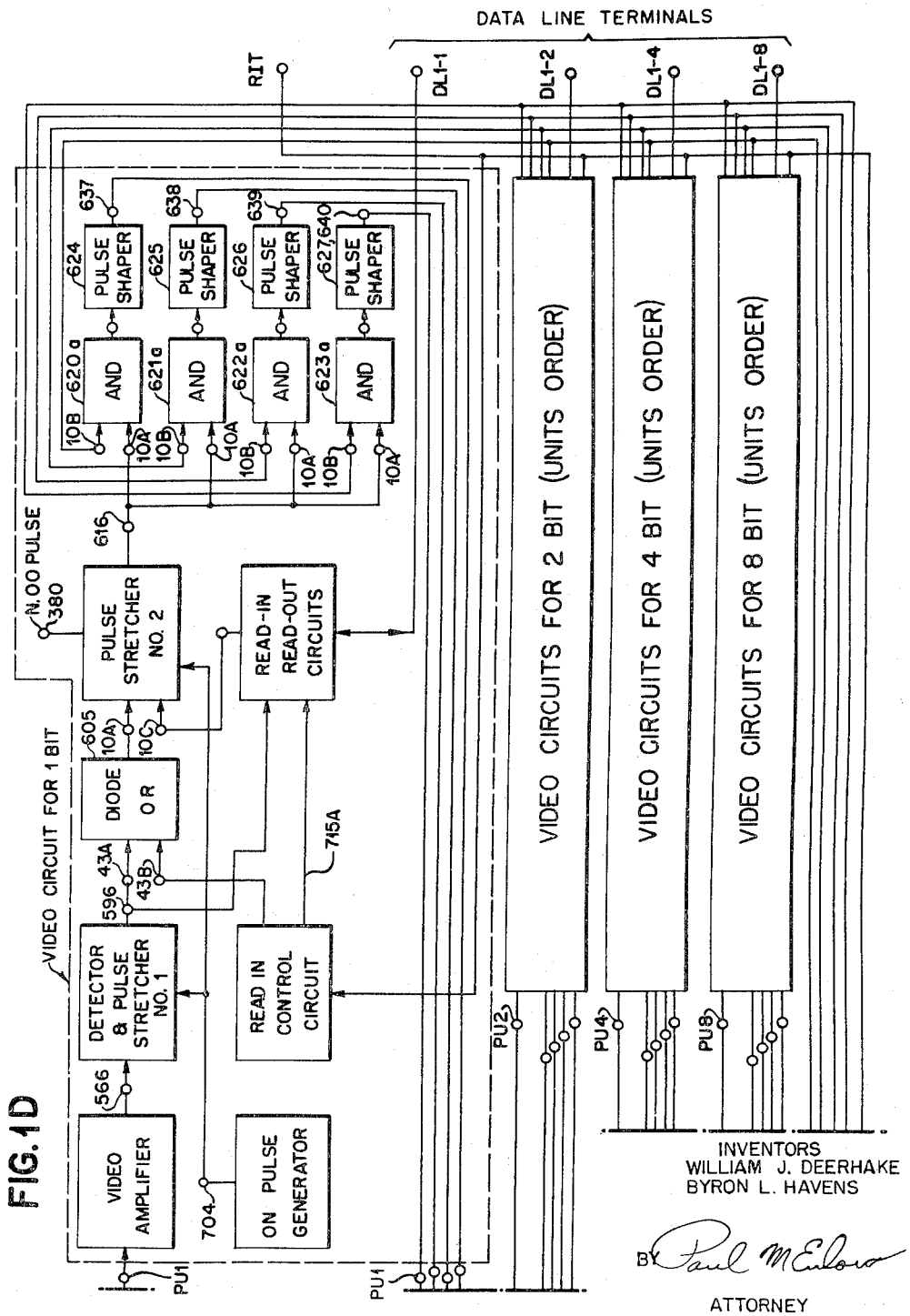

| BINARY-DECIMAL ADDRESSES FOR HORIZONTAL & VERTICAL DEFLECTION CIRCUITS | | | | DECIMAL NO. CORRESPONDING TO ADDRESSES |
|---|---|---|---|---|
| THOUSAND'S ORDER | HUNDRED'S ORDER | TEN'S ORDER | UNIT'S ORDER | |
| 0000 | 0000 | 0000 | 0000 | 0 |
| | | | 0001 | 1 |
| | | | 0010 | 2 |
| | | TEN'S ORDER INACTIVE | 0011 | 3 |
| | | | 0100 | 4 |
| | | | 0101 | 5 |
| | | | 0110 | 6 |
| | | | 0111 | 7 |
| | | | 1000 | 8 |
| | | 0000 | 1001 | 9 |
| | | 0001 | 0000 | 10 |
| | | | INITIAL CYCLE | 11 |
| | | | | 12 |
| | HUNDRED'S ORDER IS INACTIVE | 0001 REMAINS FOR EACH NEW ADDRESS | OF UNITS ORDER REPEATED | 13 |
| | | | | 14 |
| | | | | 15 |
| | | | | 16 |
| | | | | 17 |
| THOUSAND'S ORDER IS INACTIVE | | 0001 | | 18 |
| | | 0001 | | 19 |
| | | 0010 | 0000 | 20 |
| | | 0011 | | 30 |
| | | 0100 | | 40 |
| | | 0101 | INITIAL CYCLE OF UNITS ORDER REPEATED EACH TIME TEN'S ORDER ADVANCES | 50 |
| | | 0110 | | 60 |
| | | 0111 | | 70 |
| | | 1000 | | 80 |
| | 0000 | 1001 | | 90 |
| | 0001 | 0000 | 0000 | 100 |
| | 0010 | | | 200 |
| | 0011 | INITIAL CYCLE OF TEN'S ORDER REPEATED EACH TIME HUNDRED'S ORDER ADVANCES | INITIAL CYCLE OF UNITS ORDER REPEATED EACH TIME TEN'S ORDER ADVANCES | 300 |
| | 0100 | | | 400 |
| | 0101 | | | 500 |
| | 0110 | | | 600 |
| | 0111 | | | 700 |
| | 1000 | | | 800 |
| 0000 | 1001 | | | 900 |
| 0001 | 0000 | 0000 | 0000 | 1000 |
| | 0001 | | | 1100 |
| | 0010 | | | 1200 |
| | 0011 | | | 1300 |
| 0001 REMAINS FOR EACH NEW ADDRESS | 0100 | SAME | | 1400 |
| | 0101 | | SAME | 1500 |
| | 0110 | | | 1600 |
| | 0111 | | | 1700 |
| | 1000 | | | 1800 |
| | 1001 | 0000 | | 1900 |
| 0001 | 1001 | 1001 | | 1999 |
| 0010 | 0000 | 0000 | 0000 | 2000 (0) |

FIG. 3

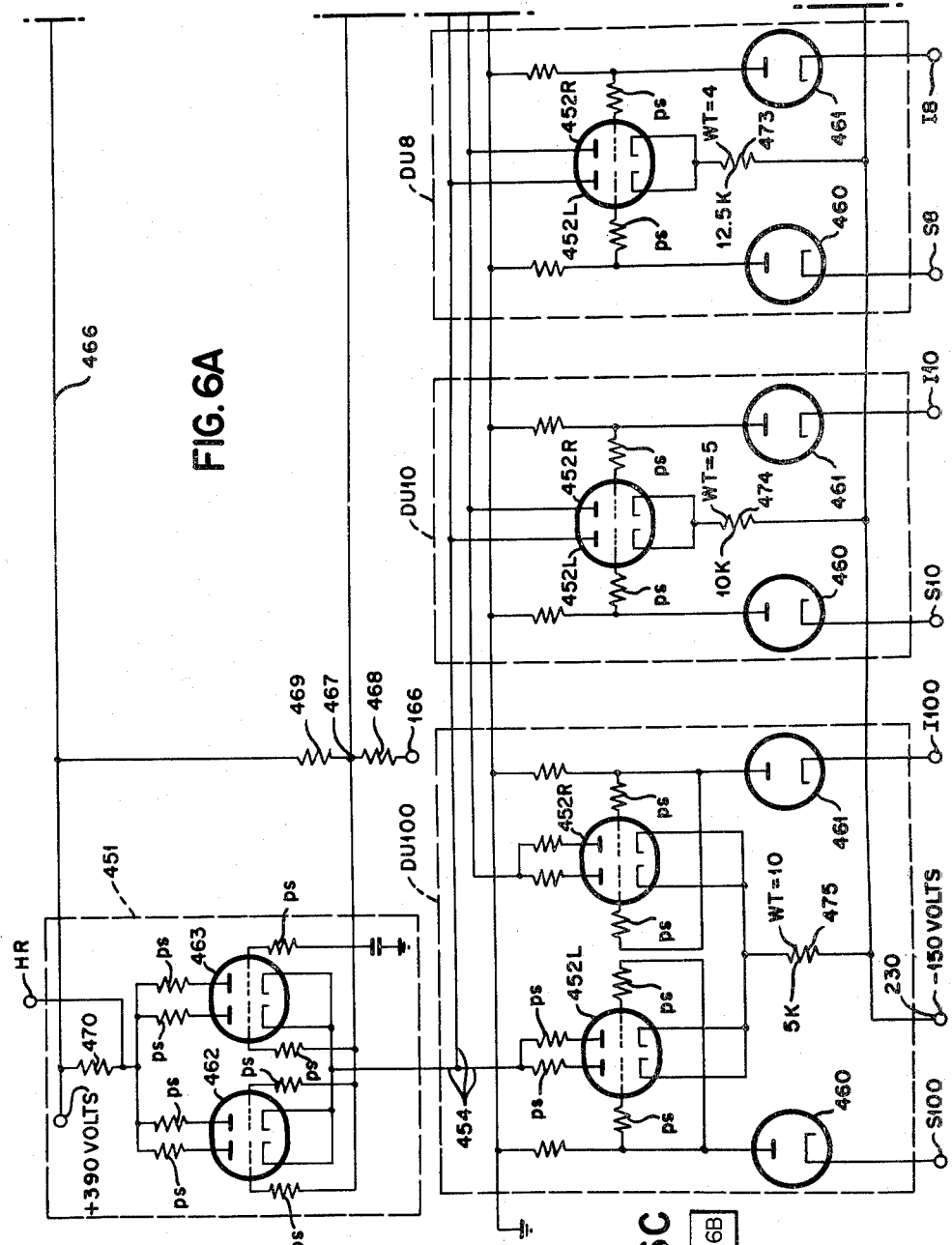

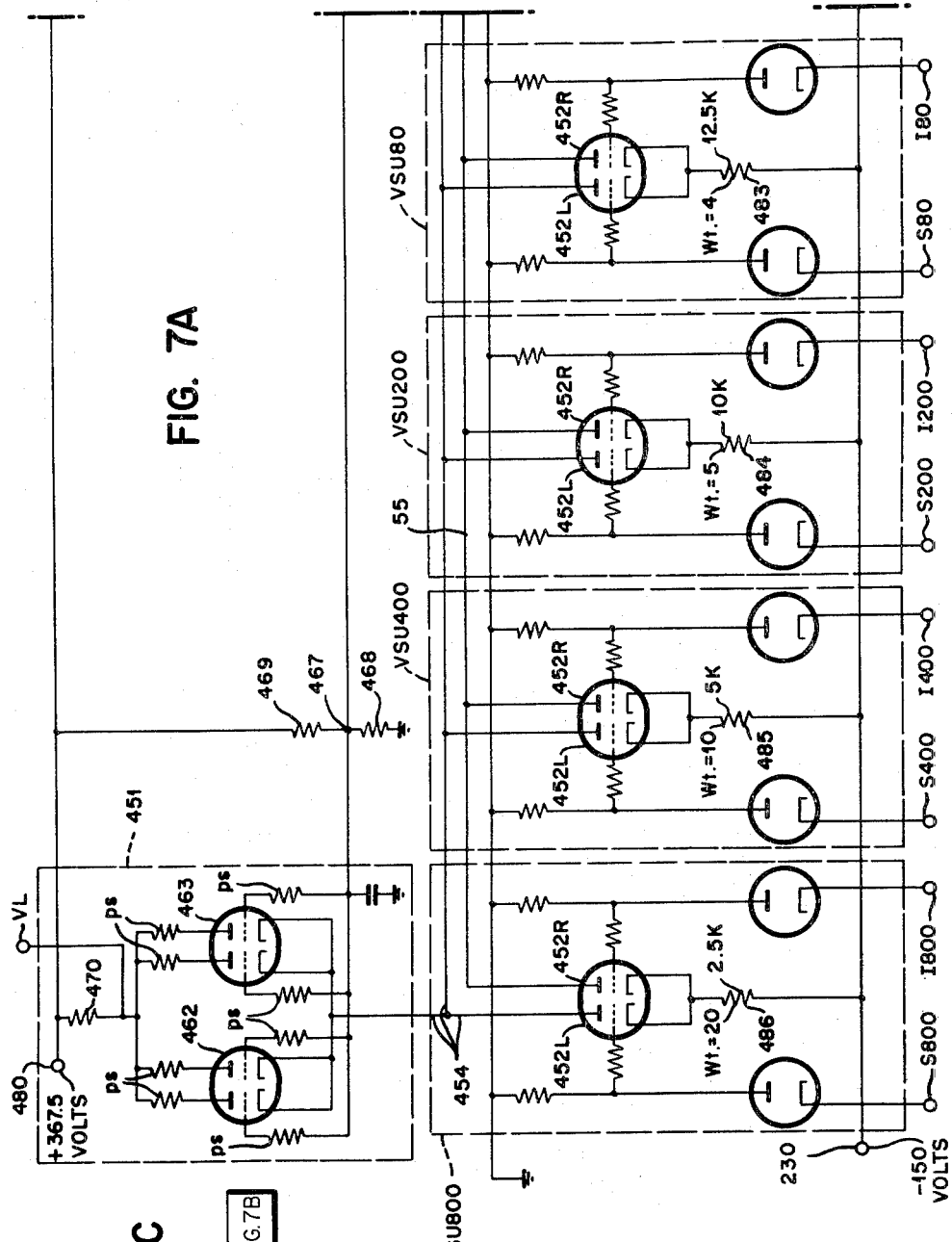

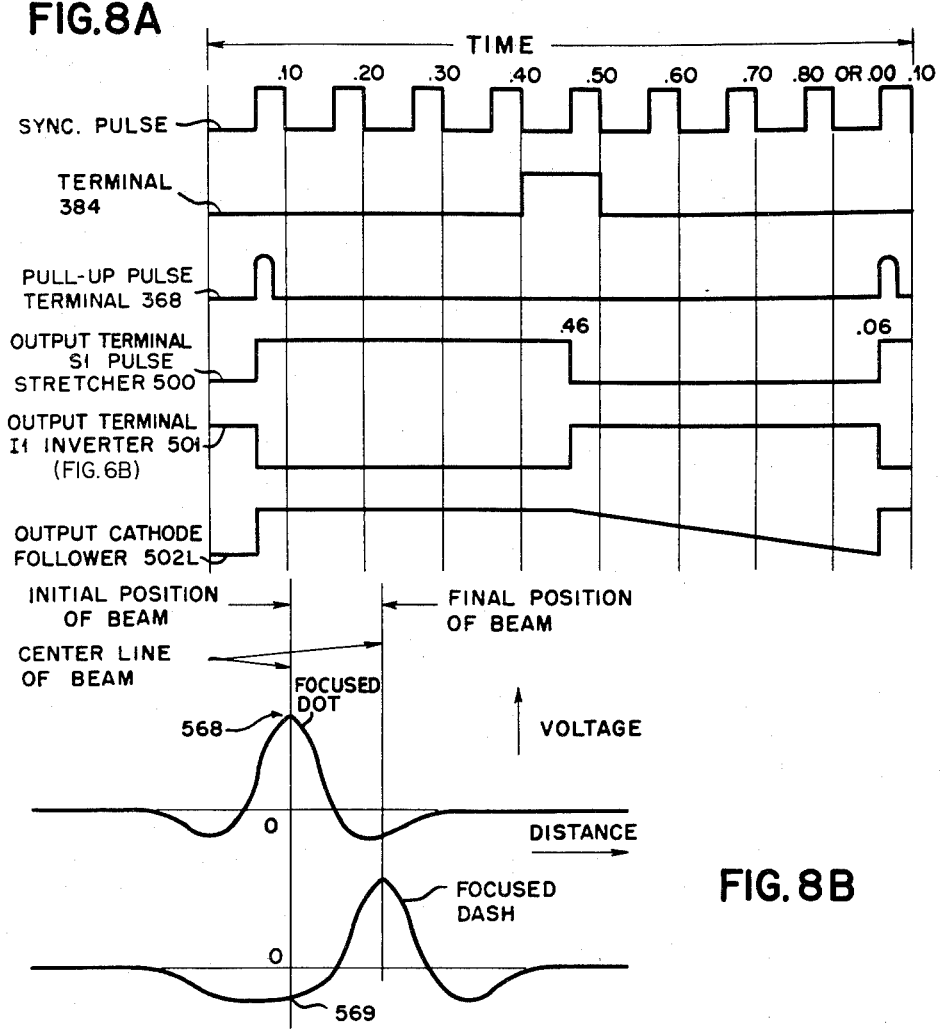
FIG. 8A
FIG. 8B
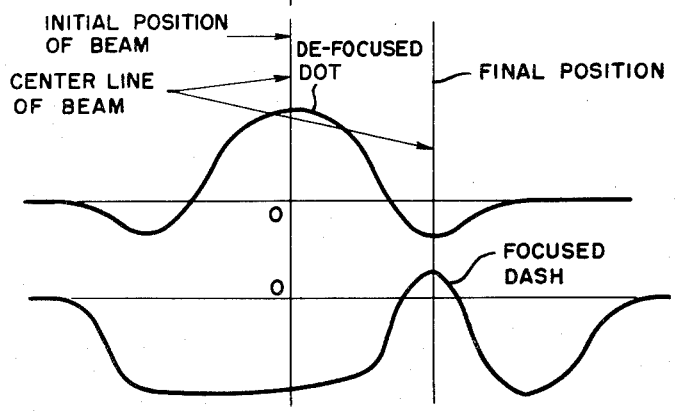
FIG. 8C

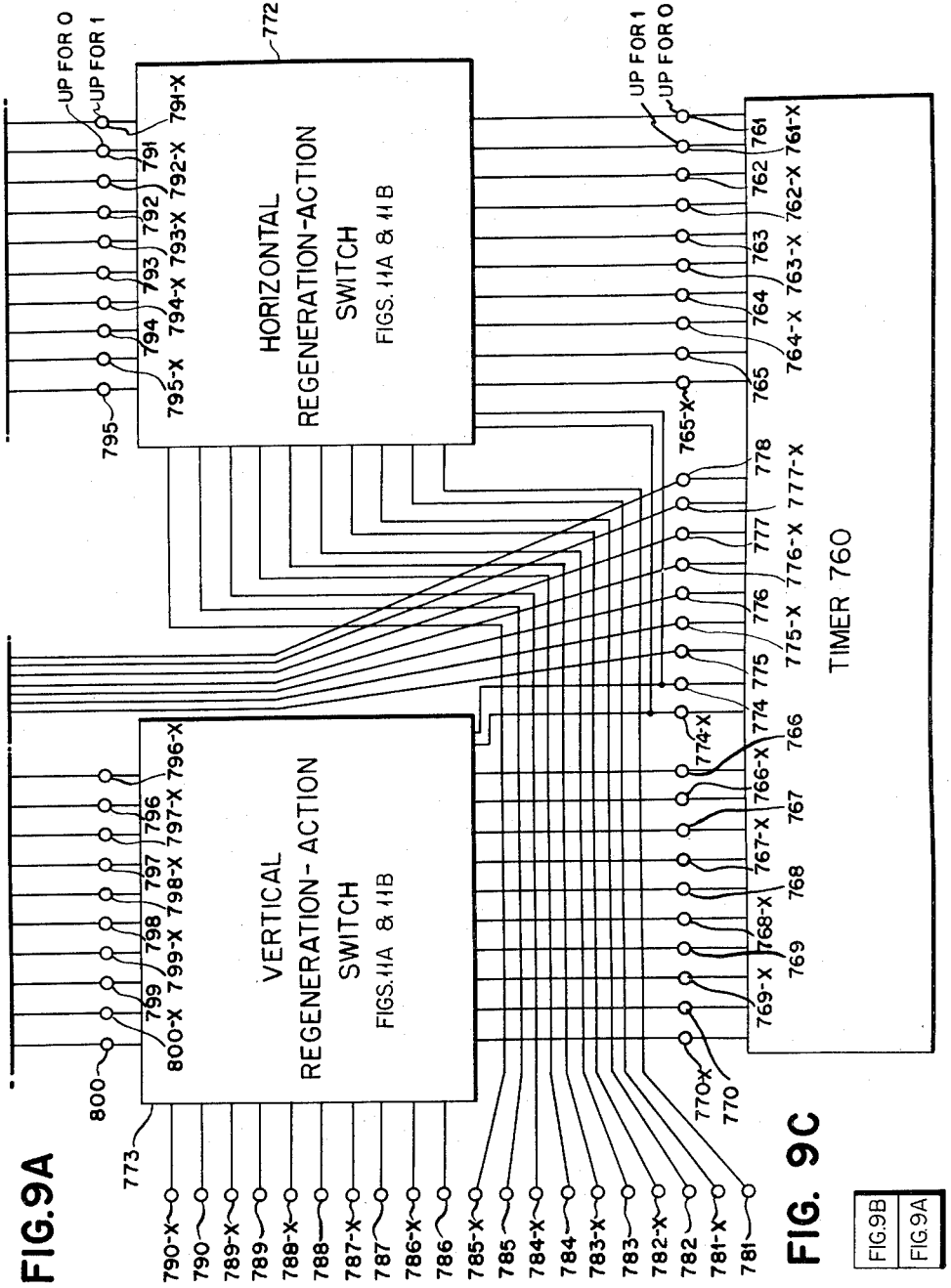

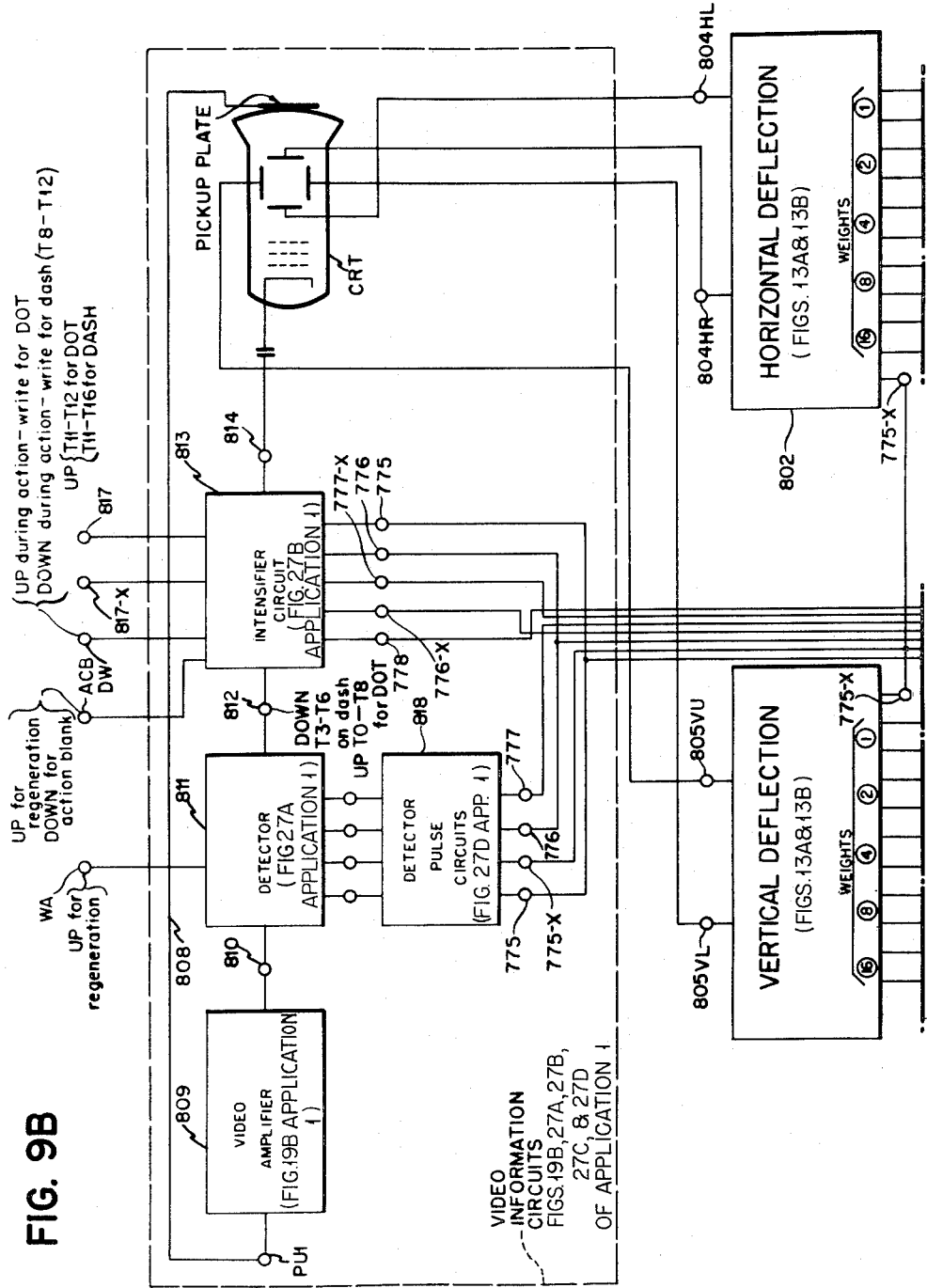

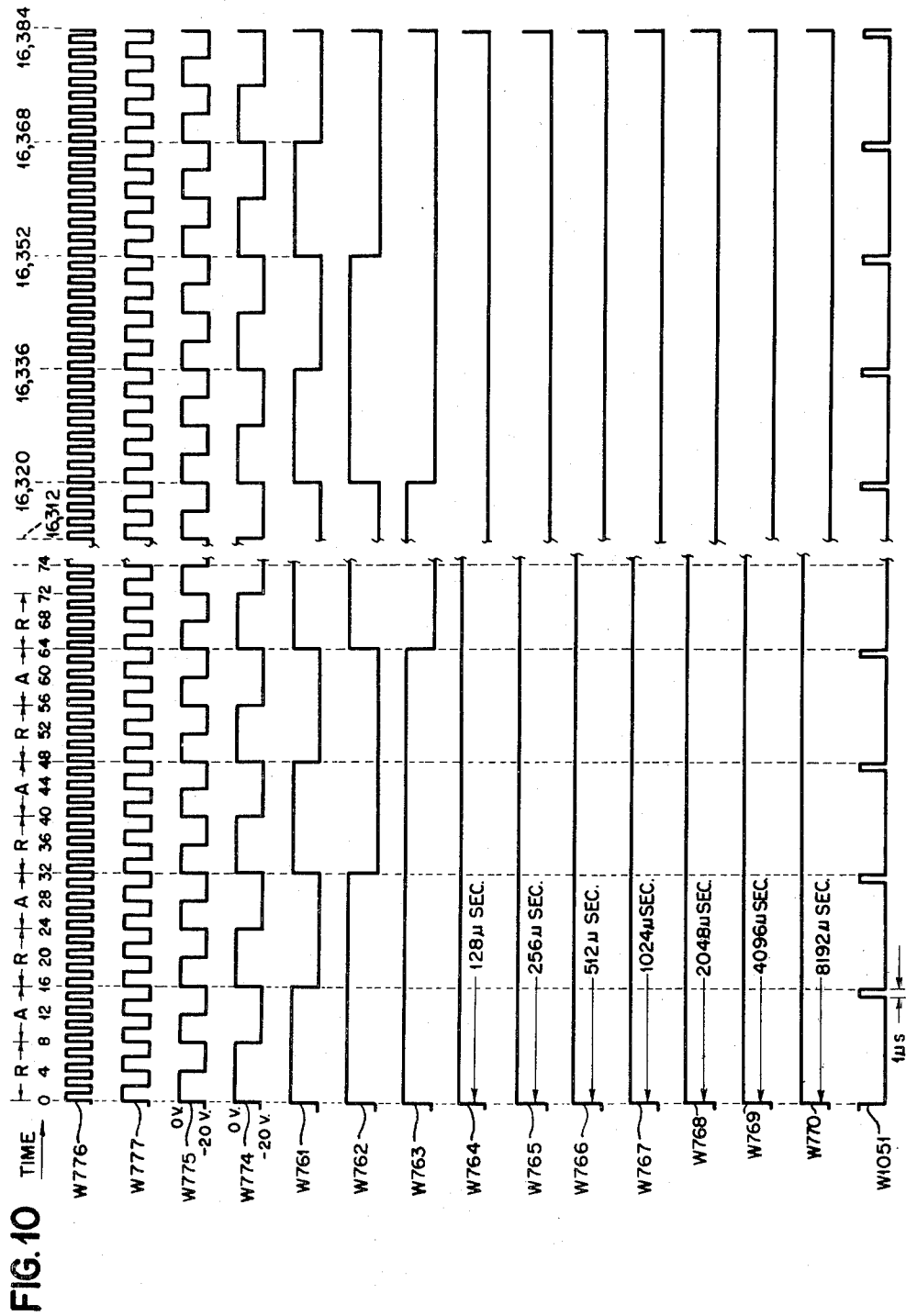

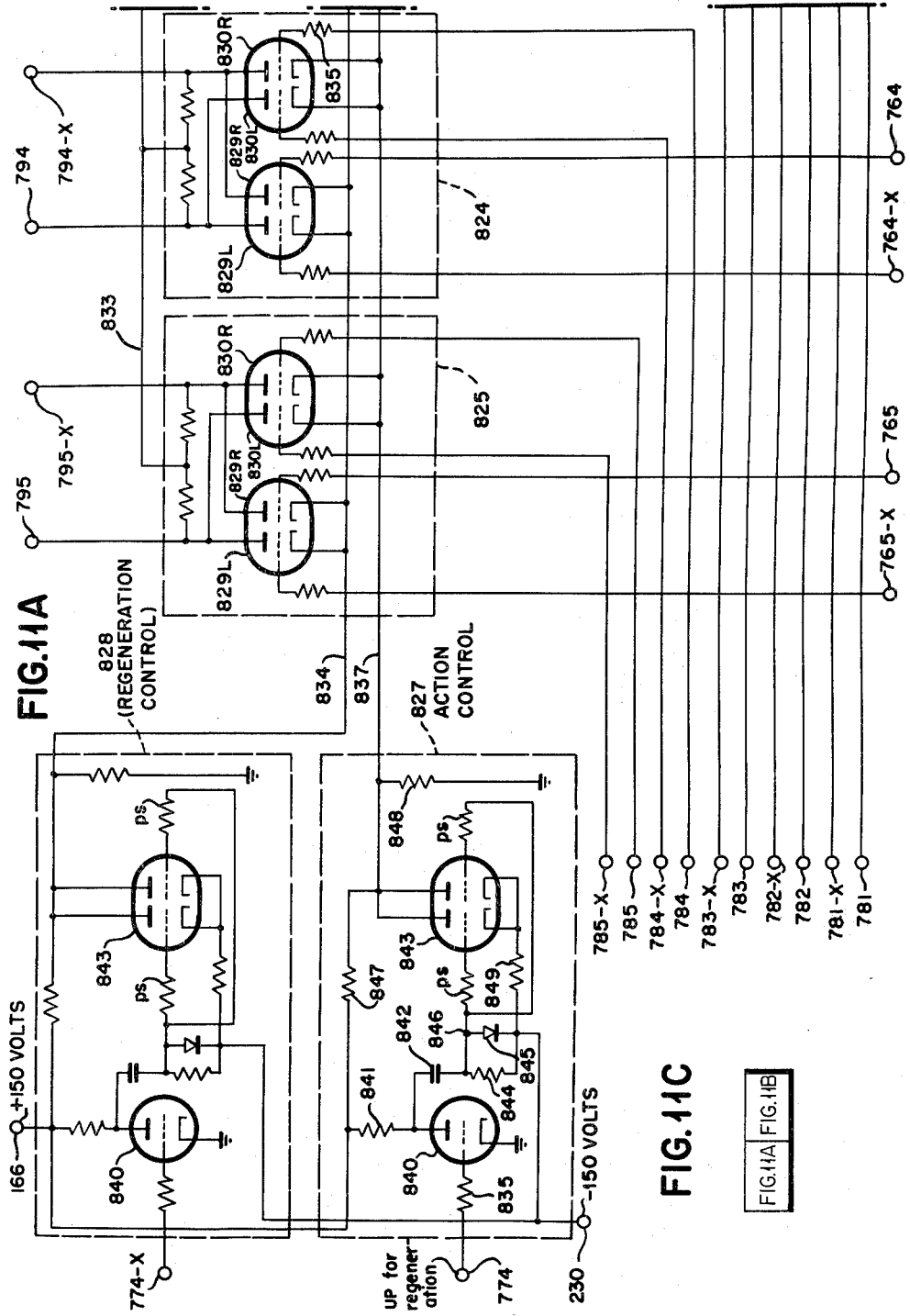

FIG. 41B

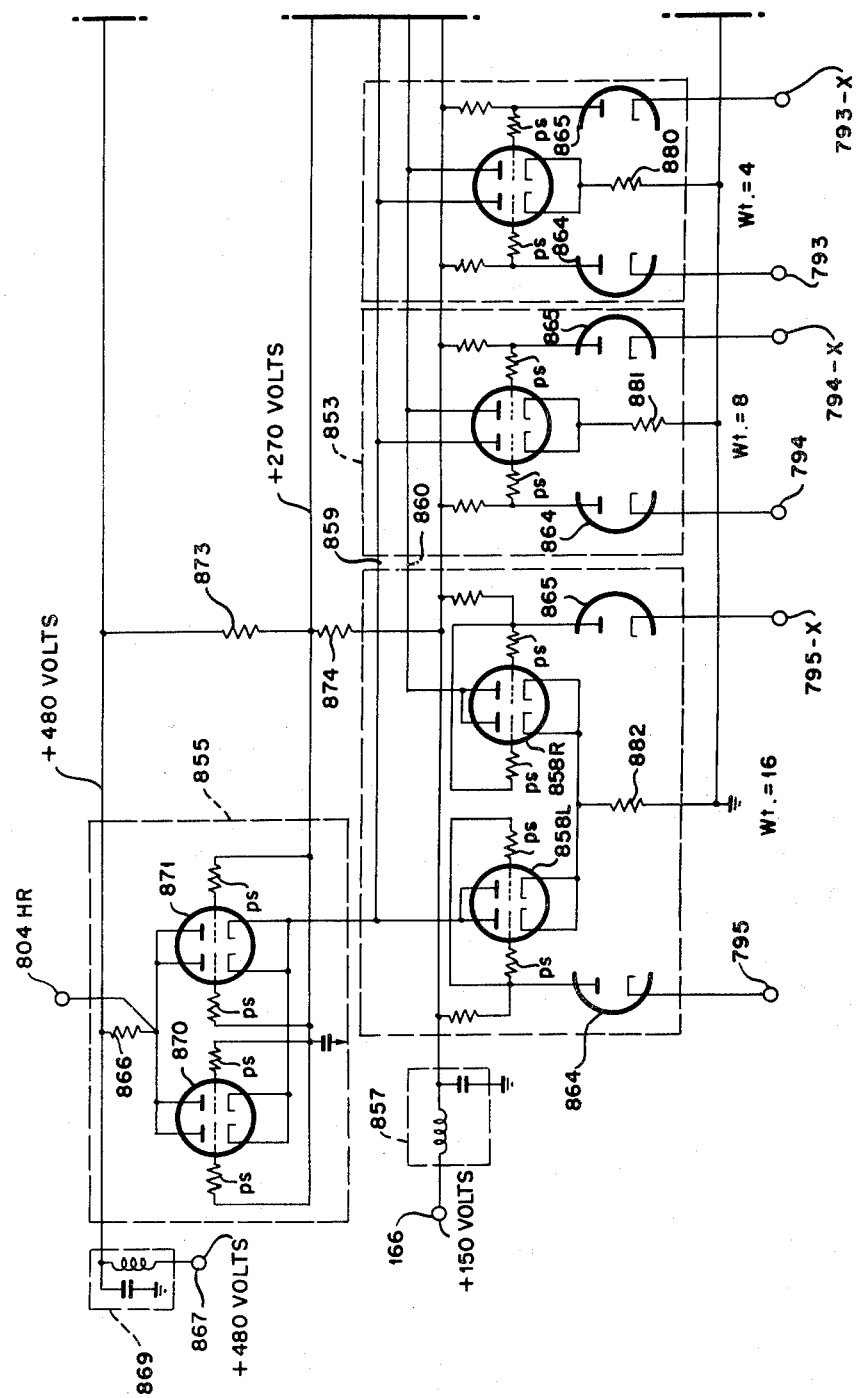

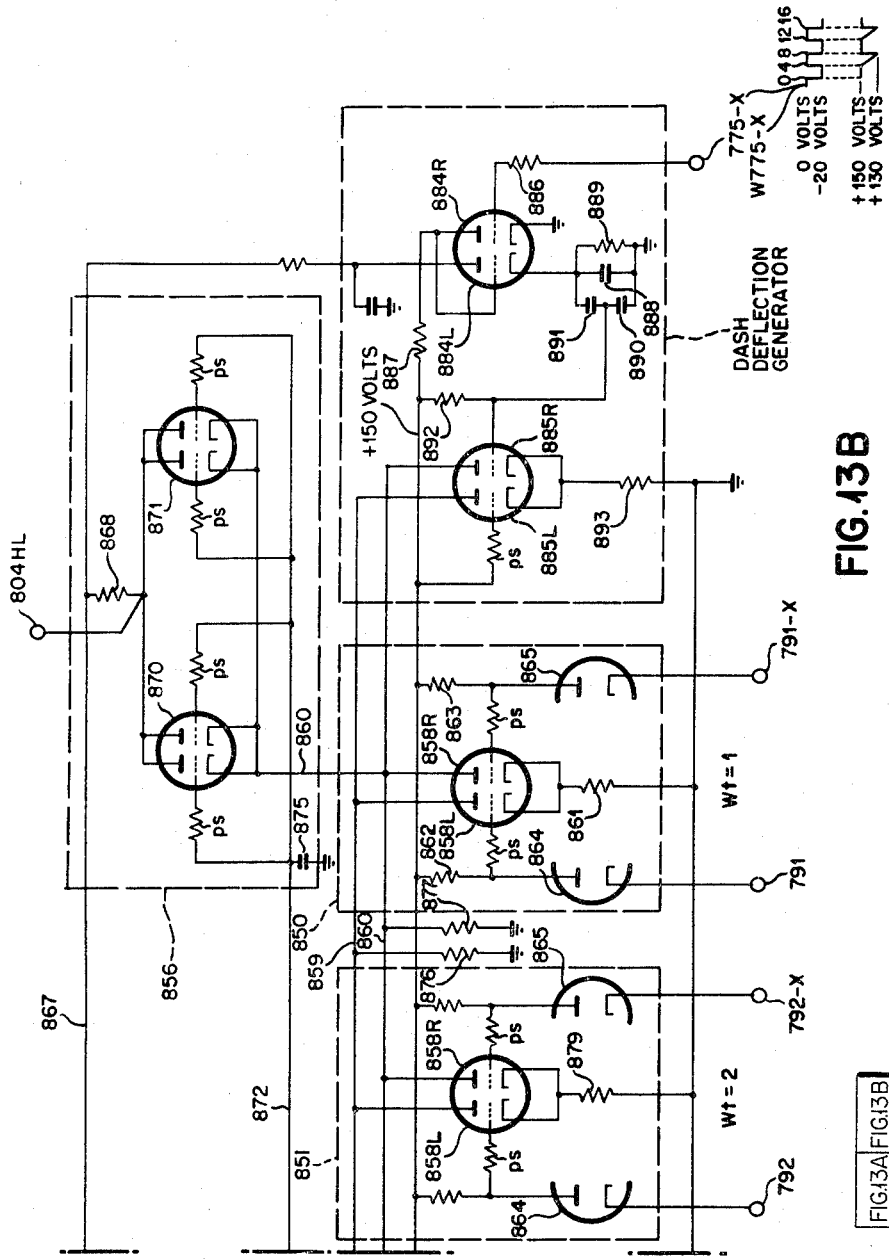

United States Patent Office 2,997,693
Patented Aug. 22, 1961

2,997,693
ELECTROSTATIC STORAGE SYSTEM
William J. Deerhake, Alpine, and Byron L. Havens, Closter, N.J., assignors to International Business Machines Corporation, New York, N.Y., a corporation of New York
Original application July 19, 1954, Ser. No. 444,253, now Patent No. 2,939,001, dated May 31, 1960. Divided and this application Dec. 31, 1957, Ser. No. 706,450
10 Claims. (Cl. 340—173)

This invention relates to electrostatic storage systems and more particularly to a novel electrostatic storage system of the binary-decimal type and of the binary type. This application is a divisional application of applicaton Serial No. 444,253 filed July 19, 1954 by William J. Deerhake and Byron L. Havens now Patent No. 2,939,001.

In the binary-decimal type system disclosed, information applied thereto, handled therein, and read out therefrom, is represented in the binary-decimal system. In the binary type system disclosed such information is represented in the pure binary code.

In the binary notation only two digits are employed, i.e., 0 and 1. The decimal digit 0 is represented by binary digit 0 and the decimal digit 1 is represented by binary digit 1. These binary digits are referred to as bits. The digital positions or orders in a binary number, reading from right to left, correspond in value to $2^0$, $2^1$, $2^2$, $2^3$, $2^4$, etc. or decimals digit 1, 2, 4, 8, 16 etc., respectively. For example, binary number 1001 represents decimal digit 9 which is determined by the addition of decimal digits 1 and 8 indicated by a binary 1 in the extreme right and the left binary positions respectively. Hence, by using binary bits or pulses in groups of four wherein a pulse represents a binary 1 and the absence of a pulse represents a binary 0, any decimal digit from 0–9 inclusive may be written in the pure binary notation.

The system of representing decimal numbers, digit for digit, in the pure binary notation is referred to herein as the binary-decimal system. The four consecutive binary orders, reading from right to left, represent the decimal digits 1, 2, 4, and 8 for the units decimal order or position and are accordingly referred to as the 1 bit, 2 bit, 4 bit, and 8 bit respectively. It follows that the four binary orders of the tens decimal order or position represent the decimal numbers 10, 20, 40, and 80 respectively. Likewise, in subsequent decimal orders, for example, the four respective binary orders of the hundreds decimal order or position represent the decimal numbers 100, 200, 400, and 800, respectively.

As an example, 459 will be represented in the binary-decimal system by 010001011001. The four binary bits at the right represent the decimal digit 9 of the units order, the next four bits to the left represent the decimal digit 5 of the tens order, and the remaining four bits represent the decimal digit 4 of the hundreds order.

Any decimal number from 0–15 inclusive can be represented by a group of four binary bits. If the decimal number is 16, then a binary carry occurs to the next group of binary bits to be added or to the next decimal order. However, in the binary-decimal system, only the decimal digits (0–9 inclusive) are represented by each group of four binary bits.

Various circuits used herein or particular points within the circuits are frequently referred to as UP or DOWN. UP means that the voltage present at the particular point or at the output of the circuit designated is positive with respect to ground or higher than that provided when the circuit is DOWN. DOWN means that the voltage present at the particular point or at the output of the circuit designated is negative with respect to ground or below that provided when the circuit is UP. If the control grid of a vacuum tube is referred to as DOWN, it means that the voltage at that control grid is below the cutoff value for the vacuum tube.

Information is stored on the target or face of a cathode ray tube by creating an electric charge gradient at a selected spot or address thereon, each address being assigned or designated by a decimal number. Binary information is stored by writing a dot or a first charge gradient to represent a binary 0 and a dash or a second charge gradient to represent a binary 1. A dot is written by rendering the cathode ray tube conductive while the electron beam is stationary. A dash is written at a designated address by first writing a dot followed by a slight deflection of the beam while the cathode ray tube is conductive.

In order to read or write information at a particular address, say address 1, for example, the beam of the cathode ray tube is first positioned to the spot location corresponding thereto.

Information stored on a cathode ray tube must be systematically refreshed so as to prevent loss thereof due to time decay. The time during which the refreshing of a single address is effected is referred to herein as a regeneration cycle. During a regeneration cycle the information stored at a selected address is sampled, amplified and caused to be restored at the address from which it was obtained.

Information is also read in or read out of a cathode ray tube during a preselected operational cycle. This cycle is referred to herein as an action cycle. An action cycle may be either of two type, i.e., an action read cycle or an action write cycle. The operations performed during an action read cycle are similar to those effected during a regeneration cycle. An action write cycle is performed when new information is writen at a selected address.

Each regeneration cycle and each action cycle have a duration of eight microseconds or eight time intervals.

A word is represented by seventeen decimal digits to be stored. The term CRT unit refers to four cathode ray tubes operated in parallel (as if one large tube) to accommodate the storage of a single binary bit of each of the words to be stored.

The system of time designation used herein comprises a combination of octal and decimal representations. For example, in time designation 1.15 the 1 to the left of the decimal point represents the number of the cycles already performed, the 1 to the right of the decimal point represents the particular microsecond interval of the cycle, and the second digit 5 to the right of the decimal point indicates that the time referred to is 5/10 of a microsecond in addition to the one microsecond represented by the 1 to the right of the decimal point. Hence, the time indicated is 1 and 5/10 microseconds after the beginning of the second cycle.

As a further example, the time designation 4.30 represents the beginning of the fourth microsecond interval of the fifth cycle, four eight microsecond cycles having already elapsed.

As a still further example a pulse may be said to be present from N.10 to N.20 or from N.10–N.20. This means that a pulse having a duration of one microsecond occurs during the second microsecond interval of each cycle.

Frequently, description of the circuit operation herein is undertaken in connection with specific voltages or electrical component values. Such is done by way of example and merely to simplify that description and assist in an understanding of that operation and in no way constitutes or implies a restriction of the utility of the circuits or a necessity of such values.

A principal object of the invention is to provide novel circuitry for effecting electrostatic storage in the binary-decimal system.

Another object is to provide novel circuitry for effecting electrostatic storage in the binary system.

Another object is to provide a novel electrostatic storage system of the binary type wherein regeneration and action cycles are performed alternately and an action cycle may be blank.

A further object is to provide a novel electrostatic storage system of the binary type wherein regeneration cycles are normally performed for re-storing or refreshing information previously stored and action cycles are selectively performed for effecting read in and read out of information.

A further object is to provide novel circuitry for reading stored information from a particular address on a cathode ray tube, making the information available for external use, and re-storing the information at the same address on the cathode ray tube.

Another object is to provide novel circuitry for reading the information stored at a particular address on a cathode ray tube and effecting storage of new information at the same address.

Another object is to provide deflection circuit means wherein a constant voltage line corresponds to each cathode ray tube deflection plate, voltage stabilizing means are connected between each deflection plate and the constant voltage line so that a voltage change is provided at the deflection plate in accordance with a current change at the constant voltage line.

Another object is to provide deflection circuit means wherein a constant current flows in constant voltage lines corresponding to the cathode ray tube deflection plates of each pair and means are provided to selectively effect complementary change in the amount of current flow in the constant voltage lines corresponding to the plates of each pair to effect a preselected positioning of the electron beam of the cathode ray tube.

Still another object is to provide a deflection circuit for providing current of constant value and having a plurality of dual position switches connected to supply current flow to either of two lines, said switches being operable in response to a predetermined pattern of selective voltage changes to initiate a predetermined sequential current transfer between said lines.

Still another object is to provide novel circuit means for receiving a pulse input and providing an output extending throughout a predetermined longer period.

A further object is to provide a novel tube selector for rendering a predetermined one of a plurality of cathode ray tubes responsive in accordance with a predetermined address pattern.

A still further object is to provide novel selecting circuits to energize a single cathode ray tube in response to selective voltage values determined by the values of the voltages used to correspond to the cathode ray tube address and the choice of address positions to permit storage at the addresses of each tube, one at a time.

Other objects of the invention will be pointed out in the following description and claims and illustrated in the accompanying drawings, which disclose, by way of example, the principle of the invention and the best mode, which has been contemplated, of applying that principle.

In the drawings:

FIGS. 1A, 1B, 1C, 1D, and 1E, when arranged as illustrated in FIG. 1F, comprise a block diagram of the binary-decimal electrostatic storage system of the invention;

FIGS. 2A, 2B, 2C, and 2D illustrate the arrangement of the address locations on the faces of the cathode ray tubes of FIG. 1C;

FIG. 3 is a chart which correlates the operation of the regeneration counter of FIG. 6 to the selection of the addresses illustrated in FIGS. 2A–2D;

Figure 6B:
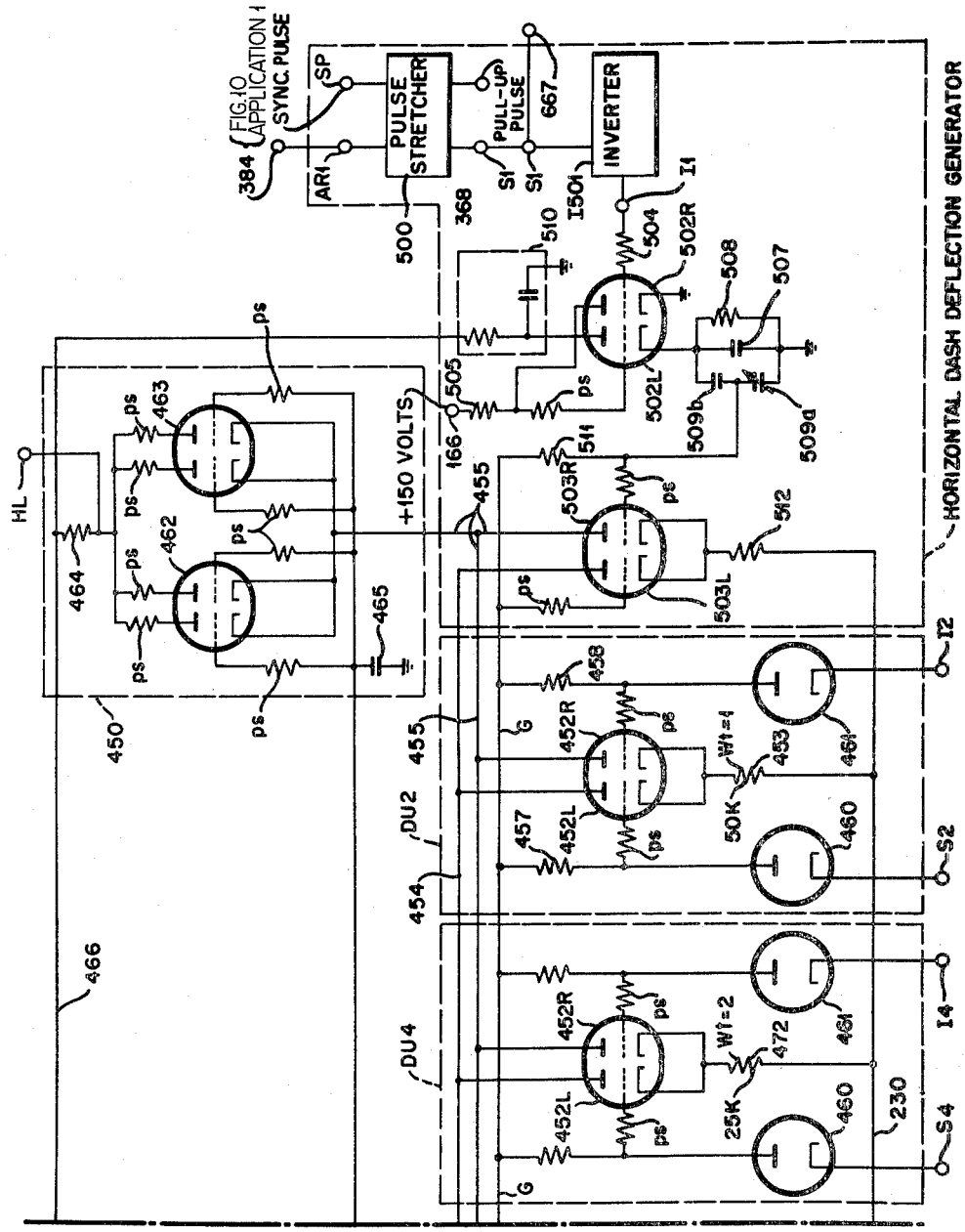
Figure 7B:
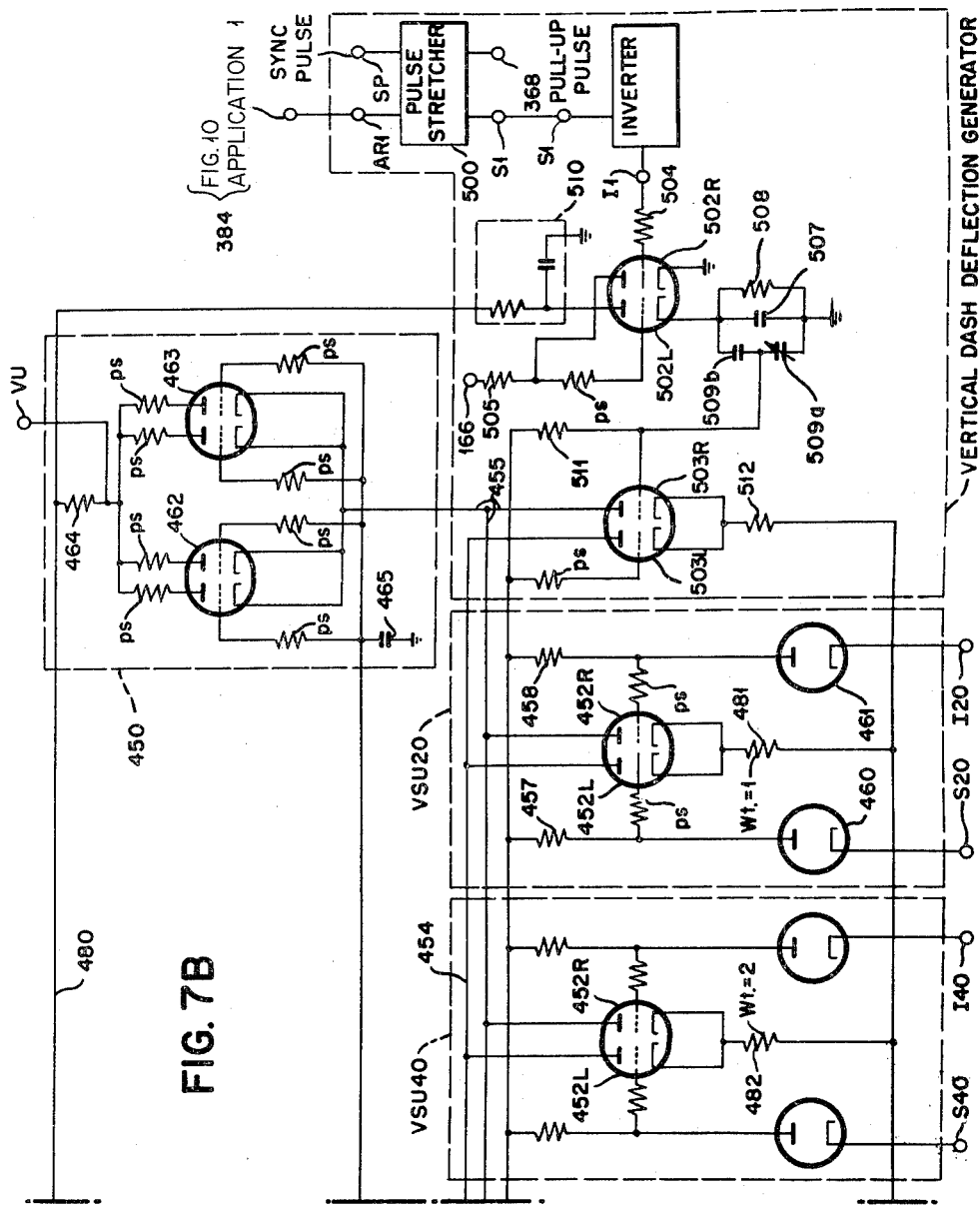
Figure 12:
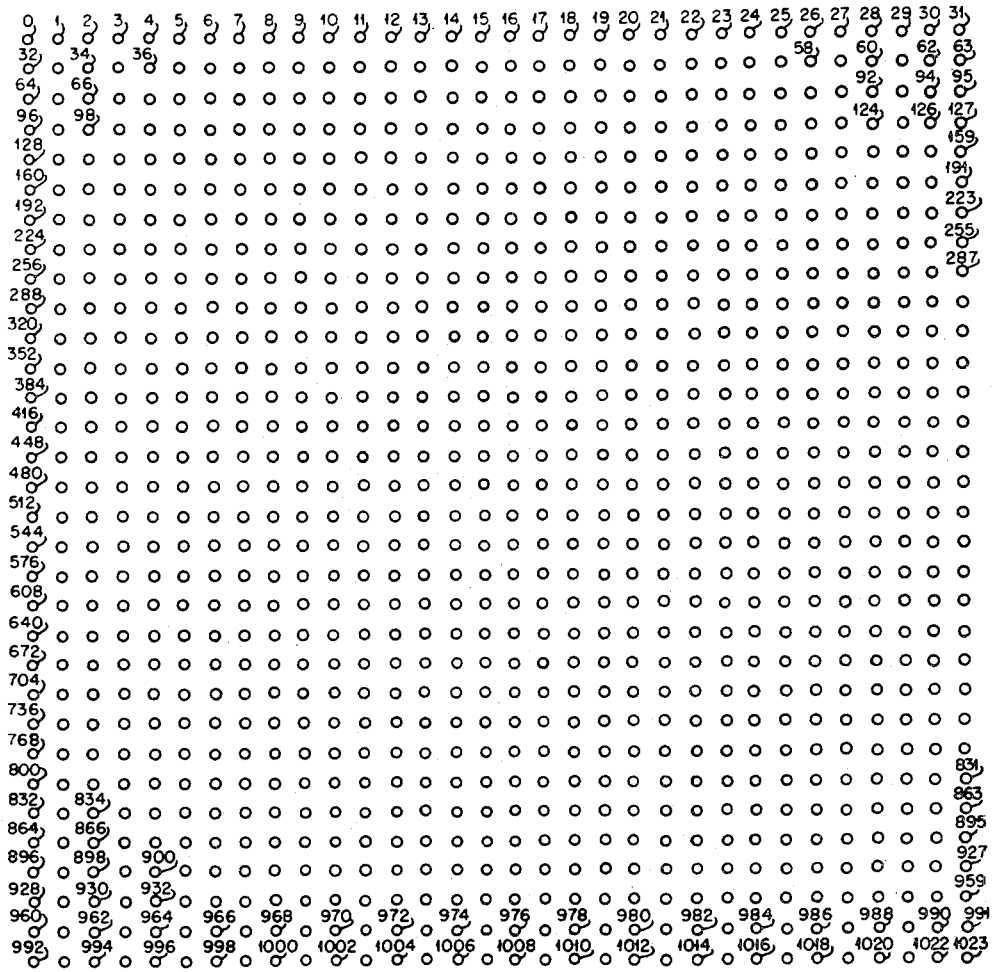

FIGS. 6A and 6B, when arranged as shown in FIG. 6C, comprise the horizontal deflection circuit;

FIGS. 7A and 7B, when arranged as shown in FIG. 7C, illustrate the vertical deflection circuit;

FIG. 8A illustrates the waveforms associated with the bit sweep generators included in FIGS. 6 and 7;

FIGS. 8B and 8C illustrate the potential gradients present when information is stored on a cathode ray tube;

FIGS. 9A and 9B, arranged as shown in FIG. 9C, comprise a binary type embodiment of an electrostatic storage system;

FIG. 10 shows waveforms present at the output of the timer of FIG. 9;

FIGS. 11A and 11B, when arranged as shown in FIG. 11C, comprise the circuit diagram of the regeneration-action switch shown in block diagram form in FIG. 9A;

FIG. 12 illustrates the arrangement of the address locations utilized by the embodiment of FIG. 9; and FIGS. 13A and 13B, arranged as shown in FIG. 13C, form the circuit diagram of the deflection circuits of FIG. 9B.

Briefly, in the binary-decimal storage system shown herein, a regeneration counter is provided for generating sequential voltages representative of each binary decimal digit from 0–1999 inclusive, corresponding to the 2,000 addresses. Four cathode ray tubes, each of which provides storage facilities for 500 binary bits, are connected in parallel to accommodate the storage of one binary bit at each of the 2,000 addresses. Hence 4×4 or 16 cathode ray tubes are required to effect the storage of one binary-decimal digit or position. A tube selector is employed to select one of each four parallel connected cathode ray tubes for operation during each cycle.

The output terminals of the regeneration counter and a similar group of terminals for receiving similar voltage values, from a suitable source such as a computer, are connected to the inputs of a two-position electronic address switch which permits transfer of voltages from the latter group of terminals during an action cycle when information is to be read in or out at preselected addresses and permits transfer of the voltages from the regeneration counter during a regeneration cycle when information stored is to be refreshed or regenerated. Each regeneration and action cycle is preformed in eight microseconds. The regeneration cycle is continuously repeated unless an action cycle is called for by the application of a predetermined potential to the address switch.

Each of the one microsecond voltages supplied by the switch is applied to a pulse stretcher to provide a voltage present during the entire eight microsecond cycle and used for effecting the selective positioning of the electron beam and operation of the tube selector.

The outputs of the pulse stretchers are selectively connected through inverters to the horizontal and vertical deflection circuits and the tube selector to effect beam deflection and cathode ray tube selection in accordance with the binary-decimal digits represented by the various voltages. The various voltages are assigned weighted values consistent with the address raster employed and effect a horizontal or vertical beam deflection, as the case may be, in accordance with that weighted value.

These weighted values are transferred into actual beam deflection by similar horizontal and vertical deflection circuits which control the voltage at the horizontal and vertical deflection plates, respectively, of the cathode ray tubes. Each deflection circuit includes a group of switches for individually switching their current flow between two constant voltage lines having a current flow of constant value. Voltage stabilizing means are confiected between each constant voltage line and the corresponding pair of deflection plates to provide a voltage change thereat proportional to the current change in that constant current line. Hence, beam deflections are provided in accordance with the voltages presented by the regeneration counter and the computer.

A binary 0 is stored as a dot and a binary 1 is stored as a dash. A dot is written by turning on the beam when it is stationary. A dash is written by first writing a dot followed by turning on the beam when it is selectively moved under the influence of a bit sweep generator.

In the defocus-dash system shown, the beam is defocused when a dot is written and focused only during the movement of the beam when a dash is written.

A pickup plate is in abutment with the face of each cathode ray tube to effect read out therefrom. The signal read out is applied to a video amplifier and if positive represents a dash and if negative represents a dot.

The turning on of the beam to effect read out causes a new dot to be written. Hence, if the output of the video amplifier is negative the beam is then turned off and if positive the beam is allowed to remain on to effect destruction of the new dot and the writing of a dash.

Detector means are employed to determine whether the signal is a dot or dash. The resulting manifestation is stored in a pulse stretcher which indicates the presence of a dot or a dash by a signal of a predetermined time duration appearing at a certain terminal. Circuits connect this terminal to a data line terminal which is UP during a certain time to indicate a dash and DOWN during that time to indicate a dot. If a dash is present a dash termination pulse effects circuits to cause the electron beam to be cut off at the beginning of the next cycle after the storing or regeneration of the dash is completed. Hence, the circuit operation during a regeneration cycle and an action read out cycle is identical.

An action read in cycle is initiated by causing a read in control terminal to be UP. This permits the stored information to be again read out at the data line terminal and prevents that information from being again stored. The new information to be stored is applied to the data line terminal and transferred into storage.

Throughout this application reference is made to the following co-pending applications for the disclosure of various circuits identified herein. The reference to these applications is by numerical designations associated therewith:

(1) Electrostatic Storage System, Deerhake et al., Serial No. 444,253, filed July 19, 1954.

(2) Regeneration and Octal Counter, Borders, Serial No. 444,251, filed July 19, 1954.

(3) Pulse Delay Circuit, Havens, Serial No. 336,464, filed February 11, 1953, now Patent No. Re. 23,699, issued August 18, 1953.

Figure 1E:
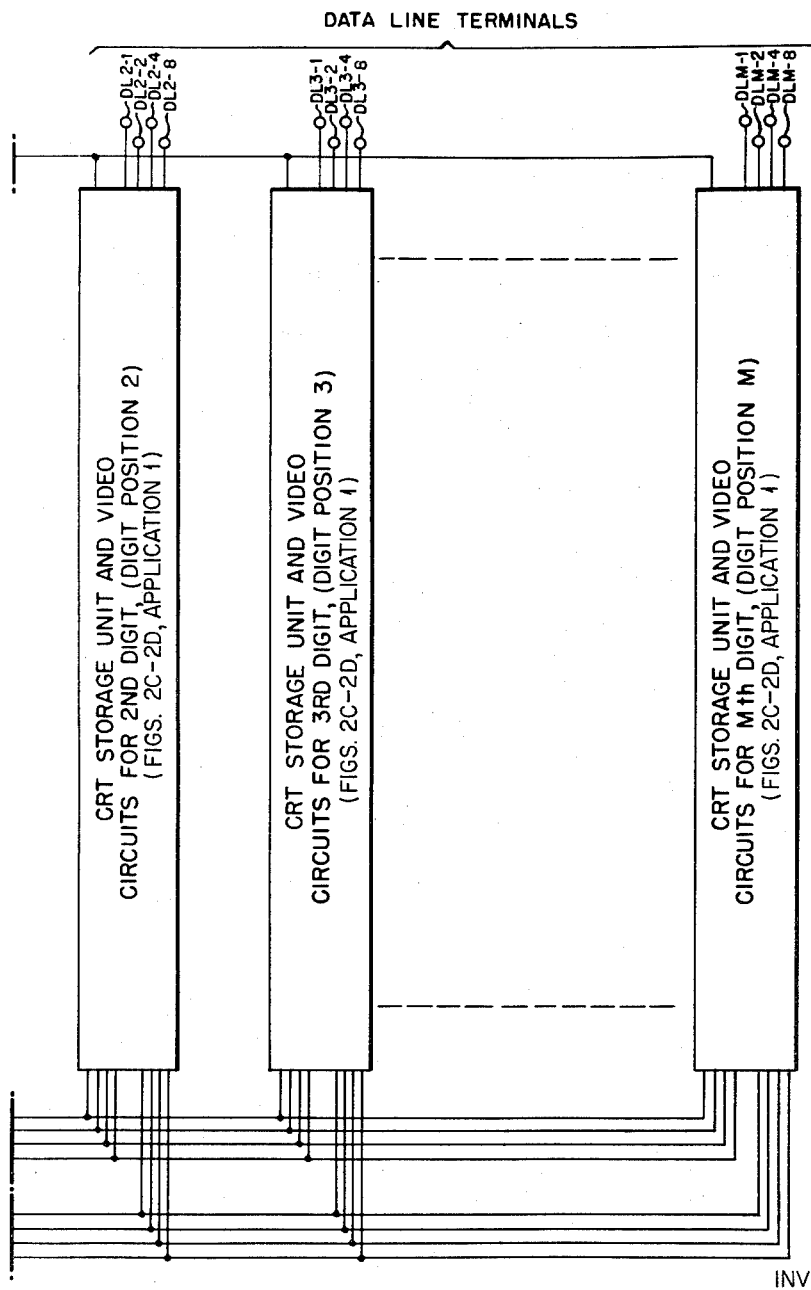

Various commonly known circuits are employed by the invention which are illustrated herein by rectangles having a descriptive designation therein. For example, the commonly known AND circuit is designated by a rectangle having the word "AND" printed within the rectangle. In order to simplify the present application the actual circuitry utilized for a particular AND circuit, for example, is not shown herein but each of the various circuits frequently employed are described in FIGS. 1A–1T of application No. 1 recited hereinabove. In application No. 1, the following figures thereof illustrate the recited circuits: FIGS. 1A–1D, AND circuit; FIGS. 1E–1H, OR circuit; FIGS 1I–1L, Cathode Follower circuit; FIGS. 1M–1N, Inverter circuit; FIGS. 1P–1Q, Blocking Oscillator; FIGS. 1R–1T, Delay Circuit; and FIG. 3, Binary Adder. The description of the above-identified circuits set forth in application No. 1 is incorporated herein by reference.

*General description of binary-decimal CRT storage system*

Referring more particularly to FIGS. 1A–1E, a block diagram of a complete cathode ray tube storage system for use in a digital computer is shown. To realize this diagram, FIGS. 1A–1E are to be arranged as shown in FIG. 1F.

In operation the storage system performs either a regeneration or action cycle. During a regeneration cycle terminal AR of FIG. 1A must be UP as determined by external circuitry. When terminal AR is UP, the regeneration counter of FIG. 1A is operative to supply address information which sequentially positions the beams of the cathode ray tubes to numerically succeeding addresses during succeeding regeneration cycles.

The regeneration counter (illustrated in FIGS. 6B and 6D of application No. 1) counts from 0 through 1999 and is advanced one decimal digit each time a regeneration cycle is executed. The decimal number contained within the counter is manifested on its output terminals D1–D1000 as the summation of the decimal numbers represented by those terminals which are UP. For example, if the counter stands at the decimal number 843, the terminals D800, D40, D2, and D1 are UP, while the remaining terminals are DOWN. During a first regeneration cycle, for example, all of the output terminals are DOWN so as to represent address 0. During the second regeneration cycle terminal D1 is UP, thereby indicating address 1. At the onset of the next regeneration cycle only terminal D2 is UP representing address 2. Similarly during the fourth regeneration cycle address 3 is represented by terminals D1 and D2 being UP. This sequential operation of the regeneration counter continues until 2000 regeneration cycles are executed whereupon the complete cycle is repeated.

The output terminals D1–D8000 of the regeneration counter are connected to a first set of input terminals of the address switch of FIG. 1A. The terminals A1–A8000 comprise a second set of input terminals to the address switch. If a regeneration cycle is to be executed, the input terminals D1–D8000 are connected to the output terminals AR1–AR8000, respectively, of the address switch. However, during an action cycle the input terminals A1–A8000 of the address switch are, respectively, connected to the output terminals AR1–AR8000.

The address information applied to either set of input terminals of the address switch is read out and appears on the output terminals AR1–AR8000 during the time interval N.00–N.10 of any eight microsecond cycle.

Unless an action cycle is to be executed, the system performs successive regeneration cycles. Terminal AR is always UP except when an action cycle is to be performed, during which time it is caused to be DOWN. As long as terminal AR is UP continuously, the regeneration counter continues to advance with each regeneration cycle. During the time that an action cycle is performed, the regeneration counter will not advance but will retain the value contained therein. The counter will then be advanced from N.10–N.20 of the next succeeding regeneration cycle.

By causing the storage system to execute successive regeneration cycles at all times except when an action cycle is performed, the information stored on the cathode ray tubes is not permitted to remain for any appreciable time without being regenerated. Furthermore, time is not wasted as would be the case where unused or blank action cycles are executed.

In FIG. 1A the output terminals AR1–AR8000 are each connected to the input of a pulse stretcher. The purpose of the pulse stretchers is to convert the address information appearing on terminals AR1–AR8000, respectively, from N.00–N.10 time as UP signals, to DOWN signals which exist for a complete cycle (N.00 to N+1.00) on the terminals S1–S8000 of FIG. 1B. Each pulse stretcher "stretches" a 1 microsecond pulse into an eight microsecond pulse.

Thus, if the address information present on terminals AR1–AR8000 represents address 843, for example, the terminals AR800, AR40, AR2, and AR1 will be operated so that the output terminals S800, S40, S2, and S1 of FIG. 1B will be DOWN for eight microseconds commencing at approximately N.00 time.

The output terminals S1–S1000 of FIG. 1B are each connected to the input of an inverter tube. The outputs of the inverters are labeled I1–I1000 respectively, corresponding to the input terminals S1–S1000. The address 843, for example, is represented by a DOWN voltage at terminals S800, S40, S2 and S1 during an action cycle. This means that terminals I800, I40, I2 and I1 are UP during this time.

The terminals S2, S4, S8, S10, S100, and their corresponding terminals I2, I4, I8, I10, and I100 are connected to the horizontal deflection circuit of FIG. 1B. The horizontal deflection circuit comprises five individual switching units, each of which provides a predetermined increment of horizontal deflection of the beams of the cathode ray tubes. These increments of deflection are referred to hereinafter as deflection weights and are enumerated in the lower portion of the rectangle representing the horizontal deflection circuit of FIG. 1B and each is related to the terminals which provide that deflection weight. The horizontal deflection weights provided are 1, 2, 4, 5, and 10. If a total horizontal deflection of zero is required, none of the deflection weight quantities are employed or energized. By energizing the weight 1, a horizontal deflection of one position is secured. In order to provide a total horizontal deflection weight of eight for effecting beam deflection for eight positions the deflection weight quantities 1, 2, and 5 must be energized.

In FIG. 1B the horizontal deflection weights of 1, 2, 4, 5, and 10 are associated respectively with the pairs of input terminals S2, I2; S4, I4; S8, I8; S10, I10; and S100, I100. A horizontal deflection weight of zero is provided when terminals S2, S4, S8, S10, and S100 are UP, and terminals I2, I4, I8, I10, and I100 are DOWN. As a further example, if terminal S2 is DOWN and I2 is UP, a total horizontal deflection of 1 is secured. A total deflection weight of eight is provided when terminals S2, S4, and S10 are DOWN, terminals I2, I4, and I10 are UP, and the remaining terminals are in the positions indicated for a deflection of zero.

The incremental switching units contained within the horizontal deflection circuit control the potentials appearing at the output terminals HR and HL. Terminals HR and HL of FIG. 1B are connected respectively to the right-hand and left-hand horizontal deflection plates of each of the cathode ray tubes CRT A, B, C and D of FIG. 1C. When the horizontal deflection circuit of FIG. 1B is providing a deflection weight of zero, the potential of terminal HL is most positive while the potential of terminal HR is most negative. This condition places the beams of the cathode ray tubes CRT A, B, C, and D of FIG. 1C at the extreme left-hand edges of their respective rasters or storage patterns. Similarly, if terminals HR and HL are at their most positive and most negative potentials respectively, the beams of the cathode ray tubes of FIG. 1C will be located at the right-hand extremeties of their individual rasters. It is evident that if the potentials of terminals HR and HL are between those two extremes, the beams of the cathode ray tubes are positioned to an address location intermediate the left and right-hand edges of the rasters.

Since the horizontal deflection plates of the cathode ray tubes of FIG. 1C are connected in parallel, the horizontal deflection of each tube is identical with that of the others and is controlled by the horizontal deflection circuit of FIG. 1B.

In FIG. 1B the terminals S20, S40, S80, S200, S400, S800 and the terminals I20, I40, I80, I200, I400, and I800 are connected to the inputs of the vertical deflection circuit which operates in a manner similar to that described for the horizontal deflection circuit. The incremental switches of the vertical deflection circuit provide the vertical deflection weights of 1, 2, 4, 5, 10, and 20. A vertical deflection of thirteen positions, for example, is provided by energizing the quantities 1, 2, and 10. Accordingly, if none of the vertical deflection weights is energized, a vertical deflection of zero is provided.

The vertical deflection weight quantities 1, 2, 4, 5, 10, and 20 of FIG. 1B are associated respectively with the pairs of input terminals I20, S20; I40, S40; I80, S80; I200, S200; I400, S400; and I800, S800. As in the case of the horizontal deflection circuits, when all of the S terminals are UP and the I terminals are DOWN, a vertical deflection of zero is provided. A vertical deflection of one position is provided, for example, when terminals I20 and S20 are caused respectively to be UP and DOWN. Thus, by causing a particular I terminal to go UP and its associated S terminal to go DOWN, the deflection weight associated with that pair of terminals will be energized.

The potentials on terminals VU and VL are respectively at their most positive and most negative values when none of the deflection weight quantities is energized. The reverse is true when all of the deflection weights are energized.

The terminals VL and VU of FIG. 1B are respectively connected to the lower and upper vertical deflection plates of the cathode ray tubes CRT A, B, C, and D of FIG. 1C. Terminal VU is positive with respect to VL, and the maximum potential difference exists therebetween when none of the vertical deflection weights is energized. This situation causes the beams of the cathode ray tubes CRT A, B, C, and D of FIG. 1C to be located at the extreme upper edge of their respective rasters. When terminals VL and VU are at their most positive and most negative potentials respectively, the beams of the cathode ray tubes are located at the bottom edge of their respective rasters. Accordingly, by causing terminals VL and VU to be at the proper potentials, the beams of the cathode ray tubes can be oriented at any desired vertical position within the rasters.

It is now apparent that the beams of the cathode ray tubes CRT A, B, C, and D of FIG. 1C can be located at any selected position by causing predetermined horizontal and vertical deflection weights to be energized. The deflection weights energized are determined by the address information present at the output terminals AR1–AR1000 of the address switch of FIG. 1A. As stated hereinbefore, this address information is supplied by the regeneration counter during regeneration cycles, and by the terminals A1–A1000 (FIG. 1A) during action cycles. The terminals S2000–S8000 (FIG. 1B) are not used because only the addresses 0–1999 are employed by the embodiment shown.

A dot is written on the face of a cathode ray tube, in order to store a binary zero, by turning on the electron beam for a predetermined time interval while it remains stationary. A dash is written on the face of a cathode ray tube, in order to store a binary one, by first writing a dot then turning on the beam while it is being deflected a small predetermined amount. The horizontal and vertical deflection circuits of FIG. 1B each include a bit sweep generator which causes the beams of the cathode ray tubes (FIG. 1C) to be deflected above the referred to predetermined amount after those beams are positioned to a particular address location.

The beams of the cathode ray tubes are allowed to be stationary from N.40–N.46 time during which a dot can be written. From N.46–N+1.06 time the beams undergo a small linear deflection so that a dash can be written.

A voltage pulse existing from N.40–N.50 time of each cycle is applied to terminals 384 (FIG. 1B) of the vertical and horizontal deflection circuits in order to initiate the action of the bit-sweep generators. The bit-sweep generator associated with the horizontal deflection circuit causes an incremental deflection to the left, while the generator associated with the vertical deflection circuit causes an incremental deflection upwards. The combined action of the horizontal and vertical bit-sweep generators is to produce an oblique deflection.

The cathode ray tube storage system described herein utilizes a defocus-dash system wherein the beams of the cathode ray tubes are defocused during the time that a dot may be written and are focused during the time that a dash may be written. The output of a pulse stretcher associated with the horizontal bit-sweep generator appears on terminal 667 of FIG. 1B which is UP from N.06–N.46 time and DOWN from N.46–N+1.06 time of every cycle. This voltage pulse is applied to the defocus pulse inverter (FIG. 1B) and the inverted pulse appears at the output terminal 671 thereof. Terminal 671 is capacitively coupled to the focusing anodes of each of the cathode ray tubes CRT A–D (FIG. 1C).

The output terminals S1 and S1000 of the pulse stretchers (FIG. 1B) and the output terminals I1 and I1000 of the inverters (FIG. 1B) are connected to the input of the tube selector circuit TS (FIG. 1B).

The purpose of the tube selector circuit TS is to utilize the address information appearing on terminals S1, S1000, I1, and I1000 and determine the cathode ray tube CRT upon which a particular address appears. A raster of each cathode ray tube contains 500 addresses or beam positions. The even-numbered addresses in the range 0–998 are located on cathode ray tube CRT A, the odd-numbered addresses 1–999 are located on CRT B, the even-numbered addresses 1000–1998 are located on CRT C, and the odd-numbered addresses 1001–1999 are located on CRT D.

Due to the fact that the beams of the four cathode ray tubes (FIG. 1C) are controlled by the same horizontal and vertical deflection circuits, i.e., operated in parallel, they will be simultaneously positioned to four different addresses. For example, if the beams of cathode ray tubes CRT A, B, C, and D are located in the upper left-hand corners of their respective rasters, they are located at addresses 0, 1, 1000, and 1001, respectively. The tube selector circuit must utilize the address information applied to its input terminals to select one of these four addresses.

If, for example, terminals I1 and I1000 of the tube selector circuit TS (FIG. 1B) are UP, the address selected is odd and greater than 1000, and thus appears on CRT D. If the terminals I1 and S1000 are UP, the selected address is odd and less than 1000 thereby appearing on CRT B. Depending upon which tube the selected address appears, the appropriate one of the terminals TSA, TSB, TSC, and TSD is UP. That is, if the selected address appears on CRT A, terminal TSA is UP; or if it appears on CRT C, terminal TSC is UP.

The terminals TSA–TSD (FIG. 1C) are connected respectively to the input terminals 10B of the AND circuits 620a–623a (FIG. 1D). The input terminals 10A of these AND circuits are commonly connected to terminal 616. In operation, terminal 616 is UP from N.40–N.46 when a dot is to be written into storage and is UP from N.40–N+1.00 time when a dash is to be written. In order for the voltage pulse appearing on terminal 616 to be passed by one of the AND circuits 620a–623a, both of the input terminals 10A and 10B thereof must be UP. The AND circuits 620a–623a are associated respectively with cathode ray tubes CRT A–D (FIG. 1C). Thus, if terminal TSA (FIG. 1C) is UP, for example, the AND circuit 620a (FIG. 1D) is operable in response to the signal appearing on terminal 616. Accordingly, if terminal TSD is UP, AND circuit 623a is similarly operable.

The output terminals of the AND circuits 620a–623a respectively are connected to the inputs of the pulse shaper circuits 624–627 (FIG. 1D). The output terminals 637–640 of the pulse shaping circuits 624–627 are capacitively coupled to the control grids of the cathode ray tubes CRT A–D (FIG. 1C), respectively. Thus, when one of the terminals 637–640 (FIG. 1D) is UP during a given action or regeneration cycle, the control grid of the corresponding cathode ray tube is UP.

By causing the control grid of a cathode ray tube to be UP, the tube is rendered slightly conductive, i.e., the beam is turned on, and information is thereby written or stored on the face thereof. When terminal 640 (FIG. 1D) is UP, for example, a dot or a dash is stored on CRT D (FIG. 1D) depending upon whether a dot or a dash signal appears on terminal 616 (FIG. 1D).

It is now apparent that the address information supplied to the tube selector circuit TS (FIG. 1B) causes one of the four cathode ray tubes to be selected and a dot or a dash written on the face of the selected cathode ray tube upon which the address appears.

Referring to FIG. 1C, a conductive pick-up plate abuts the face of each of the four cathode ray tubes CRT A–D of the storage unit for accommodating storage of the 1 bit. These pick-up plates are commonly connected to the terminal PU1 (FIG. 1D). The suffix 1 of the designation PU1 indicates that this terminal is associated with the binary 1 bit of the binary-decimal digits stored.

In order to read the information (dot or dash) stored at an address, the beam of the cathode ray tube is turned on during N.40–N.46 time at which time the beam is stationary, i.e., bit-sweep inoperative. This turning on of the beam causes a new dot to be written on the face of the tube, and the information previously stored at this address to be destroyed. The destruction of the old information indicates whether a dot or a dash was previously stored. This destruction causes a video signal to be capacitively coupled to the pick-up plate associated with the tube whereon the destruction and the writing of the new dot occurred. If the video signal appearing on the pick-up plate during N.40–N.46 time is predominantly positive, the information previously stored was a dash; if the signal is predominantly negative during this time, a dot was previously stored. When the new information to be stored is a dot, the beam is turned off for the remainder of the cycle (N.46 to N+1.00) since a dot has already been written. However, if a new dash is to be stored, the beam is allowed to remain on for the remainder of the cycle (N.46 to N+1.06) and the bit-sweep operated to cause the new dot to be destroyed and a new dash to be written.

Whenever a regeneration cycle is executed, the information read from the face of a cathode ray tube is restored at the address from which it was read. The video circuits (FIG. 1D) turn off the beam at N.46 time when a dot is being regenerated and permit the beam to remain on until N+1.06 time when a dash is being regenerated.

Referring to FIG. 1D, the video signal appearing on terminal PU1 is amplified by the video amplifier and delivered via terminal 566 to the detector and pulse stretcher No. 1. The detector and pulse stretcher No. 1 determines whether the signal presented to its input represented a dot or a dash.

The ON pulse generator (FIG. 1D) utilizes a sync pulse and a voltage pulse occurring from N.20–N.30 time in order to generate the ON pulse which exists at terminal 704 during N.40–N.44 of every cycle. This ON pulse is applied to the pulse stretchers No. 1 and No. 2.

The application of the ON pulse to pulse stretcher No. 1 causes the output terminal 596 thereof to go UP at N.40 time. Terminal 596 is caused to go DOWN at N.46 time only if the input terminal 566 is UP at this time (dot signal present); otherwise terminal 596 remains UP (dash signal present). Hence, if the signal at terminal 566 signified a dot, the output terminal 596 is UP from N.40 to N.46 time. But if a dash signal was present, terminal 596 remains UP until it is caused to go DOWN during a later cycle as the result of the receipt of a dot signal.

The voltage pulse appearing at the output terminal 596 of the pulse stretcher No. 1 is applied to terminal 43A of OR circuit 605 (FIG. 1D), causing this circuit to be operated so as to deliver the pulse to the input of pulse stretcher No. 2. The input terminal 43B of the OR circuit 605 is DOWN during regeneration cycles and action-read cycles.

The output terminal 616 of pulse stretcher No. 2 is always caused to go UP at N.40 time for every cycle because of the ON pulse from terminal 704. If the voltage pulse applied to the input of pulse stretcher No. 2 goes DOWN at N.46 time (a dot signal present), the output terminal 616 thereof is caused to go DOWN at this time. However, if the input of pulse stretcher No. 2 remains UP (dash signal present), terminal 616 will remain UP until N+1.00 time (end of current cycle) when it is caused to go DOWN by the N.00 pulse present at terminal 380.

Thus, terminal 616 is UP from N.40–N.46 time if a dot is read out from an address on one of the cathode ray tubes, and is UP from N.40 to N+1.00 time if a dash is read out therefrom. The manner in which information present on terminal 616 is stored on a cathode ray tube has been generally described hereinabove.

The output terminal 596 of pulse stretcher No. 1 is connected to one input of the read-in, read-out circuits (FIG. 1D). During a regeneration cycle the read-in, read-out circuits use the voltage pulse present at terminal 596 to cause the data line terminal DL1–1 to be UP from N.50–N.60 if terminal 596 is UP during this time, i.e., if a dash was previously stored. In the reference character DL1–1 the first digit refers to the binary-decimal column, and the second or suffix digit refers to the binary bit accommodated.

External circuits which are to utilize the information read out from the CRT storage system can be connected to terminal DL1–1. Also information to be read in to the cathode ray tube storage system is applied to this same data line terminal.

During an action cycle, in which information is read out from the cathode ray tubes, the operation of the circuits of FIGS. 1C and 1D is identical to that for a regeneration cycle. That is, video information read from the face of a cathode ray tube is amplified, detected for the presence of a dot or a dash, re-stored at the address from which it was read, and is manifested at the output terminal DL1–1 as the presence or absence, respectively, of an UP voltage condition during N.50–N.60 time depending upon whether a dash or a dot was read from storage.

New information is stored or read in to the cathode ray tubes (FIG. 1C) during an action read in cycle.

A read in cycle is initiated by causing the read in control terminal RIT (FIG. 1D) to be UP from N.40–N.50. When terminal RIT is UP, the read in control circuit causes terminal 43B of OR circuit 605 to be UP from N.40 to N+1.00.

During a read in cycle, the information previously stored at the selected address on a cathode ray tube is read out, amplified by the video amplifier, and a voltage pulse is caused to appear on the output terminal 596 of pulse stretcher No. 1 and terminal 43A of OR circuit 605 as described hereinbefore. The information read out is again manifested on terminal DL1–1 from N.50–N.60. The fact that terminal 43B of OR circuit 605 is UP from N.40 to N+1.00 time prevents the voltage pulse present on terminal 43A from rendering this OR circuit operative. Hence, there is no effect upon the input terminal 10A of pulse stretcher No. 2.

If terminal RIT is UP (N.40–N.50), conductor 715A is DOWN during this interval. The potential on conductor 715A controls a portion of the read in, read out circuits which permit a voltage pulse on terminal DL1–1 to effect the potential on terminal 10C of pulse stretcher No. 2.

During a read in cycle new information is read into the cathode ray tube storage system by applying it to the data line terminal DL1–1 during the time N.40–N.50. Terminal DL1–1 must be caused by a suitable external means to be UP (N.40–N.50) if a dash is to read in, or to be DOWN if a dot is to be stored. When terminal DL1–1 is DOWN (N.40–N.50) or when a dot is to be stored, a negative pulse appears on input terminal 10C of pulse stretcher No. 2. However, if terminal DL1–1 is UP (N.40–N.50) terminal 10C remains UP.

The output terminal 616 of pulse stretcher No. 2 goes UP at N.40 time of every cycle as a result of the presence of the ON pulse at terminal 704 (FIG. 1D). If a dot is to be stored (terminal DL1–1 DOWN from N.40–N.50), the negative pulse applied to terminal 10C of pulse sretcher No. 2 causes the output terminal 616 thereof to go DOWN at N.46 time. If a dash is to be stored (terminal DL1–1 UP from N. 40–N.50), terminal 616 will remain UP until the end of the cycle or N+1.00 time. The pulse present on terminal 616 causes a dot or a dash to be written on a cathode ray tube as noted hereinbefore.

In FIG. 1C the cathode ray tubes CRT A–D provide facilities for storing the binary 1 bits of 2000 binary-decimal digits or addresses. The three additional rectangles shown accommodate the 2, 4, and 8 bits of the same 2000 binary-decimal digits, and are similar in circuitry to that described for the binary 1 bit.

In FIG. 1D, the video circuits shown within the dashed enclosure operate in conjunction with the CRT storage unit for the binary 1 bit of FIG. 1C. The video circuits for the 2, 4, and 8 bits shown (FIG. 1D) are identical to the circuit for the 1 bit, and operate conjointly with the CRT storage units for the 2, 4, and 8 bits (FIG. 1C). Accoringly, the circuits of FIGS. 1C and 1D accommodate the 1, 2, 4, and 8 bits of the extreme right-hand column (decimal digit position 1) of 2000 binary-decimal digits.

Referring to FIG. 1E, each rectangle represents circuits identical to those shown in FIGS. 1C and 1D, each rectangle therefrom provides complete storage facilities for an additional digit positon. Thus, the rectangles of FIG. 1E reading from top to bottom respectively accommodate digit positions 2, 3, and the Mth position of 2000 multi-digit decimal numbers.

The output terminals HR, HL, VL, and VU of the horizontal and vertical deflection circuits (FIG. 1B) are connected to each of the circuits of FIG. 1E as are the output teminals TSA–TSD of the tube selector circuit TS (FIG. 1B). Hence, the circuits of FIG. 1E are operated in synchronism with the circuits of FIGS. 1C and 1D. For example, if the address information supplied to the deflection and tube selector circuits (FIG. 1B) designates address 1, the beams of all of the cathode ray tubes (FIGS. 1C and 1E) will be positioned in the upper left-hand corner of their respective rasters, and all of the "B" tubes will be selected. The information read out from these tubes will appear on the data line terminals DL1–1 to DLM–8 (FIGS. 1D and 1E) from N.50–N.60 time.

The read in control terminal RIT of FIG. 1D is connected to each of the circuits of FIGS. 1D and 1E. Thus by causing terminal RIT to be UP from N.40–N.50 time, new information applied to the data line terminals DL1–1 to DLM–8 can be stored at the address selected. Where storage facilities are provided for a decimal number having M orders or positions the 1, 2, 4, and 8 bits of each position are simultaneously read in or read out of the circuits of FIGS. 1C, 1D, and 1E depending upon the operation specified. That is, all of the binary-decimal digits comprising a decimal number are read in or read out of the cathode ray tube storage system simultaneously or in parallel.

Hence, if a storage system accommodates 16½ columns of binary-decimal digits, then 66 binary bits of information are stored on 264 cathode ray tubes and the 66 line terminals are the input-output terminals of the storage system and constitute a 66 wire parallel transfer bus.

*Clamping and synchronous pulse source*

Figure 4B:
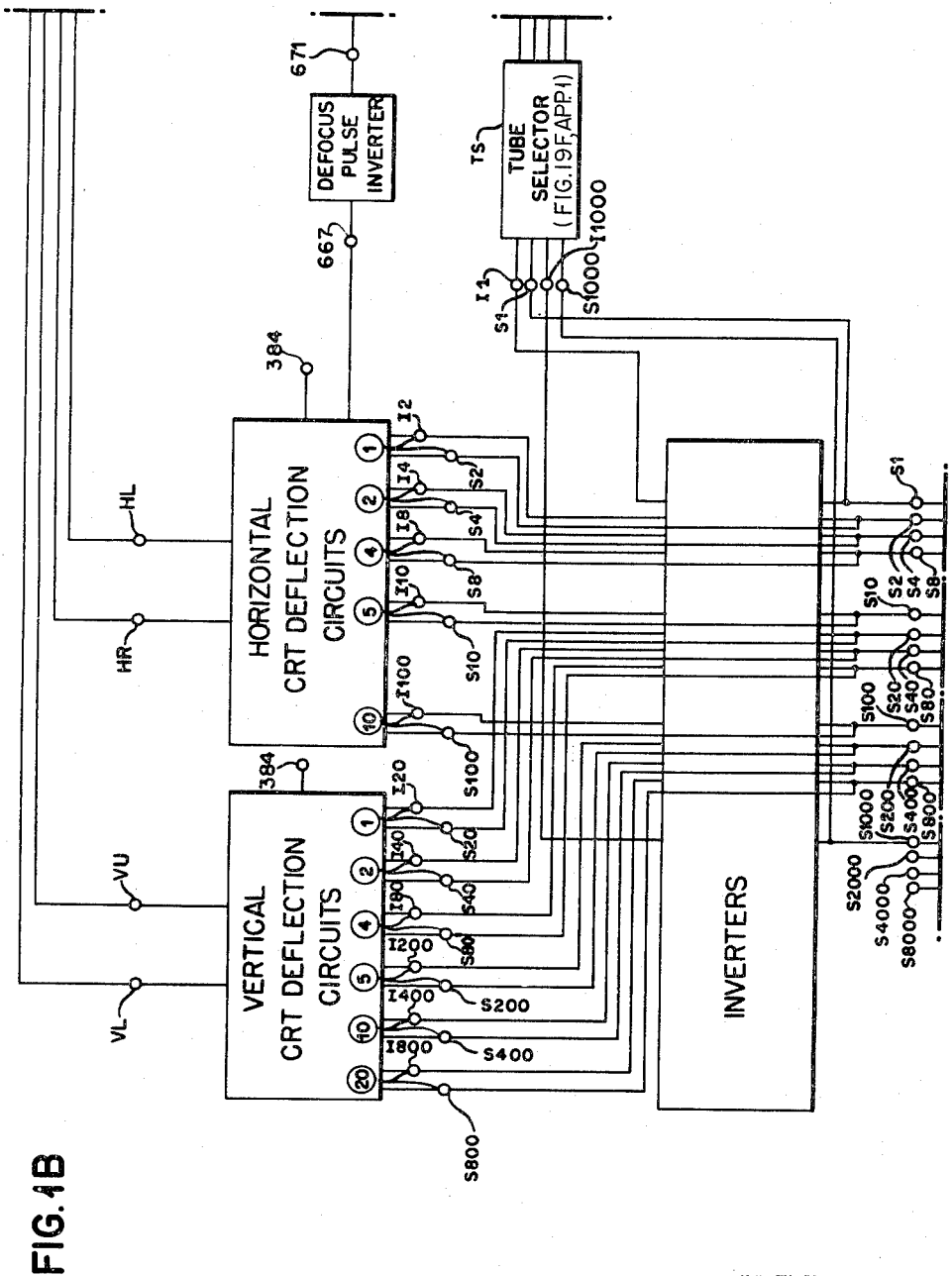
FIG. 4 is a chart which illustrates the weight of the horizontal deflection applied to the cathode ray tubes.

The source for producing the clamping and synchronous pulses referred to herein is described in application No. 1 in connection with the block diagrams of FIGS. 4A and 4B, and the idealized waveforms shown in FIG. 4C thereof.

The output of a single master timing pulse generator may be connected to twelve blocking oscillators which may supply forty clamp and sync signal generators, and these forty clamp and sync signal generators may supply a total of one hundred inverters and one hundred sync inverters. Hence, a single master timing pulse generator may be used to supply clamp and sync pulses to four hundred delay circuits, for example.

*Regeneration counter*

The operation of a single order of the regeneration counter is shown in FIG. 5A of application No. 1 and is described therein by conjoint reference to FIGS. 5A, 5B, 5C and 5D of said application.

The regeneration counter and the address switch represented in FIG. 1A of this application is disclosed in application No. 1 and is also disclosed and claimed in application No. 2 recited hereinabove. Briefly, the purpose of the regeneration counter is to supply representations of sequential addresses of the storage positions of the cathode ray tubes so as to direct the sequential regeneration of each address of said tubes. Referring briefly to FIG. 1A, the regeneration counter is operative to produce sequential address representations as long as terminal AR remains UP. However, when an action cycle is to be executed, external circuitry of a computer, for example, causes terminal AR to be DOWN which interrupts the advancement of the regeneration counter.

The outputs of the regeneration counter are connected to a first group of inputs of an address switch. Terminals A1 through A8000 of FIG. 1A are connected to a second group of inputs to the address switch. The terminals A1–A8000 are provided for connection to an address source, such as a register, of a high speed electronic computer so that a representation of the address which is to be utilized during an action cycle, is applied to said terminals. The signal on terminal AR also determines whether the action address on terminals A1–A8000 or the address supplied by the regeneration counter is to be passed through the switch and eventually applied to the deflection circuits. For a more complete description of the regeneration counter and the operation thereof, the reader is referred to the description thereof in application No. 1 which is incorporated herein by reference.

*Pulse stretcher*

The pulse stretchers employed in FIG. 1A are shown in FIG. 9 of application No. 1 and described therein. However, it is to be understood that any suitable circuit providing the functions described hereinbelow may be employed without departing from the invention.

The address information present at output terminals AR1–AR8000 of the address switch of FIG. 1A is present only during the time interval N.00 to N.10 of an action or a regeneration cycle. In order to successfully operate the deflection circuits which control the positioning of the beams of the cathode ray storage tube, it is necessary that address information be present during the entire action or regeneration cycles, as the case may be. A particular pulse stretcher provides such an address at output terminal S1 of FIG. 1B, for example, by stretching or extending the pulse received from the terminal AR1 of the address switch over the entire action or regeneration cycle. Hence, when input terminal AR1 is UP from N.00 to N.10, the output terminal S1 is UP for that entire eight microsecond cycle.

Figure 2A:
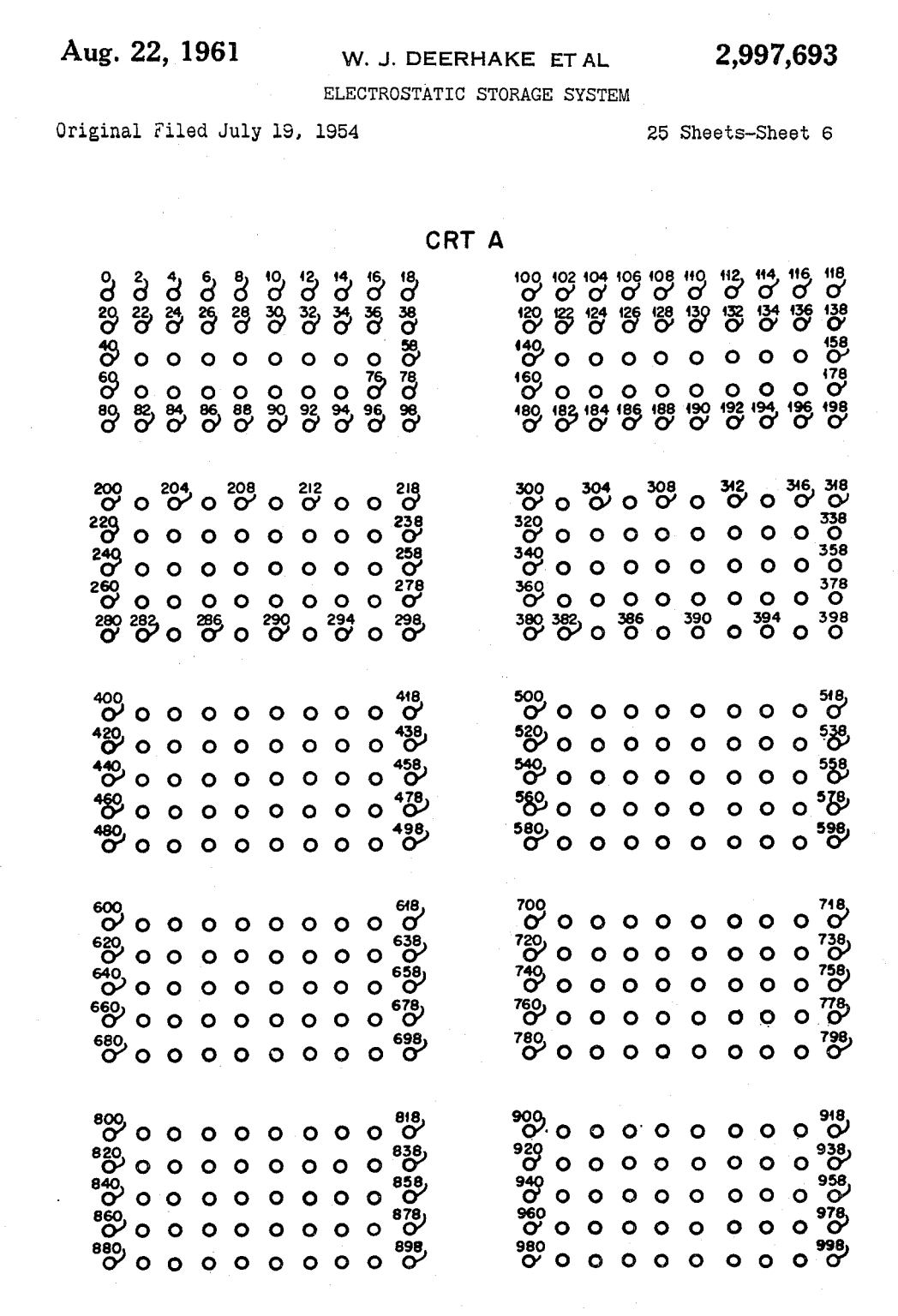

A similar pulse stretcher is provided to receive outputs from each of the output terminals AR2 through AR8000 of the address switch of FIG. 2A.

*Octal commutator*

Hereinafter reference is made to various one microsecond pulses N.0 through N.7. These pulses are provided by octal commutators of the type described in application No. 1 with respect to FIGS. 10 and 10A thereof, which is incorporated herein by reference.

*Connection of deflection circuits*

The actual connection of the deflection circuits is shown in FIGS. 1A and 1B. However, a complete understanding of these connections is dependent upon the understanding of the actual physical arrangement or display of information stored upon the face of the cathode ray tubes.

This arrangement or raster is explained in connection with FIGS. 2A, 2B, 2C, and 2D. From these figures, it is seen that the storage areas or positions on the face of each cathode ray tube are grouped into ten areas. Each of these areas includes ten vertical columns of storage area and five horizontal rows of storage area; each therefore includes 50 discrete beam positions or storage areas. Since there are ten such rectangular areas, the face of each cathode ray tube provides a total of 500 discrete beam positions and the cathode ray tubes CRT A–D provide a total of 2000 discrete beam positions. Such represents a storage capacity of 2000 bits and provides for a storage of one predetermined binary bit or order of one decimal digit or position of each word; for example, the lowest binary bit of the units order decimal digit or position of each of the 2000 words capable of being stored.

The various beam positions are designated on the drawings by circles and are assigned a decimal address number corresponding thereto. The upper left position of the upper left rectangular area of FIG. 2A is designated the zero beam position. The next beam position to the immediate right is the two position, next, the four position, and so on until the eighteenth position is found at the extreme right. The extreme left position of the next lower or second row is the twenty position, next the twenty-two position, and so forth. Finally, the last or the extreme right position on the fifth row is the ninety-eight position. Hence, this rectangular area includes all even-numbered beam positions from zero to ninety-eight inclusive.

The beam positions within the upper right rectangular area are similarly arranged and include all even-numbered positions from 100 to 198 inclusive. The next lower rectangular area on the left includes all even-numbered positions from 200 to 298 inclusive, and the area to its right all even-numbered positions from 300 to 398 inclusive.

This system of designations is continued and the lowest beam position at the extreme right is 998. Hence, CRT A provides for all even-numbered positions from zero to 998 inclusive.

Figure 2B:
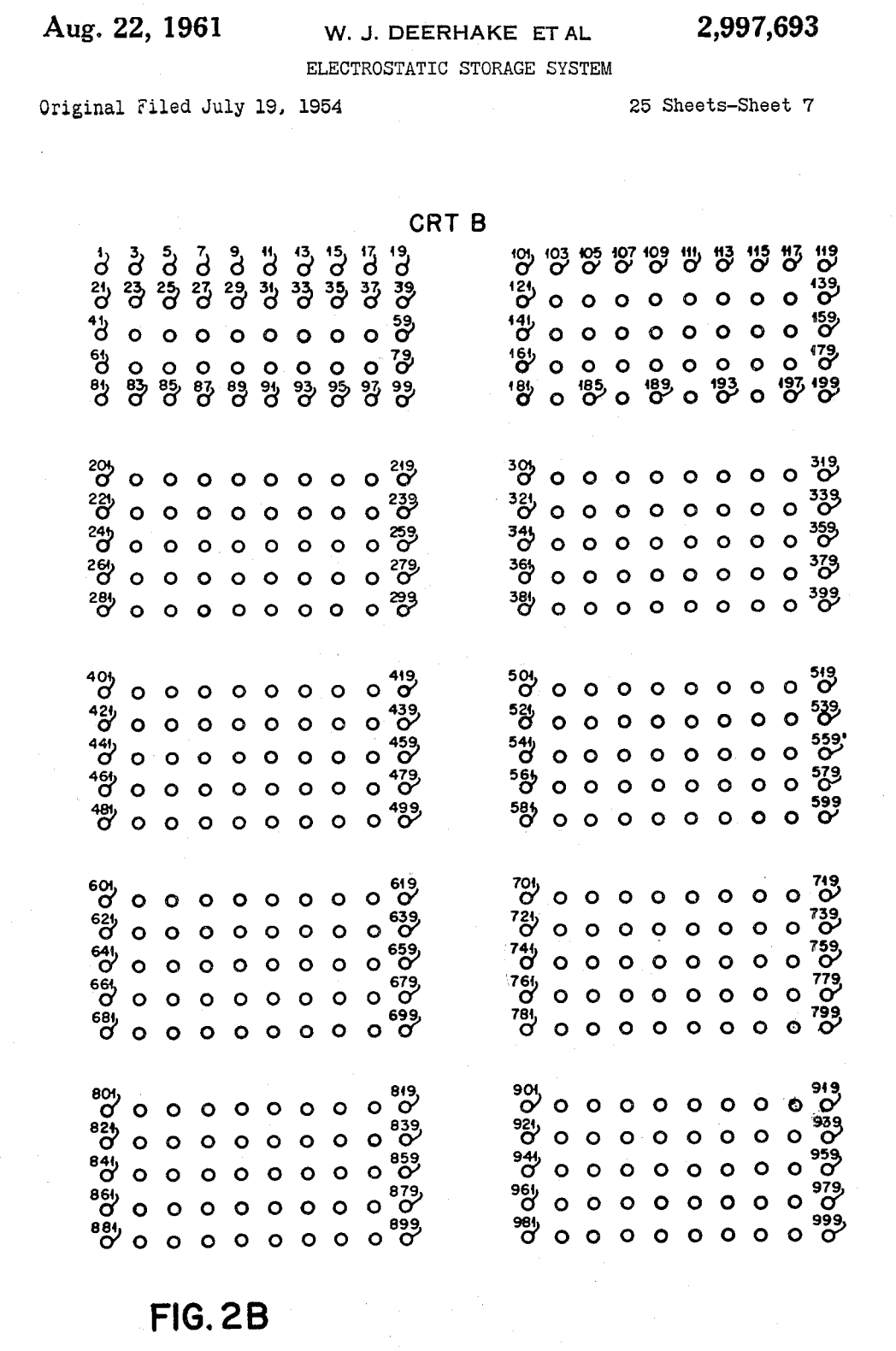

FIG. 2B shows the numbered beam positions for CRT B where position 1 corresponds to position 0 in FIG. 2A and position 3 to position 2 in FIG. 2A. This same scheme of designation is applied throughout so that CRT B provides for all odd-numbered positions from 1 to 999 inclusive.

Figure 2C:
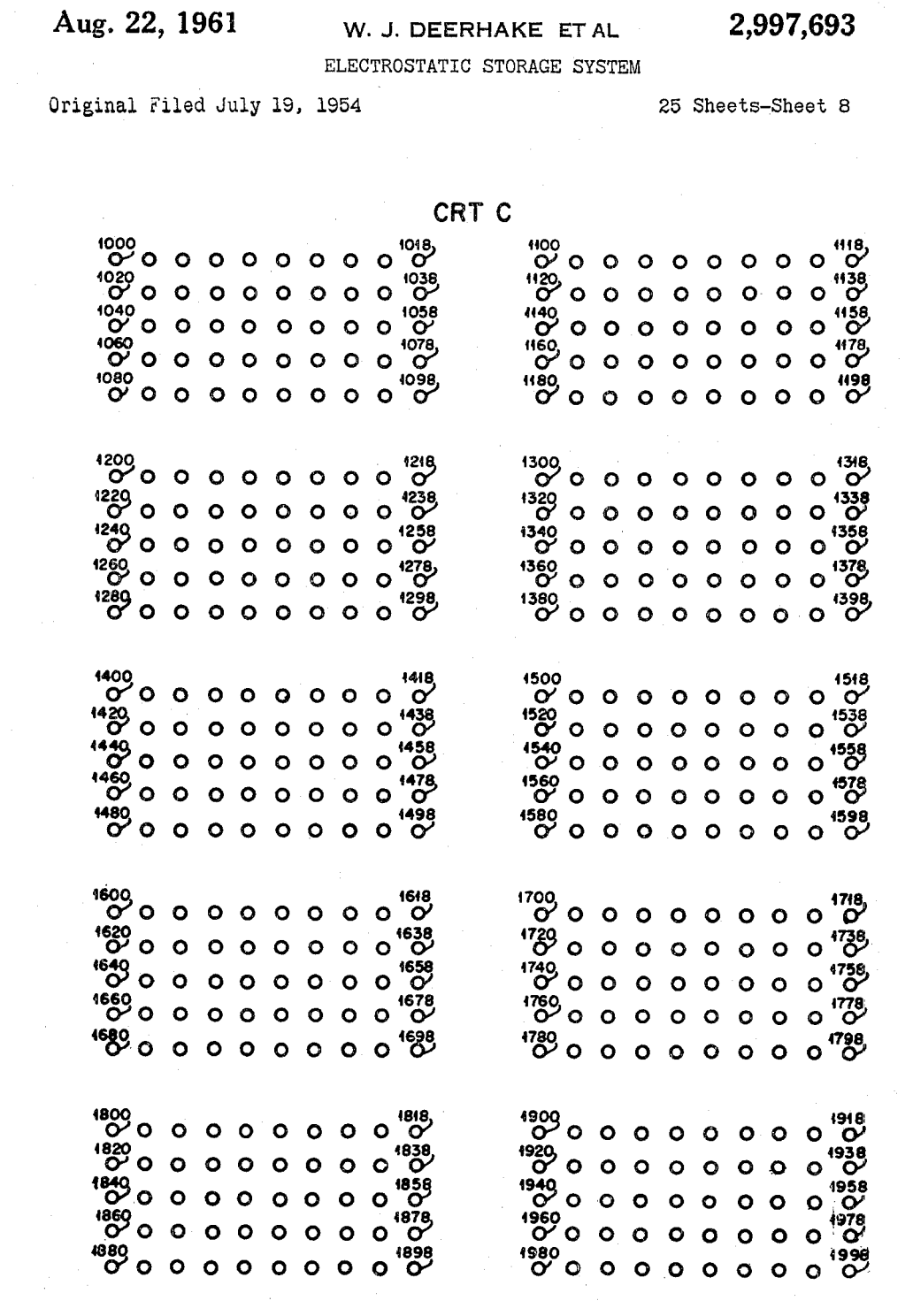
Figure 2D:
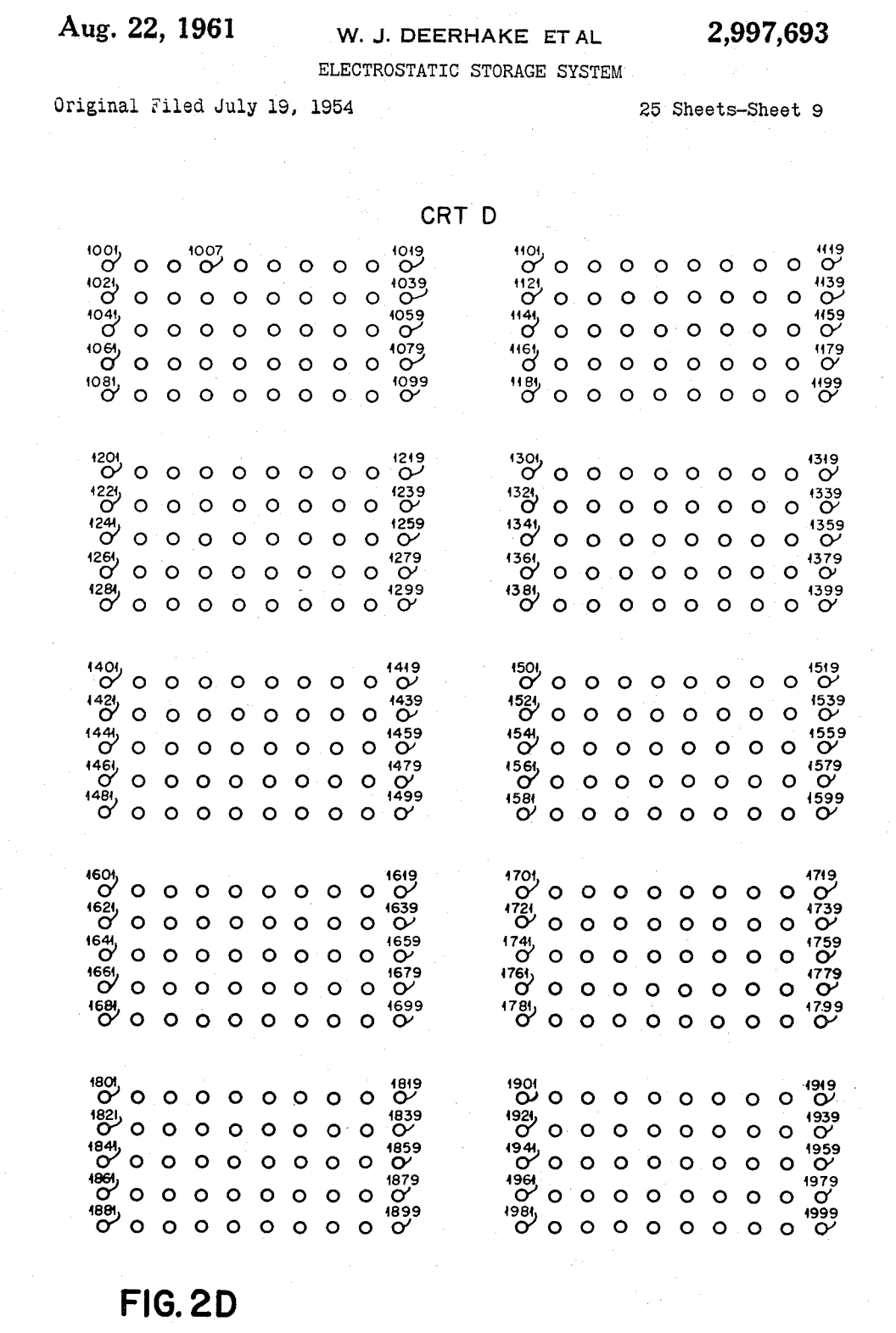

Similarly, FIG. 2C includes the even-numbered positions from 1000 to 1998 inclusive, and FIG. 2D includes the odd-numbered positions from 1001 to 1999 inclusive.

If it is desired to refresh or regenerate all the information stored at the 2000 positions or addresses, the electron beam will have to be moved in step-by-step fashion with the proper tube selection to regenerate all the information stored in proper position sequence. The regeneration of the information at a single position is accomplished during a single eight microsecond regeneration cycle. The sequential regeneration of the information at all of the 2000 addresses is accomplished during 2000 sequential regeneration cycles referred to herein as a complete regeneration cycle.

Figure 4:
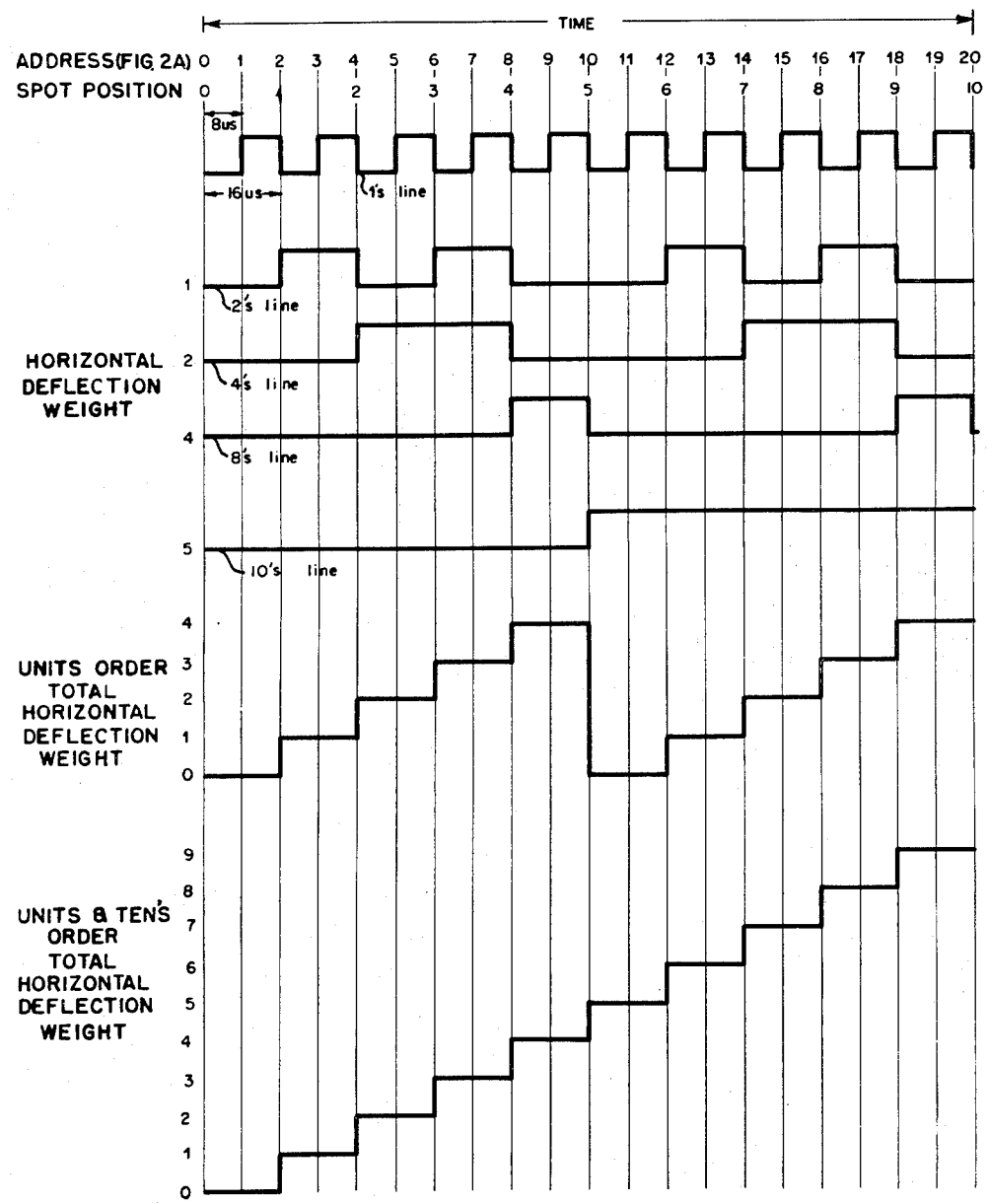
Figure 5:
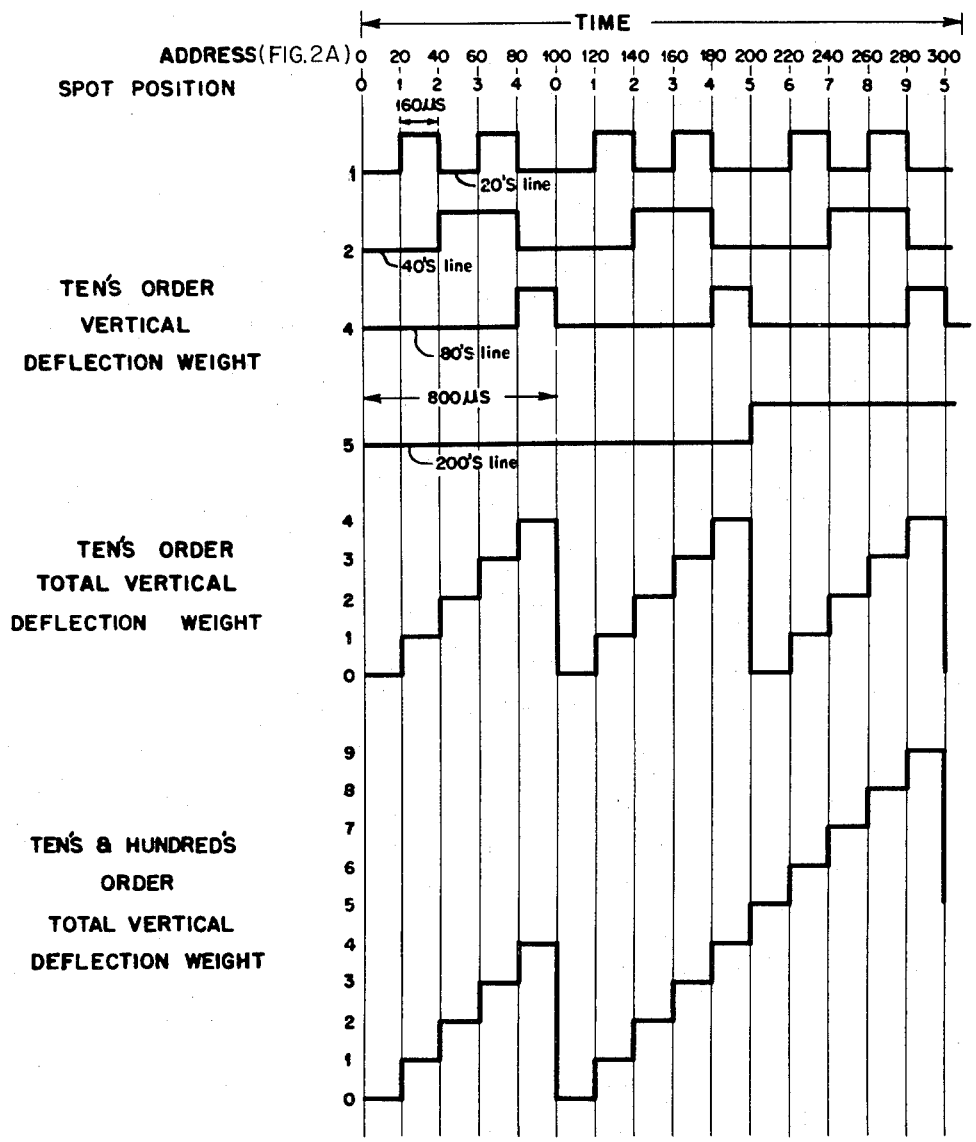
FIG. 5 is a chart which illustrates the weight of the vertical deflection applied to the cathode ray tubes.

The actual voltages applied to the deflection circuits to produce electron beam deflections to the addresses indicated in FIGS. 2A, 2B, 2C, and 2D are represented by the chart of FIG. 3 and shown graphically in FIGS. 4 and 5.

In FIG. 3 the units, tens, hundreds, and thousands orders represent the corresponding decimal orders or positions and the binary representations when reading from right to left in the column represent the binary orders from the lowest to the highest. For example, the zero in the upper right position of the units order column represents the lowest binary order and the zero in the upper left of the thousands order represents the highest binary order. The decimal numbers in the extreme right-hand column represent the addresses or beam positions on the face of CRT A-D (FIG. 1C). The electron beams of the cathode ray tubes are placed at these various positions or addresses in response to voltages represented by the binary representations corresponding thereto. In FIGS. 4 and 5 the horizontal and vertical deflection weights, respectively, of certain specified connections to the horizontal and vertical deflection circuits is graphically represented. A deflection weight of one is equivalent to a deflection of one position in a given direction. The individual deflection weights are represented by the digits 0 through 9 inclusive.

In FIG. 4 the horizontal deflection weight of the 4's line is 2. This means that the digit 2 represents the relative contribution of the voltage provided by the 4's line in effecting horizontal deflection of the electron beams. In each case the deflection weight indicates the voltage contribution of the designated line in effecting deflection of the electron beam.

The 2's line of FIG. 4 corresponds to the terminal I2 (FIG. 1B) and is UP when it provides a beam deflection voltage. Similarly, the 4's line corresponds to terminal I4, the 40's line to terminal I40 and so forth.

Addresses shown in FIGS. 3, 4 and 5 correspond to those for cathode ray tubes CRT A-D (FIG. 1C) as illustrated in FIGS. 2A-2D, respectively. The spot positions shown in FIGS. 4 and 5 are numbered to correspond to the number of times the electron beams have actually been shifted or repositioned to be on the address corresponding thereto. In other words, the spot position indication ignores tube selection. For example, when the electron beams are at spot position 3 the address sought may be either 6 (FIG. 2A), 7 (FIG. 2B), 1006 (FIG. 2C), or 1007 (FIG. 2D), the actual address being determined by the tube selector TS (FIG. 1B).

The step-by-step sequential positioning of the electron beams as shown by FIGS. 3, 4, and 5 is accomplished during a complete regeneration cycle. Initially, the electron beams are in the upper left positions and the tube selector has selected tube A to be operable. At the end of the first regeneration cycle (8 microseconds, FIG. 4) the 1's line goes UP. This is indicated by the presence of a pulse at address 1 (FIG. 4) in the lowest binary order of the units order or position corresponding to address 1 (FIG. 3). This causes the tube selector circuit to select tube B. At the end of the second regeneration cycle, that is, 16 microseconds elapsed time as designated in FIG. 4, the 2's line goes UP and the 1's line goes DOWN. This causes the electron beam to be shifted to address 2 and CRT A to be selected. At this time regeneration of addresses 0 and 1 have been completed, and the electron beams have been shifted one spot position and regeneration of address 2 is begun. Eight microseconds later the 1's line again goes UP and tube B is selected so that regeneration of address 3 is begun. Eight microseconds later at spot position 2 the 1's line and the 2's line go DOWN and the 4's line goes UP. At this time tube A is selected and regeneration of address 4 is begun. It is seen from the units order, total horizontal deflection weight curve, that the total weight of the deflection voltage is twice that provided when the 2's line alone is UP. It follows therefore that the 2's line going UP causes the deflection of one spot position and the 4's line going UP causes the deflection of two spot positions. At address 6 the 2's line again goes UP, and its deflection weight voltage of 1 is added to that of the 4's line to provide a total deflection weight of 3. When the 2's line and the 4's line are UP, the regeneration of addresses 6 and 7 is effected. Next the 2's line and the 4's line go DOWN and the 8's line goes UP. The electron beams are now at spot position 4 and address 8 is selected. The 8's line, therefore, must provide a total deflection weight voltage of 4. When the 1's line next goes UP, regeneration of address 9 is effected.

When the regeneration of address 9 is completed, the 8's line goes DOWN. All lines of the units order are now DOWN and the units order is in its starting position. At this time the 10's line or the lowest binary order of the tens order (FIG. 3) goes UP. When the 10's line goes UP the total horizontal deflection weight voltage (which is the units and tens orders total horizontal deflection weight voltage, FIG. 4) causes the electron beams to be shifted to spot position 5, and CRT A is selected so that regeneration of address 10 is begun. The 10's line remains UP while the units order repeats its cycle of operation. Hence, the deflection weight voltages provided by the 2's, 4's, and 8's lines are added to that of the 10's line to provide the total horizontal deflection weight curve shown in FIG. 4. These voltages effect deflection of the beam through the remaining spot positions up to and including 9 and effects regeneration of the addresses through address 19.

When regeneration of address 19 is completed the units order returns to its initial zero position, and the 10's line goes DOWN. The horizontal deflection of the electron beam is therefore 0 and the addresses 0 through 19 shown in FIGS. 2A and 2B have been regenerated.

Next, the 20's line (FIG. 5) goes UP. This is shown by pulse output at the second binary order of the tens order in FIG. 3. The 20's line of tens order is assigned a vertical deflection weight voltage of 1, and is therefore connected to the vertical cathode ray tube deflection circuits (I20, FIG. 1B). What the 20's line goes UP, the beams are deflected one spot position downward so that they are now positioned at addresses 20, 21, 1020, and 1021. As stated above the 1's line is now DOWN and tube A is selected. Hence, regeneration of address 20 is begun. As previously pointed out the 1's line goes UP at the end of the first eight microsecond period and selects CRT B so that regeneration of address 21 is begun. The electron beams remain in this same vertical position until addresses 20 through 39 inclusive are regenerated. Hence, while the beams are in this same vertical position, the operation described in connection with FIG. 4 is repeated. At the end of 160 microseconds the 20's line goes DOWN and the 40's line goes UP. The total vertical deflection weight voltage now applied, which is the tens order vertical deflection weight voltage, is now twice that previously applied so that the 40's line is assigned a total deflection weight of 2. Regeneration of addresses 40 through 59 is now effected in the manner above described.

Subsequently, at the end of another 160 microseconds the 20's line goes UP to position the beam at spot position 3 (FIG. 5) where it remains in its vertical position until addresses 60 through 79 are regenerated. During this time both the 20's and the 40's lines are UP (FIGS. 3 and 5). The 20's line and the 40's line then go DOWN and the 80's line goes UP to position the beam at spot position 4 to effect regeneration of addresses 80-99 inclusive. The total regeneration time of 800 microseconds has elapsed and the 20's, 40's, and 80's lines are DOWN.

Next, the 100's line connected to the horizontal deflection circuits (FIG. 1B) goes UP. The horizontal deflection voltage supplied by the 100's line is assigned a deflection weight value of 10. This causes the electron beams to be positioned on addresses 100, 101, 1100, and 1101. The above-described operation is now repeated to effect re-generation of addresses 100-199, inclusive. At this time the 100's line goes DOWN and the 200's line (FIG. 5) connected to the vertical deflection circuits goes UP. The voltage supplied by the 200's line is assigned a deflection weight value of 5 and causes the electron beams to be positioned at addresses 200, 201, 1200, and 1201. The units and tens orders cycles described above are again repeated to effect a regeneration of addresses 200-299, inclusive. The deflection weights of the 20's, 40's, and 100's lines of the 10's order are, for the first time, added to the deflection weight of the 200's line to produce the tens and hundreds order total deflection weight voltages shown in FIG. 5. The units order and tens order deflection weights return to zero. The 200's line remains UP and the 100's line goes UP. The vertical deflection voltage applied to the electron beams has a weight of 5 because the 200's line is UP, and the horizontal deflection weight is 10 because the 100's line is UP. Hence, the electron beams are positioned to addresses 300, 301, 1300, and 1301. Addresses 300-399 inclusive, are now regenerated as described hereinbefore.

Next, the 100's line and the 200's line go DOWN, the 400's line (FIG. 1B) connected to the vertical deflection circuits and supplying a voltage having a vertical deflection weight of 10 goes UP. This causes the electron beams to be positioned at addresses 400, 401, 1400, and 1401. The addresses 400-499 inclusive, are now regenerated as described hereinbefore.

Next, the 100's line goes UP to cause the electron beams to be positioned to addresses 500, 501, 1500, and 1501. Regeneration of addresses 500-599 inclusive, is now effected. Then the 100's line goes DOWN and the 200's line goes UP. The 200's line and the 400's line are now UP so that the weight of the total vertical deflection voltage is 15. This causes the electron beams to be positioned at addresses 600, 601, 1600 and 1601. Addresses 600-699 inclusive, are now regenerated. The 100's line again goes UP so that the electron beams are positioned to addresses 700, 701, 1700, and 1701. Addresses 700-799 inclusive, are now regenerated.

Next, the 100's line, 200's line, 400's line go DOWN. The 800's line (FIG. 1B) connected to the vertical deflection circuits and assigned a vertical deflection weight of 20 does UP. This causes the electron beams to be positioned at addresses 800, 801, 1800, and 1801. Addresses 800-899 inclusive, are now regenerated.

Next, the 100's line again goes UP causing the electron beams to be positioned to addresses 900, 901, 1900, and 1901. Addresses 900-999 inclusive, are regenerated.

All lines of the units, tens, and hundreds orders now go DOWN and the 1000's line connected to the tube selector goes UP. This means that cathode ray tubes CRT A and B will no longer be selected and that cathode ray tubes CRT C and D will be alternately selected in response to the voltage supplied by the 1's line in the same manner that cathode ray tubes CRT A and B were selected when addresses 0-999 inclusive, were regenerated.

The electron beams are now at addresses 0, 1, 1000 and 1001. The cycle of operation described above is now repeated to effect the generation of addresses 1000-1999 inclusive. A complete regeneration cycle is now accomplished. The electron beams are returned to their initial positions, and are ready to execute a second complete regeneration cycle. It should be understood that an action cycle may be executed following the completion of any eight microsecond regeneration cycle.

*Deflection circuits*

Referring more particularly to FIGS. 6A and 6B, the horizontal deflection circuit comprises five current adding deflection units designated DU2, DU4, DU8, DU10 and DU100, and cathode follower stabilizing circuits 450 and 451.

The current increment switching unit DU2 is typical of those employed herein. These switching units comprise twin triode tubes 452L and 452R connected to operate as a switching unit to cause a given increment of current to be added to that flowing through the voltage stabilizing circuits 450 or 451. The commonly connected cathodes are connected through a load resistor 453 to the −150 volt line 230. The anode of tube 452L is connected directly to the line 454 and the anode of tube 452R is connected directly to line 455. The control grids of tubes 452L and 452R are connected through parasitic suppressing resistors ps and the resistors 457 and 458, respectively, to the ground line G. These grids are also connected through the parasitic suppressing resistors to the anodes of diodes 460 and 461, respectively. The cathode of diode 460 is connected to the terminal S2 (FIG. 1B) and the cathode of diode 461 is connected to terminal I2 (FIG. 1B).

Similarly, the cathodes of the diodes 460 and 461 of the deflection units DU4, DU8, DU10, and DU100 are connected to the terminal S4, I4; S8, I8; S10, I10; and S100, I100 of FIG. 1B.

Again, consider the switching unit DU2 as exemplary. When a decimal 2 is included in the address, the terminal S2 is DOWN and the terminal I2 is UP. Conversely, when no 2 is included in the address the terminal I2 is DOWN and the terminal S2 is UP. The condition of the remaining S and I terminals is similarly determined by the presence or absence of the corresponding decimal number.

When no 2 is included in the address the terminal I2 is DOWN and the terminal S2 is UP. Since terminal I2 is DOWN, the cathode of diode 461 is DOWN and the potential difference between the cathode and anode of this diode is sufficient to cause conduction therethrough. The control grid of tube 452R which is connected to the anode of diode 461 then goes DOWN. As a result, the control grid of tube 452R is placed below the cutout potential and tube 452R is rendered non-conductive. At this same time the diode 460 is rendered non-conductive because the terminal S2 is UP and thus the cathode of diode 460 is more positive than its anode. The control grid of tube 452L is therefore placed at the same potential as the ground line G and tube 452L is rendered conductive.

If a decimal 2 is included in the address, the conductive condition of diodes 460 and 461 is reversed, that is, the terminal S2 is DOWN so that the diode 460 is rendered conductive, thereby causing tube 452L to be rendered non-conductive. The terminal I2 being UP causes diode 461 to be rendered non-conductive and thus tube 452R is rendered conductive.

Hence, when a decimal 2 is not present in the address, all of the current through load resistor 453 passes through tube 452L and when a 2 is included in the address, all of the current through load resistor 453 passes through tube 452R.

The tubes 462 and 463 designated as unit 450 (FIG. 6B) are connected in parallel and serve as the load impedance of the various tubes 452R. Considering the tube 452R of current increment switch DU2, this tube is in series with the tubes 462 and 463 and the load resistor 464 between +390 volts and −150 volts. This general plate circuit series arrangement is termed a "cascode" amplifier and is more fully described in connection with FIG. 11.23 on page 440 of Vacuum Tube Amplifiers, volume 18, Radiation Laboratory Series, McGraw-Hill, 1948.

It will be recognized that the present circuit arrangement (of FIGURES 6A and 6B) employs a modification of the cascode amplifier which is there described, but in a more elaborate and specialized system.

The purpose of the tubes 462 and 463 is to stabilize the anode potential of the tube 452R so that the current flowing through this latter tube will be independent of the total current flowing through the tubes 462 and 463. That is with a given anode potential and a given cathode resistor, the tube 452R will conduct a particular value of current when in a conductive state. If then the anode potential changes by 30 volts, for example, the tube 452R will no longer conduct the same amount of current. Therefore, the anode potential must be stabilized within a certain voltage range, say 10 volts. The effect of the cascode amplifier is to cause the wide changes in potential which would normally appear at the anode of tube 452R (due to the changes in current therethrough) to appear at the anode of the tube 462 and 463, that is, terminal HL. Although the tubes 462 and 463 are not cathode followers due to the presence of the load resistor 464, they can be likened to them since their cathode potentials will always be within approximately 10 volts or less of their grid potentials.

The stabilizing circuit 450 (FIG. 6B) includes two twin triode tubes 462 and 463. The cathodes of these tubes are commonly connected to the line 455 and their anodes are commonly connected through parasitic suppressing resistors and a load resistor 464 to the +390 volt line 466. The control grids of tubes 462 and 463 are connected through parasitic resistors to a potential point 467 intermediate resistors 468 and 469 (FIG. 6A) which are respectively connected to the +150 volt terminal 166 and the +390 volt line 466. The control grids of these tubes are also connected to ground through a decoupling capacitor 465.

The anodes of tubes 452 R of the switching units DU2, DU4, DU8, DU10, and DU100 are commonly connected to the cathodes of tubes 462 and 463 of the stabilizing circuit 450 (FIG. 6B). When all of the tubes 452R are non-conductive, the series current path from the +390 volt terminal 466 through resistor 464, tubes 462 and 463, and tubes 452R to the −150 volt terminal 230 is interrupted so that the tubes 462 and 463 are rendered non-conductive. However, when one or more of the tubes 452R is conductive, the tubes 462 and 463 are rendered conductive and a voltage drop occurs across resistor 464. A signal is therefore exhibited at the terminal HL which is connected to the left horizontal deflection plate of the cathode ray tubes CRT A–D (FIG. 1C).

The stabilizing circuit 451 (FIG. 6A) is similar to 450 and the resistor 470 is identical with resistor 464 (FIG. 6B). The commonly connected cathodes of tubes 462 and 463 of circuit 451 are connected to the line 454, which joins the anodes of the tubes 452L of the switching units DU2, DU4, DU8, DU10, and DU100.

As previously explained, to obtain the address representations or deflection patterns shown in FIGS. 2A–2D, it is necessary that the signal applied to the horizontal deflection plates have an assigned deflection weight of 1 when a decimal 2 is included in the address. Similarly, the signal to the horizontal deflection plates when a decimal 4, demical 8, decimal 10 or decimal 100 is included in the address must have assigned deflection weights of 2, 4, 5, and 10, respectively. In other words, the currents flowing through resistor 453 of DU2, resistor 472 of DU4, resistor 473 of DU8, resistor 474 of DU10, and resistor 475 of DU100 are related as 1, 2, 4, 5, and 10, respectively. Since these currents must be so related, it follows that the value of the resistors must be related in a like manner. Hence, resistor 453 may have a value of 50K, resistor 472 of 25K, resistor 473 of 12.5K, resistor 474 of 10K and resistor 475 of 5K.

It should be noted that each of the tubes 452L and 452R of switching unit DU100 is a twin triode connected in parallel. Such is necessitated by the high current flow through the 5K resistor 475.

In order for the address representations or deflection patterns (FIGS. 2A–D) to be reproduced it is necessary that equal deflection of the electron beam be provided when it is shifted from any one spot position to the next. The total current flowing through resistors 464 and 470 is always a constant value. In order to shift the beam from one spot position to the next, the current flowing through one of the resistors, for example 470, is decreased by a predetermined amount, for example, 3 milliamperes, and the current flowing through resistor 464 is increased by the same amount.

Since a deflection weight value of one causes a shift or deflection of the electron beam one spot position, a change in current flow of three milliamperes may be said to represent a deflection weight of one. The total or maximum horizontal deflection weight is represented by the summation of 1, 2, 4, 5, and 10 or by 22. The total current flowing at all times is therefore 22×3 or 66 milliamperes. When the address is O, the terminals S2, S4, S8, S10, and S100 are UP and all of the tubes 452L are conductive so that all current flows through the line 454 and resistor 470 (FIG. 6A). The terminal HR is connected to the right horizontal deflection plate of the cathode ray tubes CRT A–D and the electron beams are caused to be in the extreme left positions (FIGS. 2A–D). Hence, the deflection circuits may be said to be in the zero or initial starting condition.

As stated when the electron beams are in spot position 0, the tubes 452L of the switching units DU2, DU4, DU8, DU10, and DU100 are conductive and the total current of 66 milliamperes flows through resistor 470. The actual operation of the horizontal deflection circuits of FIGS. 6A and 6B to obtain the beam deflection positions indicated in FIGS. 2A–D is more easily realized by conjoint reference to FIGS. 2A–D and FIG. 4.

When the electron beams are to be moved to spot position 1, the terminal S2 goes DOWN, and the terminal I2 goes UP (2's line, FIG. 5). The tube 452R of switching unit DU2 (FIG. 6B) is rendered conductive and the 3 milliamperes of current flowing through this tube also flow through tubes 462 and 463 and through resistor 464, thereby producing a drop in potential at terminal HL which is applied to the left-hand horizontal deflection plates of cathode ray tubes CRT A–D (FIG. 1B). Prior to the 2's line going UP this 3 milliampers of current flowed through resistor 470 (FIG. 6A). Hence, when the electron beams are in spot position 1, 63 milliamperes of current flow through resistor 470 (FIG. 6A) and 3 milliamperes flow through resistor 464 (FIG. 6B).

When the electron beams are to be placed at spot position 2 (i.e., addresses 4, 5, 1004, and 1005) the 2's line goes DOWN and the 4's line goes UP (FIG. 4).

It follows that the tube 452R of switching unit DU2 becomes non-conductive and the tube 452L thereof becomes conductive. This means that the 3 milliamperes of current flowing through switching unit DU2 is again caused to flow through resistor 470 (FIG. 6A). Also the tube 452L of switching unit DU4 is rendered non-conductive and the tube 452R thereof is rendered conductive. Since the value of resistor 472 of switching unit DU4 is one-half that of resistor 453 of unit DU2, a total of 6 milliamperes now flow through tube 452R and thus through tubes 462 and 463 of stabilizing circuit 450 and hence through resistor 464 (FIG. 6B). A total of 60 milliamperes now flows through resistor 470 (FIG. 6A) and a total of 6 milliamperes flows through the resistor 464 (FIG. 6B). The electron beams of the cathode ray tubes CRT A–D are now placed at spot position 2.

When the electron beams are to be placed at spot position 3, tube 452L of switching unit DU2 becomes non-conductive and the tube 452R thereof becomes conductive. Hence, the 3 milliamperes of current through switching unit DU2 is again caused to flow through resistor 464 and is added to the 6 milliamperes of current already flowing through this resistor as a result of the conduction of tube 452L of switching unit DU4.

When the electron beams are to be placed at spot position 4, the tubes 452L of switching units DU2 and DU4 again become conductive to cause the 9 milliamperes of current from these units to again flow through resistor 470. At the same time the 8's line (FIG. 4) goes UP and the tube 452L of switching unit DU8 is rendered non-conductive while the tube 452R is rendered conductive. This causes the 12 milliamperes of current flowing through the switching unit DU8 to flow through resistor 464. The electron beams are now placed at spot position 4.

When the electron beams are to be placed at spot position 5, the 8's line goes DOWN (FIG. 4) causing the tube 452L of the switching unit to become conductive and the 12 milliamperes which were flowing through resistor 464 to now flow through resistor 470. At the same time the 10's line (FIG. 4) goes UP and the tube 452L is rendered non-conductive since the terminal S10 is DOWN and the terminal I10 is UP. The tube 452R is rendered conductive. The 15 milliamperes of current flowing through switching unit DU10 are now caused to flow through the resistor 464 and the electron beams are placed at spot position 5. Conduction of tube 452R of switching unit DU10 continues while the operation of switching units DU2, DU4, and DU8 is repeated. This causes the electron beams to be placed at the spot positions 6, 7, 8, and 10, respectively.

When the electron beam is to be placed at spot position 10, all of the switching units return to their initial position. The actual positioning to spot position 10 is determined by operation of the vertical deflection circuits described hereinbelow.

When the electron beams are to be placed at the spot positions corresponding to addresses 100, 101, 1100, and 1101, the switching units DU2, DU4, DU8, and DU10 are returned to their initial condition, i.e., tubes 452L conducting. The terminal S100 goes DOWN and the terminal I100 goes UP. This causes the tube 452L of switching unit DU100 to become non-conductive and the tube 452R thereof to become conductive. As a result the 30 milliamperes of current flowing through switching unit DU100 now flow through resistor 464 and the electron beams are at the addresses indicated above.

The tube 452R of switching unit DU100 remains conductive and subsequent horizontal deflection is effected in the manner described hereinbefore until the electron beams are to be placed at the spot position corresponding to addresses 118, 119, 1118, 1119. To effect such, the tube 452R of switching units DU8, DU10, and DU100 is caused to be conductive. This means that a total of 57 milliamperes flows through the resistor 464, and that the remaining current of 9 milliamperes flows through the resistor 470. The electron beams are now in their most extreme right-hand positions.

When the beams are at the opposite extremity of deflection, that is, in the 0 spot position, a total current of 66 milliamperes flows through the resistor 470 and zero current flows through resistor 464. This unbalance in the flow of current means that the deflection pattern will not be centered on the face of the cathode ray tubes.

Referring more particularly to FIGS. 7A and 7B, the vertical deflection circuit comprises vertical switching units VSU20, VSU40, VSU80, VSU200, VSU400, and VSU800, and the voltage stabilizing circuits 450 and 451. These switching units and the voltage stabilizing circuits are similar to those described in connection with the horizontal deflection circuits of FIGS. 6A and 6B. The particular voltage and component values of the two circuits are not necessarily the same. A +367.5 volt line 480 is provided in the place of the +390 volt line 466 of FIGS. 6A and 6B. In FIG. 7A the resistor 468 is connected between the potential point 467 and ground whereas in FIG. 6A it is connected between the same potential point and the +150 volt line 166. Variations in the particular component value as well as supply voltage lines are necessitated by the different current value employed in the vertical deflection circuits. The values of the resistors 464 and 470 of FIGS. 7A and 7B will not necessarily be identical to those of FIGS. 6A and 6B.

Connection of the S and I terminals to the tubes 460 and 461, respectively, of the vertical switching units corresponds to that shown in FIG. 1B. The cathode resistor 481 of switching unit VSU20 (FIG. 7B) has a value of 50K and corresponds to a vertical deflection weight of 1. The respective cathode resistors 482, 483, 484, 485, and 486 of switching units VSU40, VSU80, VSU200, VSU400 and VSU800 are of 25K, 12.5K, 10K, 5K, and 2.5K, respectively. Hence, in the order named these resistors represent vertical deflection weights of 2, 4, 5, 10, and 20. Again, the incremental current change required to effect deflection of the electron beams from one spot position to the next is 3 milliamperes. Since the total vertical deflection weight is the sum of 1, 2, 4, 5, 10 and 20 or 42, the total current flowing through the resistor 470 when the electron beams are in the 0 vertical spot position is 126 milliamperes and the current flowing through the resistor 464 is 0 milliamperes.

An understanding of the actual circuit operation is facilitated by conjoint reference to FIGS. 7A, 7B, FIG. 5, and FIGS. 2A-D. As stated, when the electron beams are in the vertical spot position zero all of the tubes 452L of the vertical switching units are conductive and 126 milliamperes of current flow through resistor 470 while 0 milliamperes flow through resistor 464. Accordingly all of the input terminals I to the vertical switching units are DOWN and all of the S input terminals to these units are UP. When the electron beams are to be placed at spot position 1, the 20's line (FIG. 5) goes UP. This means that terminal S20 goes DOWN and terminal I20 goes UP. As a result tube 452L of the switching unit VSU20 is rendered non-conductive and tube 452R thereof is rendered conductive. Hence, 3 milliamperes of current now flow through resistor 464 (FIG. 7B) and 123 milliamperes flow through resistor 470 (FIG. 7A). This places the electron beams in spot position 1.

Next, the electron beams are to be deflected to vertical spot position 2. The 20's line goes DOWN (FIG. 5) and the 40's line goes UP. As a result the switching unit VSU20 is returned to its initial condition, tube 452L of switching unit VSU40 is rendered non-conductive and the tube 452R thereof is rendered conductive. The total current flowing through switching unit VSU40 is 6 milliamperes, which now flow through resistor 464. The remaining current or 120 milliamperes flow through resistor 470. The electron beams are now in spot position 2.

When the electron beams are to be placed at spot position 3, the 20's line goes UP (FIG. 5). This causes the tube 452R of switching unit VSU20 to be rendered conductive and the 3 milliamperes of current flowing through this unit now flow through resistor 464 in addition to the 6 milliamperes flowing therethrough as a result of conduction through the switching unit VSU40. A total of 9 milliamperes of current now flows through resistor 464 and 117 milliamperes flow through resistor 470. This places the electron beams in spot position 3.

When the electron beams are to be placed in spot position 4, the 20's line (FIG. 5) and the 40's line go DOWN and the 80's line goes UP. Accordingly, switching units VSU20 and VSU40 are returned to their initial condition and the current flowing therethrough now flows through resistor 470 (FIG. 7A). The tube 452R of switching unit VSU80 is rendered conductive and the 12 milliamperes of current flowing through switching unit VSU80 now flow through resistor 464. The electron beams are now in spot position 4. While the electron beams are in this vertical spot position the addresses 80-99 (FIGS. 2A and 2B) or the addresses 1080-1099 (FIGS. 2C and 2D) may be visited by the electron beams in response to operation of the horizontal deflection circuits described hereinbefore. Next, it is necessary that the electron beams be placed at the spot position corresponding to the addresses 100, 101, 1100 and 1101. In order that such may be accomplished the electron beams must be under a vertical deflection of zero.

The 80's line (FIG. 5) therefore goes DOWN and the switching unit is returned to its initial condition. The electron beams are now at the vertical spot position zero. The cycle of operation described hereinbefore is repeated (FIG. 5). This causes addresses 100–199 (FIGS. 2A and 2B) or addresses 1100–1199 (FIGS. 2C and 2D) to be visited by the electron beams. Next, the electron beams must be placed at a vertical spot position such that they will visit the addresses 200, 201, 1200, and 1201. These addresses correspond to a vertical spot position of 5. In order to position the electron beams at spot position 5, the 80's line (FIG. 5) goes DOWN and the 200's line goes UP. The switching unit VSU80 is therefore returned to its initial condition, and the tube 452R of switching unit VSU200 is rendered conductive. This causes the 15 milliamperes of current flowing through switching unit VSU200 to flow through resistor 464. The electron beams are now at spot position 5.

The above described cycle of operation is now repeated; that is, the operation placing the electron beams at spot positions 1, 2, 3, 4, and 0, respectively, to place the beams at spot positions 6, 7, 8, 9, and 5 (FIG. 5).

The 200's line remains UP so that the tube 452R of switching unit VSU200 remains conductive, and the electron beams are again positioned in the step-by-step manner described hereinbefore through spot positions 5–9.

It is now necessary that the electron beams be placed in spot position 10 (not shown in FIG. 5) corresponding to addresses 400, 401, 1400, and 1401 (FIGS. 2A, 2B, 2C, 2D). In order to position the electron beams at spot position 10 the 200's lines goes DOWN so that the 15 milliamperes of current flowing through switching unit VSU20 now flow through resistor 470. At the same time the 400's line (not shown in FIG. 5) goes UP and the tube 452R thereof is rendered conductive so that the 30 milliamperes of current flowing through switching unit VSU400 now flow through the resistor 464. The total current flowing through resistor 464 is now 30 milliamperes and the total current flowing through 470 is 96 milliamperes. The operation described above is repeated twice to position the electron beams in a step-by-step manner through the vertical positions 10 to 14. This causes visitation of the electron beams to the addresses 400–599 (FIGS. 2A and 2B) or 1400–1599 (FIGS. 2C and 2D).

Next, the 200's line goes UP to cause the tube 452R of switching unit VSU200 to be rendered conductive so that the 15 milliamperes of current flowing through this unit now flow through the resistor 464. The tube 452R of switching unit VSU400 remains conductive so that the total current flowing through resistor 464 is 30 plus 15 or 45 milliamperes. The current flowing through resistor 470 is therefore 81 milliamperes. This causes the electron beams to be placed in spot position 15 corresponding to addresses 600, 601, 1600, and 1601 (FIGS. 2A–D). The operation described above is twice repeated to twice position the electron beams through the vertical spot positions 15 through 19. This causes visitation of the electron beams to addresses 600–799 (FIGS. 2A and 2B) or 1600–1799 (FIGS. 2C and 2D).

Next, the electron beams are placed at spot position 20 corresponding to addresses 800, 801, 1800 and 1801. The 800's line goes UP so that the tube 452R of switching unit VSU800 is rendered conductive to cause the 60 milliamperes of current flowing through switching unit VSU800 to flow through the resistor 464, while the remaining current from the other switching units or 66 milliamperes flow through resistor 470. A repetition of the above-described operation takes place until the beam is placed at the vertical spot position 24 corresponding to the addresses 800, 801, 1800, and 1801 (FIGS. 2A–D). When the beams are in this vertical position, the greatest current which will flow through the resistor 464 flows when the tube 452R of switching units VSU800 and VSU80 are conductive. At this time the total vertical deflection weight is 20 plus 4 or 24 so that the greatest current flowing through the resistor 464 is 24×3 or 72 milliamperes. This means that the current flowing through the resistor 470 is 54 milliamperes. Hence, as in the horizontal deflection circuits an unbalance of current flow is present. The addresses are therefore not vertically centered on the face of the cathode ray tubes.

If at this time address 1999 has been visited, the entire beam deflection operation is completed and the electron beams returned to their initial positions. However, if at this time the last address visited is 999, the electron beams return to their initial positions, and the next address visited is 1000 (FIG. 2C). A similar deflection operation is then effected to visit addresses 1000 to 1999.

It is seen that the actual deflection effected to visit addresses 0–999 is identical with that which must be effected to visit addresses 1000–1999. This is clear from FIGS. 2A–D, FIGS. 3, 4 and 5, and FIGS. 1B and 1C since no connection from the thousands order is associated with either the horizontal or vertical deflection circuits. Connection from the thousands order is made only to the tube selector circuit TS of FIG. 1B.

*Dash deflection generator*

The purpose of the dash deflection generator is to provide a preselected linear displacement of the cathode ray tube beam to thereby effect storage of a dash as distinguished from a dot which is stored without such deflection. In other words, the spot on the face of a cathode ray tube representing the storage of a dash is physically larger than that representing the storage of a dot. As described herein, the linear displacement effected to store a dash is provided from N.46 to N.06 of each and every cycle.

The connections of the dash deflection generator are such that it is designed to produce a dash that is an incremental deflection of the electron beams during each and every cycle. However, whether or not a dash is to be written is controlled by circuits described hereinafter which control the potential applied to the control grid of the cathode ray tube. Thus, if a dot is to be written, the cathode ray tube would be rendered conductive during the time that the beam is located at the initial address location. If a dash were to be written, the cathode ray tube would remain conductive throughout the time that the dash deflection generator is operative.

If it is desired that the displacement of the beam in the horizontal plane alone is to represent a dash, then the voltage produced by the dash deflection generator is supplied to the horizontal deflection plates of the cathode ray tube and not to the vertical deflection plates. Such displacement is provided by a horizontal dash deflection generator. However, if displacement of the beam in a vertical plane alone is to represent a dash, then the voltage produced by the dash deflection generator is applied only to the vertical deflection plates. Such deflection is provided by a vertical dash deflection generator. If a dash is to be represented by an oblique displacement, that is, at an angle to the horizontal and vertical planes, then dash deflection voltages must be applied to both the horizontal and vertical deflection plates. In such a case, both a horizontal and a vertical dash deflection generator are required.

The horizontal dash deflection generator (FIG. 6B) includes a pulse stretcher 500 (see FIG. 9 of application No. 1), an inverter 1501, inverter 502R, catholic follower tube 502L and the class A amplifier tubes 503L and 503R. The tubes 503L and 503R in conjunction with the stabilizing circuits 451 and 450, respectively, comprise cascode amplifiers.

Sync pulses (FIG. 8A) are applied to terminal SP of pulse stretcher 500 and the input terminal AR1 of the pulse stretcher is connected to terminal 384. An input pulse is therefore supplied from the terminal 384 of the octal counter of FIG. 10 of application No. 1 from time N.40 to N.50 (FIG. 8A). A pull-up pulse is applied to terminal 368 of pulse stretcher 500 from the terminal 368 (FIG. 11 of application No. 1 at N.06 time).

As shown in FIG. 8A, the output terminal S1 of the pulse stretcher 500 goes UP at time N.06 and goes DOWN at N.46. The output terminal I1 of the inverter I501 therefore goes DOWN at N.06 and goes UP at N.46. The output terminal I1 of inverter I501 is connected through the grid limiting resistor 504 to the control grid of the inverter tube 502R, having its cathode connected to ground and its anode connected through load resistor 505 to the +150 volt terminal 166 and through parasitic suppressing resistor ps to the control grid of cathode follower 502L. The anode of inverter 502R therefore drives the cathode follower 502L.

Hence, when the control grid of the inverter 502R is DOWN from N.06 to N.46 time, its anode is UP and the control grid of cathode follower 502L is UP. Also, when the control grid of inverter 502R is UP, its anode is DOWN and the voltage at the cathode of cathode follower 502L tends to go DOWN or follow the voltage at its grid. However, the cathode of the tube is unable to follow its grid for the reason stated hereinbelow.

The cathode of cathode follower 502L is connected to ground through a capacitor 507 and a resistor 508 connected in parallel. Capacitors 509a and 509b are connected in series with each other and in parallel with capacitor 507. The anode of tube 502L is connected to the +390 volt line 466 and to ground through a decoupling network 510 comprising a decoupling resistor and decoupling capacitor connected as shown, (FIG. 6B). Capacitors 509a and 509b serve as a voltage divider across capacitor 507. When the cathode of cathode follower tube 502L is UP from time N.06 to N.46, the capacitor 507 is charged to the cathode potential. When the control grid of cathode follower tube 502L is DOWN from N.46 to N+1.06 time, the cathode tends to follow the control grid but is unable to do so because of the charge on capacitor 507. During this time, the capacitor 507 discharges through resistor 508. The voltage waveform (FIG. 8A) representing the output cathode follower 502L shows the linear voltage produced as a result of the discharge of capacitor 507. Such a voltage is present at the juncture of capacitors 509a and 509b which juncture is connected to the control grid of the class A amplifier tube 503R through parasitic suppressing resistor ps and to the line G through bias resistor 511.

The anode of amplifier tube 503R is connected through line 455 to the voltage stabilizing circuit 450. The cathodes of the amplifier tubes 503R and 503L are connected through the common cathode resistor 512 to the −150 volt line 230. The anode of amplifier tube 503L is connected through line 454 to the voltage stabilizing circuit 451 (FIG. 6A). Hence, it is seen that the current flowing through amplifier tube 503R flows through the circuit 450 and appears at the terminal HL as a voltage change, while the current flowing through amplifier tube 503L flows through the circuit 451 and appears at the terminal HR as an incremental voltage change (FIG. 6A).

If the amplifier tubes 503L and 503R are electrically identical and their respective control grids at the same voltage, equal current will flow through the anodes of these tubes. If the voltage at the control grid of tube 503R is now decreased slightly while the voltage at the control grid of tube 503L is maintained at the same voltage, the anode current flowing through tube 503R will decrease while the anode current flowing through tube 503L will increase. The increase in the anode current of 503L is substantially equal to the decrease of the anode current through tube 503R so that the voltage drop across the cathode resistor 512 remains approximately constant. During time interval N.06 to N.46 the plate currents flowing through tubes 503L and 503R are substantially equal. However, during the time N.46 to N+1.06, the voltage at the juncture of capacitors 509a and 509b, which voltage is decreasing at a substantially linear rate, causes the voltage at the control grid of tube 503R to decrease at the same linear rate. This causes a decrease in the current flowing through the tube 503R and hence an increase in the potential appearing at terminal HL (FIG. 6B). Accordingly, the current flowing through tube 503L is increased by an amount substantially equal to the decrease through the tube 503R and appears as an incremental decrease in voltage at terminal HR (FIG. 6A). The decreased potential appearing at terminal HR and the increased potential appearing at terminal HL causes the electron beams to be shifted to the left a preselected amount controlled and determined by the incremental change of current. A linearly varying voltage is therefore applied to the horizontal deflection plates of the cathode ray tubes during the time interval N.46 to N+1.06 due to the push-pull action of the amplifier tubes 503L and 503R, having their anodes connected to the lines 454 and 455, respectively.

The dash deflection generators for effecting displacement of the electron beams in the vertical plane is identical with that described above for obtaining beam displacement in the horizontal plane. The vertical dash deflection generator 520 is shown in FIG. 7B. From the above description of the horizontal dash deflection generator it is seen that the current flowing toward the terminal VU (FIG. 7B) linearly decreases during time N.46 to N+1.06 and that the current flowing toward the terminal VL (FIG. 7A) linearly increases by substantially a similar amount during this time interval. Hence, the electron beams of the cathode ray tubes are deflected upward as a result of the operation of the vertical dash deflection generator. The actual deflection of the electron beams is therefore along the path which is the vector sum of the beam displacement in the vertical and horizontal planes, providing both the horizontal and the vertical dash deflection generators are operative. If, as described, the horizontal and vertical dash deflection generators are identical and both operative, the beam displacement will be along the line at 45 degrees with the horizontal.

Read-in and read-out circuits

A conventional cathode ray tube is a useful storage element if a pick-up plate in the form of a conducting material is placed next to the target surface of the face of the tube. Further, the target of the cathode ray tube must be composed of an insulating material with a secondary emission ratio greater than unity. Since the target material is an insulator it may be considered that a particular address location or spot is capacitively coupled to the pick-up plate. The pick-up plate is electrically connected to a video amplifier. The reading and writing circuits to be described can be used with either of two methods of writing or storing information on the face of a cathode ray tube.

*Focused dot-dash system.*—The conventional method of storing information such as a binary 1 on the face of a cathode ray tube involves first positioning the beam to a given address 1. The beam is then turned on so as to produce a particular potential configuration. While the beam is still on, it is moved to a nearby second location so as to destroy the original potential configuration and establish a new pattern. The beam is then shut off and the second configuration remains at the address. In this system the location of the two positions is generally very close. In order to read the information stored at this spot the beam is positioned to the first location where it is turned on and the original potential configuration is established, thereby destroying the previous one. If in re-establishing the first potential configuration a net change in charge is involved, this net change in charge will appear as a potential change which is capacitively coupled to the pick-up plate and thus to the video amplifier.

The first waveform of FIG. 8B illustrates a plot of voltage versus distance where the beam is focused at an initial position, i.e., a dot is stored. The left-hand vertical axis represents the center line of the electron beam when stationed at the initial position of the address. By turning the beam on the potential configuration illustrated is established. The beam is then moved to the right so as to attain a final position where the second vertical line illustrates the center line of the electron beam. If a dot is to be written, the beam will be turned off before leaving the first location. If a dash is to be stored the electron beam is allowed to remain on while it is moved to the final second position.

The beam is first positioned at the initial position and is turned on so as to cause the potential configuration of a dot (FIG. 8B) to be established. While the beam is still on it is moved to the second position, thereby establishing the potential gradient illustrated for a dash in FIG. 8B. The establishment of the potential gradient of the second waveform of FIG. 8B will cause the first gradient to be destroyed and thus a dash is stored.

In order to read out the information stored on the face of the tube the beam is initially positioned to the first location illustrated by the vertical line at the left in FIG. 8B. The beam is then turned on so as to re-establish the potential configuration of a dot. If a dot had previously been stored at this location, a change in potential or charge density will not be experienced since the value 568 of FIG. 8B and the area beneath the curve remain unchanged. However, if the dash configuration formerly existed at the address in question, the fact that the dot configuration is now re-established at this address involves a net change in charge and a net change in potential in a positive direction. In re-establishing the dot waveform where a dash previously existed, it is necessary that the waveform go from the negative point 569 (FIG. 8B) to a positive point 568. This net change in potential or net positive change in charge is capacitively coupled via the pickup plate to the video amplifier.

*Defocus-dash system.*—The basic difference between the defocus-dash system and the dot-dash system described above is that in the defocus-dash system the beam is defocused while at its initial position. At the time that the beam is moved to its final position it is focused in the same manner as used in the system described above. However, due to the fact that the beam is defocused while at its initial position, the spacing between the initial and the final positions must be somewhat increased in order to obtain optimum results.

FIG. 8C illustrates the potential configuration which will exist when the beam is defocused and is placed at its initial position. It should be noted that due to the defocused beam the area beneath the curve of the defocused dot is greatly increased as compared with the focused dot of FIG. 8B. When a dot is to be stored, the beam is turned off before it is moved to the final position. However, when a dash is to be written, the beam when moved to its final position, remains on and is focused during the time it is being deflected.

When the information stored at a given address is to be read out, the beam will again be positioned at the initial position and turned on while defocused so as to determine whether or not a net change in charge will take place. A system of read out is thus the same as that described for the focused dot-dash system.

One advantage of the defocus-dash system over the focused dot-dash system is realized when a dash is read out at a given address. In such case, the net change in charge would be much greater in the defocus-dash system than in the focused dot-dash system. Reference to FIG. 8C also indicates that the potential level change is much greater in FIG. 8B. Thus, since the net change in charge and the net change in potential is greater in the defocus-dash system, the signal which is capacitively coupled via the pick-up plate to the video amplifier will be of a much larger amplitude than is experienced for the dot-dash system. The defocus-dash system is employed by the circuits explained hereinafter for use with the binary-decimal storage system. The dot-dash system is employed in the binary storage system.

The circuits described hereinabove position the electron beams of the plurality of cathode ray tubes to a particular address according to the address information available from either the regeneration counter during a regeneration cycle, or from an external source during an action cycle. It is now necessary to provide circuits which will exhibit the information stored on a cathode ray tube as voltage pulses and to provide means for reading new information into the cathode ray tubes.

The circuits of FIGS. 1C and 1D have two modes of operation. The first mode involves reading information from a particular address on a cathode ray tube, converting the information to voltage pulses available at an external terminal, and at the same time re-writing or re-storing this information at the same location on the cathode ray tube. Thus, this mode of operation will be used during all regeneration cycles and whenever information is to be read out of a cathode ray tube so as to be available for external use during an action cycle. Thus, during read out or regeneration operations, the information stored at an address location is sensed and restored in the same location.

The second mode of operation is effected when new information is to be stored or read in to a selected address location on the face of a cathode ray tube during an action cycle. This involves reading out and destroying the information previously stored at a given address after which the new information is stored thereat.

The read in and read out circuits necessary for the storage of the binary 1 bits for 2000 addresses of the units decimal order or position 1 are shown in FIGS. 19B–19F of application No. 1 and described therein and incorporated herein by reference. In a complete cathode ray tube storage system such circuits are provided for each group of 2000 addresses of a given binary order representing a portion of a given decimal digit, as described in connection with FIGS. 1A–1E.

*Binary storage system*

In the pure binary system of notation an address is specified by a series of binary digits or bits where the decimal digit 0 represents a binary 0, and the decimal digit 1 represents a binary 1. The digital positions or orders in the binary address, reading from right to left, correspond in value to $2^0$, $2^1$, $2^2$, $2^3$, $2^4$, $2^5$, $2^6$, etc. or decimal digits 1, 2, 4, 8, 16, 32, 64, etc., respectively. For example, the binary address 1110111111 represents the decimal digit 959, which is determined by the addition of the decimal digits 1, 2, 4, 8, 16, 32, 0, 128, 256, and 512. Hence, when the binary address 1110111111 is supplied to a cathode ray tube storage system, the electron beam of the cathode ray tube will seek the spot location designated as address 959. By utilizing a ten binary digit address system a total of 1024 addresses (addresses 0–1023, inclusive) are available.

In a cathode ray tube storage system there must be a regeneration cycle and an action cycle. During the regeneration cycle the address locations on a tube will be regenerated so as to prevent loss of the stored information as a result of time decay, i.e., the information stored therein is read out and restored in the same location. During an action cycle the circuits associated with a cathode ray tube storage system must either permit the information stored on the face of the tube to be read therefrom, or to permit new information to be stored in the spot position visited by the beam of the tube.

During successive action cycles the beam of the tube may visit several mediate address locations since the information may be stored in random order on the face of the tube. However, the spot positions are sequentially visited during successive regeneration cycles. Hence, the positioning of the electron beam requires that the binary address information must be originated by two separate sources during action and regeneration cycles. If a series of action cycles are allowed to occur sequentially and successively, the binary address information source, active during regeneration, must remember the last address visited during the last regeneration cycle. If an excessive number of action cycles are performed the stored information will be lost for lack of regeneration. These difficulties are overcome in this embodiment of the invention by utilizing alternate regeneration and action cycles.

Each regeneration and action cycle includes eight successive time intervals of, for example, eight microseconds. During a first regeneration cycle the cathode ray tube storage system will regenerate the information stored at address 1, for example. During the next eight microsecond time interval an action cycle is executed by causing the beam of the cathode ray tube to visit any address specified by an external address source. During the next following eight microsecond time interval a regeneration cycle is performed and the beam of the tube visits address 2, thereby regenerating the information stored thereat. In a similar fashion alternate regeneration and action cycles occur until all of the spot positions on the tube have been visited, whereupon the procedure is repeated, so as to sequentially refresh the spot positions again. During the various action cycles the beam of the cathode ray tube can be caused to visit any address on the tube. It is not necessary that the addresses visited be adjacent to the last one visited as is the case when successive regeneration cycles are performed.

The individual time intervals are labeled T0, T1, T2, T3, etc., the time duration of each interval is, for example, one microsecond. In the embodiment shown, a single regeneration cycle comprises the eight microsecond period T0–T8, and the period T8–T16 represents an action cycle of eight microseconds duration. It is seen then that after the system has been in operation for sixty-four microseconds, for example, the total elapsed time is indicated as T64. The time interval T64 is the beginning of a regeneration cycle and therefore corresponds to time T0 of the initial regeneration cycle (T0–T8). Similarly, the time T72, for example, corresponds to the beginning of an action cycle, or T8 of the initial action cycle (T8–T16).

Each regeneration cycle (T0–T8) is utilized to regenerate the information stored at an address. However, the time set aside for an action cycle (T8–T16) is not necessarily used either to read from or to write information on the cathode ray tube. If information is neither read from nor written on the tube during the interval T8–T16, this period is called an action-blank cycle. The period T8–T16 is termed an action-read cycle if information stored on the cathode ray tube is read therefrom during this time and is termed an action-write cycle if new information is stored on the tube.

Referring more particularly to FIGS. 9A and 9B, an embodiment of the invention utilizing the pure binary address system is shown by arranging these figures as shown in FIG. 9C. In FIG. 9A the timer 760 provides voltage waveforms which sequentially represent each of the address locations 0–1023 inclusive on the cathode ray tube during successive regeneration cycles. The output terminals 761–770, 761–X to 770–X of the timer 760 provide the binary address information necessary during a regeneration cycle. The waveforms generated by the timer 760 and present on the terminals 761–770 are illustrated in FIG. 10. For example, the waveform appearing on terminal 761 of FIG. 9A is designated in FIG. 10 as W761. The waveform appearing on terminal 761–X of FIG. 9B is the inversion of that appearing on terminal 761. Wherever the suffix X is used, it indicates that the waveform appearing thereon is the inversion of the waveform appearing on the similarly designated terminal except that no suffix is included in the designation. Hence, since terminal 761 is UP from T0–T16 and DOWN from T16–T32, terminal 761–X is DOWN from T0–T16 and UP from T16–T32, etc.

All of the waveforms of FIG. 10 are symmetrical and periodic, i.e., are alternately UP and DOWN for equal periods of time. For example, W766 is UP for 512 microseconds, after which it is DOWN for 512 microseconds. Each R at the top of FIG. 10 indicates a regeneration cycle and each A indicates an action cycle. Since 1024 regeneration cycles are required to regenerate all 1024 addresses on the cathode ray tube, a total of 16×1024 or 16,384 microseconds is required to regenerate all of these addresses. For ease of illustration a portion only of this 16,384 microsecond period is shown in FIG. 10.

The terminals 761–770 (FIG. 9A) in conjunction with their corresponding inversion terminal 761–X to 770–X, respectively, correspond to the ten binary digits used to specify an address on the cathode ray tube during a regeneration cycle. Terminal 761 corresponds to the extreme right-hand binary digit and terminal 770 corresponds to the extreme left-hand binary digit. If, for example, the extreme right-hand binary digit is a 0, terminal 761 is UP and terminal 761–X is DOWN. The opposite conditions exist if a binary 1 is represented. Hence, to represent the binary number 0000000000, the terminals 761–770 are UP and the terminals 761–X to 770–X are DOWN.

The pattern or raster of addresses on the cathode ray tube is in the form of a square 32 x 32 (FIG. 12), i.e., there are 32 addresses in both the vertical and horizontal direction. The first five binary digits from the right of a binary number have a total possible equivalent decimal value between 0 and 31. The total value represented by these digits will determine the horizontal position, i.e., the vertical column in which the beam of the cathode ray tube will be located. The second group of five binary digits of the binary number representing the address is used to determine the vertical position of the beam, i.e., the horizontal row in which the beam is located. After the beam is located in any particular row each binary 1 added causes the beam to be moved one position to the right until it has been positioned at the 32 addresses in that row.

The output terminals 761–765, 761–X to 765–X (FIG. 9A) are connected to a first set of input terminals of the horizontal regeneration-action switch 772 which provided the horizontal address during regeneration cycles. Similarly, the terminals 766–770, 766–X to 770–X are connected to a first set of input terminals of the vertical regeneration-action switch 773 which provides the vertical address during regeneration cycles.

The waveforms present on terminal 774 and 774–X are applied to the regeneration-action switches 772 and 773 during the first eight microseconds of a sixteen microsecond period (T0–T8) to permit the switches 772 and 773 to transfer their first set of inputs to their respective output terminals.

The terminals 781–785, 781–X to 785–X are connected to a second set of input terminals of the horizontal regeneration-action switch 772. Similarly, the terminals 786–790, 786–X to 790–X are connected to a second set of input terminals of the vertical regeneration-action switch 773. The terminals 781–790, 781–X to 790–X are used to supply external address information to the vertical and horizontal regeneration-action switches 773 and 772 during action cycles. The outputs of the horizontal regeneration-action switch 772 appear on the terminals 791–795, 791–X to 795–X. The outputs of the vertical regeneration-action switch 773 appear on the output terminals 796–800, 796–X to 800–X.

It is seen from the above that during a regeneration cycle (T0–8) the terminals 761–770, 761–X to 770–X supply the address information which appears at the output terminals 791–800, 791–X to 800–X, respectively, of the switches 772 and 773. However, during an action cycle (T8–T16) the terminals 781–790, 781X to 790–X supply the information appearing at the output terminals 791–800, 791–X to 800–X of the horizontal and vertical regeneration-action switches 772 and 773, respectively.

The output terminals 791–800, conjointly with the inversion terminals 791–X to 800–X, respectively, represent the ten binary orders of the binary address. If, for example, terminals 791–800 are UP, terminals 791–X to 800–X are DOWN, the binary address is 0000000000. Accordingly, when a binary 1 is present in the extreme right-hand or first binary order of the binary address, terminal 791 is DOWN and 791–X is UP.

The output terminals 791–795, 791–X to 795–X and 796–800, 796–X to 800–X are connected respectively to the inputs of the horizontal and vertical deflection circuits 802 and 803 (FIG. 9B). The beam of the cathode ray tube is positioned by these circuits to the address designated in accordance with the address information supplied to the horizontal and vertical deflection circuits 802 and 803.

The deflection weights provided by the respective deflection circuits when a binary 1 is present in a particular binary order of the binary address is shown within the blocks representing the horizontal and vertical deflection circuits 802 and 803. For example, if a binary 1 is present in the first binary order, the horizontal deflection circuit 802 provides a horizontal deflection weight of 1, i.e., the beam is moved one position to the right. If a binary 1 exists in the second binary order, the horizontal deflection circuit provides a horizontal deflection weight of 2. Similarly, if a binary 1 appears in the fifth binary order, the horizontal deflection circuit 802 provides a horizontal deflection weight of 16. When the horizontal deflection is 0 the beam is at the extreme left edge of the raster. If a binary 1 appears in the sixth binary order of the address, the vertical deflection circuit 803 provides a vertical deflection weight of 1 to move the beam downward one position. Likewise, if a binary 1 appears in the tenth binary digital position, the vertical deflection circuit 803 provides a vertical deflection weight of 16. Thus, if a binary 1 has appeared in all ten binary orders, the beam would be moved to the right 32 positions in the horizontal direction and would also be moved 32 positions in the vertical direction downwards. This would locate the beam in the lower right hand corner of the raster.

The output terminals 804HR and 804HL of the horizontal deflection circuit 802 are connected respectively to the right and left-hand deflection plates of the cathode ray tube CRT. The output terminals 805VL and 805VU of the vertical deflection circuit 803 are connected respectively to the lower and upper vertical deflection plates of the cathode ray tube CRT.

*Regeneration cycle*

A binary bit of information stored on the face of the cathode ray tube is read therefrom by turning on the beam at time T3 of a regeneration cycle. This causes a video signal appearing at the pick-up plate of CRT to be connected via conductor 808 to the input terminal PU1 of the video amplifier 809. If a dash signal appears at the pick-up plate, the output terminal 810 of the video amplifier 809 is UP from T3–T4 of a regeneration cycle. The terminal 810 is connected to the input of the detector circuit 811 which senses the output of the video amplifier to determine whether a dash signal or a dot signal is present. Whenever detector 811 senses a dash signal, the output terminal 812 thereof is DOWN from T3–T6. When a dot signal is present, terminal 811 remains UP throughout the regeneration cycle.

The write-action terminal WA (controlled by external circuitry, not shown) is UP to render the detector circuit 811 operative. When terminal WA is DOWN detector 811 is inoperative and signals at its input terminal 810 are prevented from effecting the output terminal 812. Hence, during a regeneration cycle terminal WA must be UP to render the detector 811 operative.

The voltage pulse present on terminal 812 is delivered to the intensifier circuit 813, which produces a one-microsecond pulse if a dot was read from the cathode ray tube CRT and a five-microsecond pulse if a dash was read therefrom. Output terminal 814 is capacitively coupled to the cathode of the cathode ray tube CRT so that a negative pulse on 814 will render the tube sufficiently conductive to cause information to be written on the face of the tube. If a dot is to be written terminal 814 will be DOWN from T3–T4, but if a dash is to be written, terminal 814 will be DOWN from T3–T8.

The information at terminal 814 is available at terminals 817 and 817–X for use by external circuits (not shown) such as, for example, arithmetic circuits of a digital calculator. The dash-write terminal DW and the action-cycling-blanking terminal ACB must both be UP throughout a regeneration cycle (T0–T8). Voltage pulses produced by timer 760 (FIG. 9A) and appearing at terminals 775, 776, 776–X, 777–X and 778 (FIG. 9B) are utilized by intensifier circuit 813 (FIG. 9B) to produce the pulses appearing at terminals 814, 817, and 817–X.

The detector pulse circuit 818 provides control pulses necessary to the operation of the detector circuit 811. The circuit 818 is operated by the timing pulses appearing at terminals 775, 775–X, 776, and 777 (FIG. 9B) of the timer 760.

*Action cycle*

During an action-read cycle the video information circuits (FIG. 9B) operate in the manner described above for a regeneration cycle. That is, a dot or a dash signal is read from the face of the cathode ray tube CRT when the beam thereof is turned on by the intensifier circuit 813, amplified by the video amplifier 809, detected by detector circuit 811, and finally re-stored or regenerated by the action of the intensifier circuit 813 at the address from which it was obtained.

Whenever an action cycle is not to be utilized, i.e., information is neither read from nor written on the cathode ray tube, an action-blank cycle is executed. This is accomplished by causing the action-cycle-blanking terminal ACB to be DOWN during T8–T16. If terminal ACB is DOWN, the intensifier circuit 813 is rendered inoperative. The potential applied to terminal ACB to cause it to be DOWN is supplied by external control circuits (not shown). Such circuits may constitute an integral part of a digital calculator.

New information is stored on the cathode ray tube during an action-write cycle and is executed by causing the terminal WA to be DOWN. The information previously stored at a particular address is amplified by video amplifier 809 but is prevented from activating the detector circuit 811. Consequently, the output terminal 812 of detector 811 remains UP throughout an action-wire cycle.

Terminal ACB is UP from time T8–T16 to permit the intensifier circuit 813 to be operative during an action-write cycle.

If the dash-write terminal DW is permitted to remain UP throughout an action-write cycle, the intensifier circuit 813 will cause a dot to be written on the cathode ray tube at the particular address selected (terminal 814 DOWN T11–T12). On the other hand, if it is desired to write a dash at the selected address, terminal DW must be caused to be DOWN during the first four time intervals (T3–T12) of an action-write cycle, thereby causing terminal 814 to be DOWN from T11–T16.

During an action-read or action-write cycle the information read or written appears at the terminal 817 in the form of voltage pulses. If a dot is present, terminal 817 is UP from T11–T12 and if a dash is present, terminal 817 is UP from T11–T16. The waveform present on terminal 817–X is the inversion of that on 817.

*Regeneration-action switch*

Referring more particularly to FIGS. 11A and 11B, the circuit diagram of the horizontal regeneration-action switch 772 (FIG. 9A) comprises the switching units 821–825, the action control circuit 827, and the regeneration control circuit 828. The circuit diagram of the vertical regeneration-action switch 773 (FIG. 9A) is identical to the horizontal regeneration-action switch circuit shown in FIGS. 11A and 11B.

The switching unit 821 is typical of those employed wherein the twin-triode tubes 829 and 830 are connected as inverters. The anode of tube 829L is connected to the anode of tube 830L, to the output terminal 791, and through the anode load resistor 831 to the conductor 833 connected to the +160 volt terminal 832. The cathode of 829L is connected to the cathode of 829R and to the conductor 834. The control grids of the tubes 829L and 829R are connected respectively through the isolation and parasitic suppressing resistors 835 to the input terminals 761–X and 761. The anode of tube 829R is connected to the anode of tube 830R, to the output terminal 791–X, and through the anode load resistor 836 to the +160 volt conductor 833. The cathodes of tubes 830L and 830R are connected together and to conductor 837. The control grids of tubes 830L and 830R are connected respectively through the isolation and parasitic suppressing resistors 835 to the input terminals 781–X and 781 (FIG. 11A) used during an action cycle as indicated hereinbefore.

It has been seen that a binary 0 is present in the first binary order of the binary address utilized during regeneration cycles if input terminal 761 is UP or at approximately 0 volts terminal 761–X being DOWN or at approximately −20 volts). The control grid of tube 829R is then UP, while the control grid of 829L is DOWN. The waveform W834 (FIG. 11B) appearing on conductor 834 indicates that conductor 834 is at 0 volts during a regeneration cycle. No bias voltage appears between the grid and cathode of tube 829R because terminal 761 is UP. Therefore, tube 829R becomes fully conductive and its anode and terminal 791–X connected thereto are DOWN, or at approximately +130 volts. Tube 829L cannot conduct because its control grid is DOWN or at −20 volts, the voltage at terminal 761–X, while its cathode is at 0 volts. Hence, the anode of tube 829L and the output terminal 791 are UP, or at approximately +160 volts.

If a binary 1 is present in the first position of the ten binary digit address during a regeneration cycle, the terminal 761–X is UP, terminal 761 is DOWN, tube 829L is fully conducting, 829R is non-conductive causing the output terminal 791–X to be UP and terminal to be DOWN. Hence, during a regeneration cycle, one half of the tube 829 will be fully conducting while the other half is non-conductive. Similar operation of switching units 821–825 permits the information present on the input terminals 761–765, 761–X to 765–X to be delivered to the output terminals 791–795, 791–X to 795–X, respectively.

If a binary 0 is present in the first binary order of the binary address during an action cycle, terminal 791 (FIG. 11A) is UP and the terminal 781–X is DOWN. This causes the control grid of tube 830R (FIG. 11B) to be UP and the grid of tube 830L to be DOWN. Waveform W837 (FIG. 11B) indicates that lead 837 is at 0 volts during an action cycle (T8–T16). Tube 830R is fully conductive since there is no bias voltage between its grid and cathode, tube 830L is non-conductive because its grid is at −20 volts, and its cathode is at 0 volts. Therefore, the anode of tube 830R is DOWN as is the terminal 791–X connected thereto, the anode of 830L is UP as is the terminal 791 connected thereto.

If a binary 1 is present in the first binary column of the binary address during an action cycle, the terminal 781–X (FIG. 11A) is UP and the terminal 781 is DOWN. Tube 830L is fully conducting so that terminal 791 is DOWN, and tube 830R is non-conductive so that terminal 791–X is UP. Hence, during an action cycle the information present at the input terminals 781–785, 781–X to 785–X (FIG. 11A) appears at the output terminals 791–795, 791–X to 795–X, respectively.

The waveforms W834 and W837 (FIG. 11B), respectively show that during a regeneration cycle (T0–T8) conductor 834 is at 0 volts and conductor 837 is at +20 volts. It was stated hereinbefore that when conductor 834 is at 0 volts during a regeneration cycle, the tube 829 is conductive. However, tube 830 is non-conductive during a regeneration cycle because neither of its control grids can be at a potential greater than 0 volts and +20 volts is applied to its cathode. Similarly, during an action cycle, conductor 834 is at +20 volts while conductor 837 is at 0 volts. It follows that tube 829 is cut off and the tube 830 is conductive. Hence, the waveforms W834 and W837 determine the conductive condition of the tubes contained within a switching unit during a regeneration or action cycle.

The waveforms W834 and W837 are produced by the regeneration and action control circuits 828 and 827 respectively (FIG. 11A). The control circiuts 827 and 828 are identical and operate in a similar manner.

The input terminal 774 of the action control circuit 827 is connected through the isolation and parasitic suppressing resistor 835 to the control grid of tube 840 operated as an inverter. The cathode of tube 840 is connected to ground. The anode of tube 840 is connected through the anode load resistor 841 to the +150 volt terminal 166, through the coupling capacitor 842 and through the parasitic suppressing resistors *ps* to the control grids of tube 843, and through capacitor 842 and resistor 844 to the −150 volt terminal tube 230.

The twin-triode tube 843 is operated as an inverter with its two halves connected in parallel. The control grids of tube 843 are connected through the parasitic suppressing resistors *ps* to a common point 846, which is connected through resistor 844 and diode 845 in parallel to the −150 volt terminal 230. The diode 845 is connected to conduct current to the −150 volt terminal 230 so that the juncture 846 is not allowed to float at a potential appreciably above −150 volts. The anodes of the twin-triode tube 843 are connected together and through the anode load resistor 847 to the +150 volt terminal 166, and through the resistor 848 to ground. The resistors 847 and 848 serve as a voltage divider to maintain conductor 837 at approximately +20 volts when the tube 843 is non-conductive. The cathodes of tube 843 are connected together and through the current limiting resistor 849 to the −150 volt terminal 230.

The input terminal 774 of the action control circuit 827 is connected to terminal 774 of the timer 760 (FIG. 9A) at which the waveform W774 (FIG. 10) appears. The terminal 774 (FIG. 11A) is therefore alternately UP and DOWN for time intervals of eight microseconds, it being UP throughout a regeneration cycle (T0–T8) and DOWN throughout an action cycle (T8–T16).

During a regeneration cycle when terminal 774 is UP triode 840 is rendered fully conductive and its anode goes DOWN. Consequently, the control grids of tube 843 go DOWN to render it non-conductive and its anode goes UP. Since tube 843 is non-conductive, conductor 837 is UP and the tubes 830 of the switching units 821–825 are rendered non-conductive as stated hereinbefore.

However, during an action cycle terminal 774 is DOWN, the anode of tube 840 and the control grids of tube 843 go UP, and the anode of tube 843 goes DOWN so that conductor 837 must go DOWN. As noted before, whenever conductor 837 is at 0 volts, the tubes 830 of the switching units 821–825 are conductive so that the information applied to the input terminals 781–785, 781–X to 785–X, respectively, appears at the output terminals 791–795, 791–X, 795–X.

The waveform applied to the input terminal 774–X of the regeneration control circuit 828 is the inversion of the waveform applied to terminal 774 of the action control circuit 827. Thus, the waveform appearing on conductor 834 is the inversion of that appearing on conductor 837.

Briefly, then, during a regeneration cycle the binary information appearing at the terminals 761–765, 761–X to 765–X (FIGS. 11A and 11B) is permitted to appear at the output terminals 771–795, 791–X to 795–X, respectively; and during an action cycle the information appearing at the input terminals 781–785, 781–X to 785–X appears at the output terminals 791–795, 791–X to 795–X, respectively. The circuit of the vertical regeneration-action switch 773 is identical to the horizontal regeneration-action switch 772 (FIG. 9A). However, when the circuit of the horizontal regeneration-action switch is used as the vertical regeneration-action switch 773 (FIG. 9A) the input terminals 761–765 (FIGS. 11A and 11B) are replaced respectively by the terminals 766–770 (FIG. 9A) and the terminals 761–X to 765–X are replaced by the terminals 766–X to 770–X (FIG. 9A), respectively. The terminals 781–785, 781–X to 785–X (FIG. 11A) are replaced by the input terminals 786–790, 786–X to 790–X (FIG. 9A), respectively. Similarly, when the circuit of the horizontal regeneration-action switch (FIGS. 11A and 11B) is used as the vertical regeneration-action switch 773 (FIG. 9A), the output terminals 791–795, 791–X to 795–X replaced respectively by the output terminals 796–800, 796–X to 800–X of FIG. 9A.

Deflection circuits

Knowledge of the physical location of the addresses within the raster on the face of a cathode ray tube facilitates understanding of the deflection circuits.

Referring to FIG. 12, the raster on the face of a tube includes a total of 1024 address locations, each circle representing a separate address location. The raster comprises a square arrangement 32 x 32, i.e., a total of 32 positions of horizontal deflection and 32 units of vertical deflection. The upper left position of the raster is designated the zero beam position of address 0. The next beam position to the immediate right is address 1, next address 2, and so on until the 31st address is found at the extreme right end of the first horizontal row. The second horizontal row contains the address positions 32 through 63, and similarly the third horizontal row contains the positions 64 through 95. Accordingly, each horizontal row contains 32 address positions which are designated by decimal numbers. If the beam of the cathode ray tube is to be located in the uppermost horizontal row, it will be provided with a vertical deflection of 0 corresponding to the vertical deflection weight of 0. A horizontal deflection weight of 1 is required to move the beam to the address 1; a horizontal deflection weight of 2 is required to position the beam at address 2; and so on until a total horizontal deflection weight of 31 is required in order to position the beam at address 31.

It will be shown presently that the individual horizontal deflection weights are proportioned as 1, 2, 4, 8 and 16. Hence, to provide a horizontal deflection weight of 7, for example, the quantities, 1, 2 and 4 are used. Accordingly, if a total horizontal deflection weight of 31 is desired, the quantities 1, 2, 4, 8 and 16 are used.

The vertical deflection weights are also proportioned as 1, 2, 4, 8 and 16. Thus, to position the beam in the fourth horizontal row of the first vertical column (address 96, FIG. 12), the vertical deflection weights of 1 and 2 are used to provide a total vertical deflection of 3. The total horizontal deflection weight in this case is 0. Accordingly, if the beam is to be placed at address 124, a total horizontal deflection weight of 28 is used (horizontal deflection weights 4, 8 and 16), and a total vertical deflection weight of 3 is provided (vertical deflection weight quantities 1 and 2).

The information stored at the 1024 address locations is regenerated by sequentially moving the electron beam in step-by-step fashion from the lowest numbered address to the highest to completely refresh all the information stored thereon. The regeneration of the information at a single address is accomplished during a single regeneration cycle of eight microseconds. The sequential regeneration of the information on all of the 1024 addresses is accomplished during 1024 regeneration cycles; an action cycle is interposed between successive regeneration cycles. If, for example, regeneration of the information at address 0 is to be done initially the beam is placed at address 0 and regeneration is accomplished during the first eight microseconds or time T0–T8. During the time T8–T16 (action cycle) the beam of the cathode ray tube may be positioned to any one of the addresses located within the raster. During the subsequent eight microseconds (T16–T24), address 1 is regenerated. Again, during the time T24–T32 (action cycle) the beam may be located at any of the addresses within the raster. This procedure continues until 512 microseconds have elapsed, whereupon the beam is moved to the second horizontal row and address 32 is regenerated. The addresses 32 through 63 are then regenerated and the beam is moved to the third horizontal row, and the regeneration process continues until it has finally visited all of the addresses of the raster. Thus it is seen that during the time intervals in which the beam is located in a given horizontal row during the individual regeneration cycles, the total vertical deflection weight is maintained at a constant value. To move the beam to the next lower horizontal row an additional vertical deflection weight of 1 is added. During the next 32 individual regeneration cycles the vertical deflection weight again remains constant and the addresses in this row are regenerated.

Referring more particularly to FIGS. 13A and 13B, the horizontal deflection circuit comprises five current increment switching units 850–854 and the voltage stabilizing circuits 855 and 856.

The current increment switching unit 850 is typical of those employed herein and includes twin-triode tubes 858L and 858R connected to cause a given increment of current to be added to that flowing through either voltage stabilizing circuits 855 or 856. The anode of tube 858L is connected to conductor 859 and the anode of tube 858R is connected to conductor 860. The cathodes of tube 858 are commonly connected through the load resistor 861 to ground. The control grids of tubes 858L and 858R are connected respectively through the parasitic suppressing resistors ps and through the resistors 862 and 863 to the +150 volt line connected through decoupling circuit 857 to terminal 166. The control grids of tubes 858L and 858R are also connected respectively through the parasitic suppressing resistors ps to the anodes of diodes 864 and 865. The cathodes of diodes 864 and 865 are connected to the input terminals 791 and 791–X, respectively.

In a similar manner the cathodes of diodes 864 and 865 of the switching units 851–854 are connected respectively to the terminals 792, 792–X; 793, 793–X; 794, 794–X; 795, 795–X. The input terminals 791–795, 791–X to 795–X of FIGS. 13A and 13B are respectively connected to similarly labelled terminals of FIGS. 11A and 11B as illustrated in FIGS. 9A and 9B. As noted hereinbefore, when a binary 0 is located in the first binary order of the binary address, the terminal 791 (FIG. 13B) is UP or at approximately +160 volts and terminal 791–X is DOWN or at approximately +130 volts. Similarly, when binary 0's are located in the second, third, fourth and fifth binary orders of the binary address, the terminals 792–795 are UP and terminals 792–X to 795–X are DOWN. The incremental switching circuits 850–854 provide the horizontal deflection weights 1, 2, 4, 8 and 16, respectively.

Thus, when binary 0's are located in all orders of the binary address, the switching circuits 850–854 provide a total horizontal deflection weight of 0. If a binary 1 is located in the first order of the binary address, terminal 791 is DOWN and terminal 791–X UP so that switching circuit 850 provides a horizontal deflection weight of 1. If a binary 1 is located in the second binary order of the binary address, terminal 792–X is UP, terminal 792 is DOWN and switching circuit 851 provides a horizontal deflection weight of 2. Accordingly, when the terminals 793–X to 795–X are UP, the switching circuits 852–854, respectively, provide horizontal deflection weights of 4, 8 and 16. A total horizontal deflection weight of 17, for example, is provided by causing the terminals 791–X and 795–X to be UP, while terminals 791 and 795 are caused to be DOWN.

The switching units 850–854 of FIGS. 13A and 13C operate in a manner similar to the switching units DU2, DU4, DU8, DU10 and DU100 of FIGS. 6A and 6B. The tubes 858L and 858R respectively of FIGS. 13A and 13B correspond to tubes 452L and 452R of FIGS. 6A and 6B. Similarly, the voltage stabilizing circuits 855 and 856, respectively of FIGS. 13A and 13B correspond to voltage stabilizing circuits 451 and 450, respectively, of FIGS. 6A and 6B.

When a binary 0 is present in the first binary order of the binary address, the terminal 791 is UP, and terminal 791–X is DOWN. When terminal 791 is UP, the diode 864 is non-conductive because its cathode is at +160 volts and its anode is at +150 volts. It follows that the control grid of tube 858L is UP and causes 858L to be rendered fully conductive, the current flowing through tube 858L flows through conductor 859, the voltage stabilizing circuit 855, resistor 866, and decoupling circuit 869 to the +480 volt terminal 867. At the same time, the diode 865 is rendered fully conductive since its cathode is DOWN or at +130 volts, and its anode was at +150 volts. Conduction through diode 865 causes the control grid of tube 858R to go DOWN (+130 volts) and the tube is rendered non-conductive because of the voltage drop across the cathode resistor 861 provided by the current flowing through tube 858L. Since tube 858R is non-conductive, no current is flowing therethrough and through the voltage stabilizing unit 856 due to the switching action of the switching unit 850.

If a binary 1 is present in the first binary order of the binary address, terminal 791 is DOWN and terminal 791–X is UP. Diode 865 is rendered non-conductive because terminal 791–X is UP. This causes the control grid of tube 858R to be placed at +150 volts and as a result the tube is rendered fully conductive. The current flowing through the tube 858R flows through the conductor 860, the voltage stabilizing circuit 856, the resistor 868, and the decoupling circuit 869 to the +480 volt terminal 867. The current flowing through resistor 868 causes a voltage drop thereacross which corresponds to a deflection weight of 1. During the presence of the binary 1 in the first column of the binary address, diode 864 is rendered conductive, causing tube 858L to be rendered non-conductive so that no current flows through voltage stabilizing circuits 855 from the switching unit 850.

The voltage stabilizing circuit 856 (similar to 450, FIG. 6B) serves as a load impedance for the various tubes 858R and the voltage stabilizing circuit 855 (similar to 851, FIG. 6A) serves as a load impedance for the various tubes 858L. The stabilizing circuit 856 (FIG. 13B) includes two twin-triode tubes 870 and 871 having their anodes commonly connected to terminal 804HL and through the load resistor 868 to the +480 volt terminal 867. The control grids of tubes 870 and 871 are connected through parasitic suppressing resistors ps to the conductor 872 maintained at +270 volts by the voltage dividing resistors 873 and 874 (FIG. 13A). The voltage dividing resistors 873 and 874 are connected in series between the +480 volt line 867 and the +150 volt line 166. The control grids of tubes 870 and 871 are connected to ground through the by-pass capacitor 875 and the cathodes are commonly connected to conductor 860. The tubes 870 and 871 of the voltage stabilizing circuit 855 (FIG. 13A) are similarly connected except that their anodes are commonly connected to terminal 804HR and their cathodes are commonly connected to conductor 859.

If all of the tubes 858L of the switching units 850–854 are conductive, all of the current will flow through the voltage stabilizing circuit 855. Hence, no current will flow through the stabilizing circuit 856 and the resistor 877 (FIG. 13B) serves as the cathode load impedance for the voltage stabilizing circuit 856. A corresponding resistor 876 (FIG. 13B) is provided between conductor 859 and ground.

Since the switching units 850 through 854, respectively, provide deflection weights of 1, 2, 4, 8 and 16, the currents flowing through resistor 861 of circuit 850, resistor 879 of circuit 851, resistor 880 of circuit 852, resistor 881 of circuit 853 and resistor 882 of circuit 854 must be directly related as 1, 2, 4, 8 and 16 and the values of the resistors must be inversely related. Hence, the value of resistor 882 providing a deflection weight of 16 is equal to R; resistor 881 providing a deflection weight of 8 is equal to 2R; resistor 880 providing a deflection weight of 4 is equal to 4R; resistor 879 providing a deflection weight of 2, is equal to 8R; and resistor 861 providing a deflection weight of 1 is equal to 16R.

The tubes 858L and 858R of switching unit 854 are each a twin triode whose sections are connected in parallel. Such is necessitated by the high current flow through the resistor 882.

The resistors 866 and 868 of FIGS. 13A and 13B are identical, and the total current flowing through both will always be a constant value. Since the address locations (FIG. 12) are equally spaced, the deflection of the electron beam of the cathode ray tube must be equal when it is shifted from one spot position to the next. It is now understood that if all of the binary digits of the binary address are 0's, the tubes 858L of the switching circuits 850–854 are conductive and all of the current is flowing through the tubes 870 and 871 of the voltage stablizing circuit 855 and hence through the resistor 866. If the unit deflection weight current is represented by 3 milliamperes, a total of 3 × 32 or 96 milliamperes of current is flowing through resistor 866 (0 through resistor 868).

When the total current is flowing through resistor 866, terminal 804HR (connected to right-hand deflection plate) is at its lowest voltage of approximately +430 volts. At the same time, since no current is flowing through resistor 868 of the voltage stabilizing circuit 856 (FIG. 13B), terminal 804HL (connected to left-hand deflection plate) is at the potential of conductor 867 or approximately +480 volts. Since terminal 804HL is more positive than 804HR, the beam of the cathode ray tube is in its most extreme left-hand position.

If a binary 1 is now caused to appear in the first binary order of the binary address, tube 858R of switching unit 850 is rendered fully conductive and tube 858L is rendered non-conductive, 3 milliamperes of current are subtracted from that flowing through resistor 866 and caused to flow through resistor 868. Since only 93 milliamperes of current flow are now flowing through resistor 866, the voltage drop thereacross decreases so that the potential on terminal 804HR moves in a positive direction. The 3 milliamperes of current flowing through resistor 868 causes a voltage to appear thereacross and the potential on terminal 804HL moves in a negative direction. The beam of the cathode ray tube is, therefore, caused to move one address position to the right.

If the beam is to be placed at address 2 (FIG. 12), a binary 1 will appear in the second binary order of the binary address and binary 0's appear in all other positions. The presence of this binary 1, as explained hereinbefore, causes terminal 792-X (FIG. 13B) to be UP, whereupon tube 858R of switching unit 851 is rendered fully conductive so that the 6 milliamperes of current formerly flowing through 858L of unit 851 and hence through resistor 866 are now transferred to flow through resistor 868. The total current flowing through resistor 866 is now 90 milliamperes, whereas the total current flowing through resistor 868 is 6 milliamperes. The decreased current flowing through resistor 866 causes terminal 804HR to make a voltage excursion in a positive direction. Similarly, the increased current flowing through resistor 868 causes terminal 804HL to make a voltage excursion in the negative direction. This causes the beam of the cathode ray tube to be moved to address 2.

Accordingly, if the beam of the cathode ray tube is to be placed at address 3, binary 1's will appear in the first and second orders of the binary address. Since terminal 792-X is still UP, the 6 milliamperes of current flowing through switching units 851 will continue to flow through the voltage stabilizing circuits 856 and the resistor 868. Since terminal 791-X is again UP, the 3 milliamperes of current flowing through switching circuit 850, which were flowing through resistor 866, are now transferred to flow through resistor 868. The total current flowing through resistor 868 is now 9 milliamperes and the total current flowing through resistor 866 is 87 milliamperes.

If the beam is to be placed at address 4 the tube 858R of switching unit 852 is caused to be conductive and switching units 850 and 851 are caused to return to their initial condition with the tubes 858L conducting. Hence, 12 milliamperes of current flow through resistor 868 and 84 milliamperes of current flow through resistor 866.

If the beam of the cathode ray tube is to be moved to address 5 tube 858R of the switching unit 850 is caused to become conductive and 3 milliamperes of current are thereby added to that flowing through resistor 868, making a total of 15 milliamperes flowing through resistor 868. The remaining current of 81 milliamperes is flowing through resistor 866.

Each time the beam of the cathode ray tube is advanced one address to the right 3 milliamperes of current are added to that flowing through resistor 868 and 3 milliamperes are subtracted from the current flowing through resistor 866. Thus, when the beam is at address 31, all of the current, i.e., 96 milliamperes, is flowing through resistor 868 and no current is flowing through resistor 866. This condition is caused by rendering the tubes 858R of the switching units 850–854 fully conductive, while the tubes 858L thereof are non-conductive.

From inspection of FIG. 12 it is understood that when the beam of the cathode ray tube is subjected to a vertical deflection weight at the same time that any of the horizontal deflection weights 0–31, inclusive, are provided, the beam can be located at any desired address in the raster.

The vertical deflection circuit 803 of FIG. 9B is identical to the horizontal deflection circuit 802 and thus would also be represented by the circuit diagram of FIGS. 13A and 13B. When the circuit of FIGS. 13A and 13B is used to represent the vertical deflection circuit, the terminals 791 through 795 of FIGS. 13A and 13B are respectively replaced by terminals 796–800 of the vertical deflection circuit 803 of FIG. 9B, and terminals 791-X to 795-X are replaced by terminals 796-X to 800-X, respectively. The switching units 850–854 (FIGS. 13A and 13B), respectively, when used as the vertical deflection circuit, supply deflection weights of 1, 2, 4, 8 and 16. However, in this case the deflection weight provided by switching circuit 850 corresponds to the sixth binary digit from the extreme right or sixth binary order of the binary address. Similarly, switching units 851–854, respectively, correspond to the binary digits 7–10 of the binary address. Where all of the binary digits of the binary address are 0, the switching circuits 850–854 are in their initial condition with tubes 858L conducting, and all of the current flowing through resistor 866. Again, the current flowing through resistor 866 causes a voltage drop thereacross which places the terminal 804HR, corresponding to terminal 805VL of FIG. 9B, at its most negative voltage. At the same time, no current is flowing through resistor 868 and terminal 804HL corresponding to terminal 805VU of FIG. 9B, is at its most positive voltage. These voltage conditions locate the beam in the first horizontal row (FIG. 12). Accordingly, if switching unit 850 provides a vertical deflection weight of 1, the current flowing through resistor 866 is 93 milliamperes, that flowing through resistor 868 is 3 milliamperes, and the beam of the cathode ray tube is located in the second horizontal row (FIG. 12). When all of the tubes 858R (FIGS. 13A and 13B) of the vertical deflection circuit are conducting fully, (tubes 858L are non-conductive), all of the 96 milliamperes of current is flowing through resistor 868 to thereby provide a total vertical deflection weight of 31. This places the beam of the cathode ray tube in the row containing the addresses 992–1023 inclusive (FIG. 12).

A dot is stored at a given address by causing the beam to be conductive when it is first positioned thereat. The spot representing the storage of a dash is physically larger than that representing the storage of a dot. Hence, a dash is stored at a given address by causing the electron beam of the cathode ray tube to traverse a linear displacement after it is positioned at that address.

The dash deflection generator of FIG. 13B effects this linear displacement and comprises inverter 884R, cathode follower 884L, and the deflection amplifier tube 885. The operation of this dash deflection generator (FIG. 13B) is similar to that of the horizontal dash deflection generator of FIG. 6B. In FIG. 13B the dash deflection generator operates such that the beam of the cathode ray tube is caused to make a linear displacement during the last four microseconds of each and every regeneration and action cycle. Circuits described with respect to FIGS. 27A–D of Application No. 1 control the turning on and turning off of the beam of the cathode ray tube so as to determine when a dot and when a dash is to be written.

The inverse of the waveform W775 (FIG. 10) is applied to the input terminal 775-X, FIG. 13B, connected through the isolation and parasitic suppressing resistor 886 to the control grid of tube 884R. The anode of tube 884R is connected through the anode load resistor 887 to the +150 volt line and to the control grid of cathode follower tube 884L. The cathode of 884R is connected to ground and the cathode of 884L is connected to ground through capacitor 888 and resistor 889 in parallel. When terminal 775-X and thus the control grid of tube 884R are DOWN during the first four microseconds of either an action or regeneration cycle, the anode of 884R is UP. This causes the cathode of cathode follower 884L to go UP which in turn causes the capacitor 888 to be fully charged. During the last four microseconds of an action or a regeneration cycle the control grid of tube 884R is UP and its anode DOWN, causing the cathode of the cathode follower 884L to go DOWN. When the cathode of cathode follower 884L goes DOWN the capacitor 888 discharges through the shunting resistor 889. This action causes a sloping wave form to appear across the capacitor 888 during the last four microseconds of each eight microsecond cycle.

Voltage dividing capacitors 890 and 891 are connected in series between the cathode of tube 884L and ground. The juncture of these capacitors is connected to the control grid of amplifier tube 885R and through resistor 892 to the +150 volt line. Hence, a portion of the voltage waveform appearing at the cathode of tube 884L is applied to the control grid of tube 885R.

The anodes of amplifier tubes 885L and 885R are connected respectively to conductors 859 and 860. The control grid of 885L is connected through the parasitic suppressing resistor *ps* to the +150 volt line, and the cathodes of tubes 885L and 885R are commonly connected through the cathode resistor 893 to ground.

During the intervals T4–T8 and T12–T16 the decreasing potential present on the control grid of tube 885R causes less conduction therein whereby less current flows through the voltage stabilizing circuit 856 and resistor 868. The decreased current through the tube 885R allows the tube 885L to conduct more current in order to maintain the potential drop across cathode resistor 893 at a constant value. The increased current through 885L causes an increased current to flow through resistor 866. Since the current flowing through resistor 868 is decreased by an incremental amount, the beam of the cathode ray tube is deflected slightly to the left.

The dash deflection generator associated with the vertical deflection circuit causes a deflection of the beam in the upward direction. The dash deflection generator associated with the horizontal deflection circuit when combined with the vertical dash deflection generator provides a deflection along a line at an angle of 45 degrees to the horizontal.

Video information circuits

The video information circuits (FIG. 9B) control the reading out of information stored and the writing or reading in of information to be stored on the face of the cathode ray tube. During regeneration cycles, and also during action cycles, when information is read out from the cathode ray tube, the operation of the video information circuits follows a first pattern of operation. During action-write cycles when information received from an external source is to be stored on the cathode ray tube, the video information circuits perform a different or second pattern of operation. If an action-blank cycle is executed, the video circuits are rendered inoperative.

The first pattern of operation, utilized during regeneration and action-read cycles, consists of reading out the information stored at an address, at which the beam of the cathode ray tube has been positioned, manifesting this information in the form of voltage pulses which become available to external circuits, and simultaneously re-storing the same information at the address from which it was read out.

The second pattern of operation is utilized when new information is to be stored at a particular address on the face of the cathode ray tube or during an action-write cycle. The information previously stored at the selected address is read out and destroyed, and new information is written thereat.

The video information circuits shown in FIGS. 19B, 27A, 27B, 27C and 27D of application No. 1 and described therein, provide storage capacity for 1024 binary bits of information. The description of and the identified drawings are incorporated herein by reference. If a plurality of binary orders or bits are required to represent a word of information, an additional video information circuit is provided for each binary order to be stored. If used in this manner, the information stored in the various binary orders can be made available simultaneously as illustrated for the binary-decimal embodiment described hereinbefore.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a cathode ray tube storage system wherein the electron beam of the cathode ray tube is selectively deflected to a plurality of beam positions in a stepped fashion; means connected to apply a preselected voltage pattern to a pair of the deflection plates of said cathode ray tube including a constant voltage line corresponding to each deflection plate of said pair; voltage stabilizing means connected between each deflection plate and the constant voltage line correspoinding thereto for holding that line at substantially a constant voltage independent of current changes and providing a voltage change at any deflection plate in accordance with the current change at the constant voltage line; means providing a total current flow of constant value to said lines; and additional means for selectively effecting stepwise changes in the current flow to said lines to cause said beam to be selectively deflected to said plurality of positions.

2. The invention set forth in claim 1 wherein similar means is provided to apply a preselected voltage pattern to another pair of deflection plates of the cathode ray tube.

3. The invention set forth in claim 2 wherein a plurality of cathode ray tubes is employed and corresponding pairs of deflection plates of the cathode ray tubes are connected in parallel, and including tube selector means connected to be responsive to said means for selectively effecting changes in the current flow to said lines and connected to an electrode of each cathode ray tube to cause the flow of electrons from the cathode to the screen of only one cathode ray tube during a given time interval.

4. The invention as claimed in claim 1 including a dash reflection generator connected to said constant voltage lines and having UP and DOWN voltage conditions which institute circuit operations, comprising; a first grid controlled tube operable as a gating amplifier and having its cathode connected to ground; input means for causing the control grid of the first grid controlled tube to be cyclically placed in the UP and DOWN conditions during predetermined periods; and a grid controlled cathode follower tube circuit having output capacitive voltage divider means connected in parallel with a load resistor in its cathode circuit and its control grid connected to the plate of said first grid controlled tube so that the control grid is DOWN when the control grid of the first grid controlled tube is UP and is UP when the control grid of the first grid controlled tube is DOWN whereby said capacitive voltage divider means is charged when the cathode of the grid controlled cathode follower tube is UP and is discharged when the control grid of the cathode follower tube is DOWN to thereby provide a substantially linear voltage change.

5. The invention as claimed in claim 1 including a deflection generator circuit connected to said constant voltage lines for providing a substantially linear voltage for deflecting the electron beam of a cathode ray tube, comprising a grid controlled cathode follower tube having a condenser connected in parallel with the load impedance and chargeable when the cathode voltage is above a predetermined value and dischargeable when the cathode voltage is below a predetermined value to prevent the cathode voltage from following the voltage at the cathode grid to provide a linearly decreasing voltage of preselected time duration.

6. The invention of claim 1 wherein said additional means includes a deflection generator having first and second deflection paths, and including; a grid controlled cathode follower tube circuit having a first condenser connected in parallel with the load impedance and chargeable when the cathode voltage is above a predetermined value and dischargeable when the cathode voltage is below a predetermined value to prevent the cathode voltage from following the voltage at the control grid; second and third serially connected condensers connected in parallel with said first condenser to form a voltage divider; a cathode follower switching circuit for providing a constant current switchable from a first deflection path to a second and vice versa; and a connection from the common juncture of said second and third condensers to said cathode follower switching circuit whereby said connection transfers a substantially linear voltage to said cathode follower switching circuit to switch said constant current from said first path to the second as said first condenser discharges.

7. In a cathode ray tube storage system wherein the electron beam of a cathode ray tube is selectively deflected to beam positions in a stepped fashion; means connected to apply a preselected voltage pattern to a pair of the deflection plates of said cathode ray tube including a constant voltage line corresponding to each deflection plate of said pair; voltage stabilizing means connected between each deflection plate and the constant voltage line corresponding thereto for holding that line at substantially a constant voltage and providing a voltage change at the deflection plate in accordance with the current change at the constant voltage line; a plurality of switching circuits for applying all the current flowing therethrough to a chosen one of said constant voltage lines, each of said switching circuits including a grid controlled tube corresponding to each of said constant voltage lines and having its plate connected thereto, a load impedance common to each of said tubes to permit the constant voltage at the plate of each tube to cause the same predetermined current to flow through said switching circuit continuously; a source for producing a plurality of timed voltage changes, one for each of said switching circuits, and circuit means for applying each timed voltage change to one tube of the switching circuit corresponding thereto and the inversion thereof to the other tube of the same switching circuit to thereby selectively deflect the electron beam.

8. In a cathode ray tube electrostatic storage system wherein information is stored in accordance with the binary code and an address position is provided for each binary bit to be stored and includable in a code; means for producing a plurality of voltages corresponding to respective binary-decimal coded values and for producing the inversion of each of said voltages; means energizable in response to said respective voltages corresponding to said values and the inversion of those voltages and providing impedance paths corresponding to each of said values to permit a flow of current therethrough proportional to the corresponding values; means controlling the production of said plurality of voltages and means connected to be responsive to the current flow through said impedance paths to provide deflection voltages corresponding to each address; means for transferring said deflection voltages to each cathode ray tube to position the electron beam thereof at the address corresponding to the deflection voltage transferred; and cathode ray tube selection means connected to be energized conjointly by at least a preselected one of said plurality of voltages and at least a preselected one of said inversion voltages and coupled to the cathode ray tubes to permit energization of one electron beam at a preselected address position.

9. In a deflection circuit for providing output voltages for deflecting the beam of at least one cathode ray tube; first and second lines for providing a total current of constant value; means coupling said lines to the deflection plates of said tubes; and a plurality of switching circuit means, each connecting each of said lines to a source producing sequentially changing voltages, each switching circuit means including first and second grid controlled tubes having their anodes connected respectively to said lines, a common cathode circuit connected to the cathodes of the tubes of each switching circuit means, impedance means connected in the common cathode circuits of said tubes, control grid bias means for biasing the control grids of said tubes, a diode connected between each control grid and said source so that the diodes of each switching circuit means are alternately conductive to alternately transfer all the current flowing through said impedance means to said first and second lines.

10. In a cathode ray tube deflection circuit for providing preselected voltage patterns at two deflection electrode terminals under the control of respectively associated constant voltage lines comprising; a plurality of switching circuits for applying all the current flowing therethrough to a chosen one of said constant voltage lines, each switching circuit including two grid controlled tubes having their plates connected to a different one of said constant voltage lines so that the respective plates are held at the constant voltage of the related line, and an impedance connected between a source of cathode voltage supply and the cathodes of both tubes of each switching circuit, and unidirectional current means connected to the control grids of said tubes; voltage regulating means connected between each of said two terminals and the respective constant voltage line; and a source for simultaneously applying preselected electrical manifestations to said unidirectional current means of predetermined switching circuits to provide said preselected voltage patterns.

References Cited in the file of this patent

UNITED STATES PATENTS

| | | |
|---|---|---|
| 2,402,989 | Dickinson | July 2, 1946 |
| 2,447,507 | Kenyon | Aug. 24, 1948 |
| 2,592,228 | Adams | Apr. 8, 1952 |
| 2,612,621 | Shepherd | Sept. 30, 1952 |
| 2,826,717 | Maron | Mar. 11, 1958 |

UNITED STATES PATENT OFFICE
CERTIFICATE OF CORRECTION

Patent No. 2,997,693                                    August 22, 1961

William J. Deerhake et al.

It is hereby certified that error appears in the above numbered patent requiring correction and that the said Letters Patent should read as corrected below.

Column 12, line 7, after "to", second occurrence, insert -- be --; column 33, line 51, before "terminal" insert an opening parenthesis; line 70, after "terminal", second occurrence, insert -- 791 --; column 35, line 18, for "791-X, 795-X" read -- 791-X to 795-X --; column 42, line 53, for "reflection" read -- deflection --.

Signed and sealed this 17th day of April 1962.

(SEAL)
Attest:

ESTON G. JOHNSON                                    DAVID L. LADD
Attesting Officer                                        Commissioner of Patents